(12) United States Patent
Togino

(10) Patent No.: US 7,317,565 B2
(45) Date of Patent: Jan. 8, 2008

(54) PROJECTION VIEWING SYSTEM

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 182 days.

(21) Appl. No.: 10/612,092

(22) Filed: Jul. 3, 2003

(65) Prior Publication Data
US 2005/0206985 A1    Sep. 22, 2005

(30) Foreign Application Priority Data
Jul. 16, 2002  (JP) .............................. 2002-206860
Oct. 18, 2002  (JP) .............................. 2002-304555

(51) Int. Cl.
*G02B 5/32* (2006.01)

(52) U.S. Cl. ................. 359/15; 359/449; 359/599; 359/451; 353/94; 353/98

(58) Field of Classification Search ............. None
See application file for complete search history.

(56) References Cited

U.S. PATENT DOCUMENTS

| | | | |
|---|---|---|---|
| 5,886,819 A | 3/1999 | Murata et al. | ............... 359/483 |
| 6,095,652 A * | 8/2000 | Trayner et al. | ............... 353/10 |
| 6,124,989 A | 9/2000 | Oode et al. | ................... 359/729 |
| 6,198,555 B1 | 3/2001 | Kurokawa et al. | ............ 359/28 |
| 2002/0075452 A1* | 6/2002 | Kessler et al. | .................. 353/7 |
| 2003/0133191 A1* | 7/2003 | Morita et al. | ................ 359/464 |

FOREIGN PATENT DOCUMENTS

| JP | 06-230738 | | 8/1994 |
|---|---|---|---|
| JP | 06230738 A | * | 8/1994 |
| JP | 10-115878 | | 5/1998 |
| JP | 11-084291 | | 3/1999 |
| JP | 2000-171618 | | 6/2000 |
| JP | 2001-281583 | | 10/2001 |
| JP | 2004102204 A | * | 4/2004 |

* cited by examiner

*Primary Examiner*—Arnel Lavarias
(74) *Attorney, Agent, or Firm*—Kenyon & Kenyon LLP

(57) ABSTRACT

A projection viewing system of simplified construction and high illumination efficiency, which enables at least two images varying with viewing directions to be simultaneously displayed in a viewable fashion. The system includes at least two display devices $1_1$ and $1_2$, at least two projection optical systems $2_1$ and $2_2$ for magnifying and projecting images appearing on the display devices $1_1$ and $1_2$, a common diffusing plate 4 located near to images projected through the projection optical systems $2_1$ and $2_2$ and a common eyepiece optical system 3 for projecting exit pupils of the projection optical systems $2_1$ and $2_2$ on the eyeballs $E_1$ and $E_2$ of viewers.

8 Claims, 33 Drawing Sheets

PROJECTION VIEWING SYSTEM

This application claims benefits of Japanese Application No. 2002-206860 filed in Japan on Jul. 16, 2002 and No. 2002-304555 filed in Japan on Oct. 18, 2002, contents of which are herein incorporated by this reference.

BACKGROUND OF THE INVENTION

The present invention relates generally to a projection viewing system, and more particularly a projection viewing system that enables an image projected onto one projection surface to be simultaneously viewed from different directions.

Patent Publication 1 discloses how to display an image that varies with viewing directions on the same screen, wherein a double-lenticular screen is used. Patent Publication 2 discloses a system for displaying stereoscopic images, wherein a reflexive screen and two projectors are used together.

Patent Publication 1
JP-A 6-230738
Patent Publication 2
JP-A 10-115878
Patent Publication 3
U.S. Pat. No. 6,124,989
Patent Publication 4
JP-A 2000-66105
Patent Publication 5
JP-A 9-127312
Patent Publication 6
JP-A 2000-171618
Patent Publication 7
JP-A 2001-281583

SUMMARY OF THE INVENTION

The present invention provides a projection viewing system, comprising:
at least a first display device and a second display device,
at least a first projection optical system and a second projection optical system,
a diffusing plate, and
an eyepiece optical system, wherein:
said first projection optical system is adapted to project an image appearing on said first display device in a first direction and said second projection optical system is adapted to project an image appearing on said second display device in a direction different from said first direction,
said diffusing plate is located near to images projected through said first and second projection optical systems, and
said eyepiece optical system is adapted to project exit pupils of said first and second projection optical systems on an viewer side, characterized in that:
at least one of said projection optical systems comprises a decentered prism optical system comprising at least one decentered prism formed of a medium having a refractive index (n) of greater than 1 (n>1), and
said decentered prism comprises:
an entrance surface through which a light beam scanned by said scanner means enters said decentered prism,
at least one reflecting surface for reflecting a light beam in said decentered prism, and
an exit surface through which a light beam leaves said decentered prism, wherein:
said at least one reflecting surface has a curved surface shape to give power to a light beam, wherein:
said curved surface is a rotationally asymmetric shape that makes correction for aberrations occurring due to decentration.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIG. 35 is an optical path diagram illustrative in Y-Z section of Example 10 of the invention.

DESCRIPTION OF THE PREFERRED EMBODIMENTS

Why the aforesaid arrangement is used in the invention, and how it works is now explained. Unless otherwise stated, it is noted that when there are two or more viewing directions and optical members, devices, images, exit pupils, viewers' eyeballs, etc. in the respective viewing directions are uncommon or different from one another, numerical subscripts such as "1" and "2" are added to the numerical references indicative of them in order to show that they are provided in the respective viewing directions.

Figure 1:
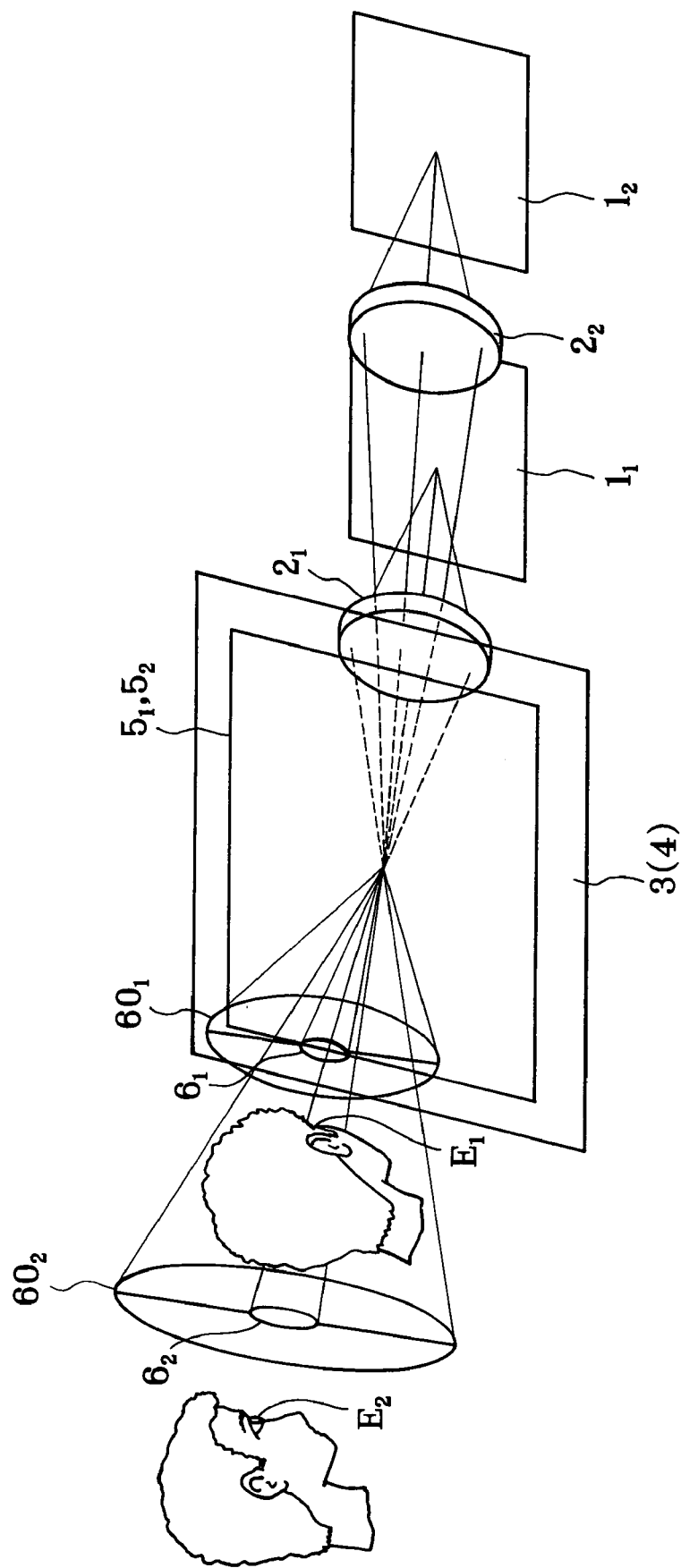
FIG. 1 is illustrative in conception of the optical system in the projection viewing system according to the invention.

FIG. 1 is illustrative in conception of the optical systems in the projection viewing system of the invention.

Figure 2:
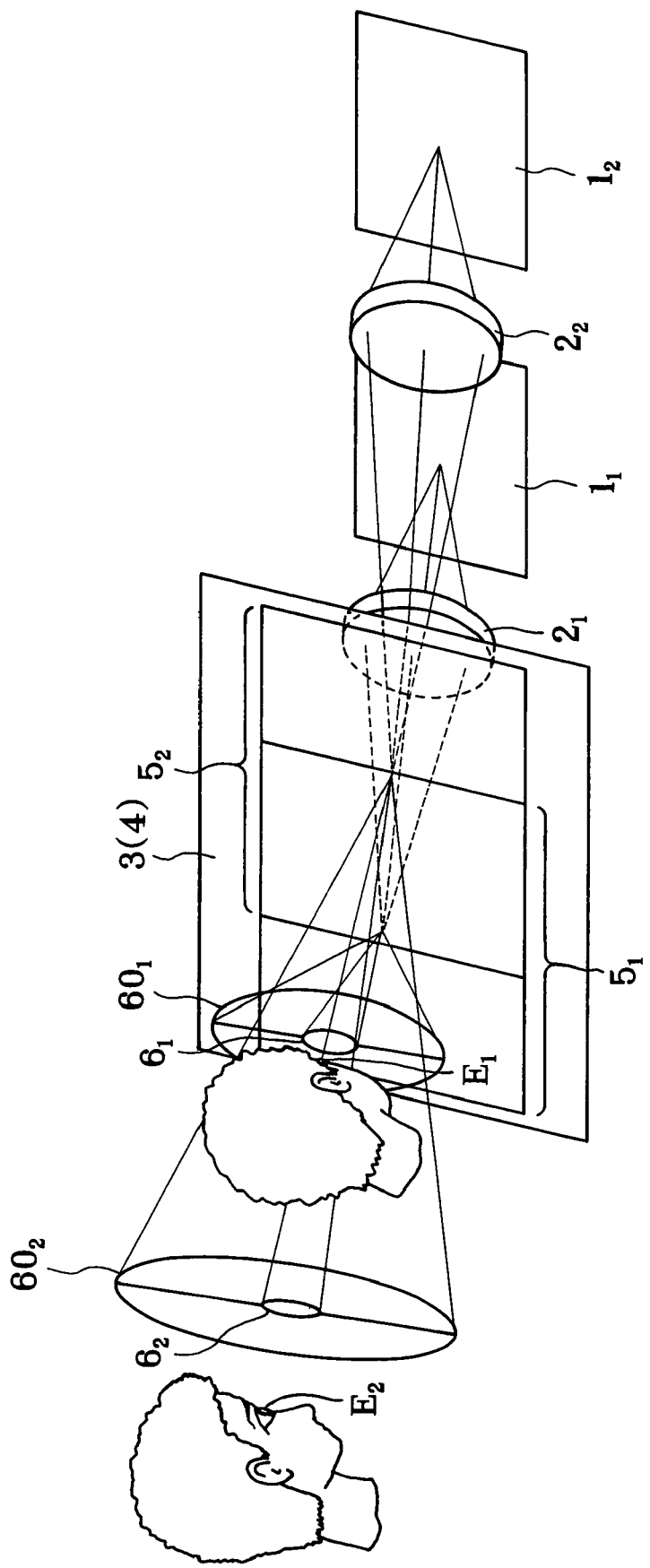
FIG. 2 is illustrative in conception of the optical system in the projection viewing system according to the invention, wherein images are projected in an overlapping fashion.

The projection viewing system of the invention is provided to enable at least two images to be viewed simultaneously form different directions, and so comprises at least two display devices $1_1$ and $1_2$. If different images are displayed on two such display devices $1_1$ and $1_2$, it is then possible for at least two viewers to view the different images at the same time. It is acceptable to display the same image on the display devices. In order to allow viewers to view images appearing on at least two display devices $1_1$ and $1_2$, some optical systems are required. More specifically, the projection viewing system of the invention comprises two projection optical systems $2_1$ and $2_2$ in association with the respective display devices $1_1$ and $1_2$. The projection optical systems $2_1$ and $2_2$ are adapted to project images onto the vicinity of an eyepiece optical system 3 in such a way that projected images $5_1$ and $5_2$ are perfectly put one upon another as shown in FIG. 1 or the projected images $5_1$ and $5_2$ at least overlap each other as shown in FIG. 2. This arrangement makes the projection planes (the areas on which the projected images $5_1$ and $5_2$ are to be formed) small and so enables to the size of the eyepiece optical system 3 to be reduced.

The eyepiece optical system 3 has the function of forming the exit pupils of the projection optical systems $2_1$ and $2_2$ on the sides of viewers' eyeballs $E_1$ and $E_2$. Here let $6_1$ and $6_2$ represent the images of the exit pupils of the projection optical systems $2_1$ and $2_2$ formed on the sides of the eyeballs $E_1$ and $E_2$. According to the invention, the eyepiece optical system 3 is thus provided to project the respective exit pupils of the projection optical systems $2_1$ and $2_2$ onto the eyeballs $E_1$ and $E_2$ of the viewers. Therefore, if the viewers bring the eyeballs $E_1$ and $E_2$ in line with the exit pupils $6_1$ and $6_2$ (the exit pupil images of the projection optical systems $2_1$ and $2_2$), it is then possible to efficiently collect projection light rays emerging from the projection optical systems $2_1$ and $2_2$ onto the viewers' eyeballs $E_1$ and $E_2$. It is consequently possible for the viewers to view bright images even when the display devices $1_1$ and $1_2$ are illuminated using a light source of low output. Thus, the projection viewing system of the invention may be referred to as a system adapted to project the exit pupils of the projection optical systems $2_1$ and $2_2$ onto the viewers' eyeballs $E_1$ and $E_2$.

Figure 3:
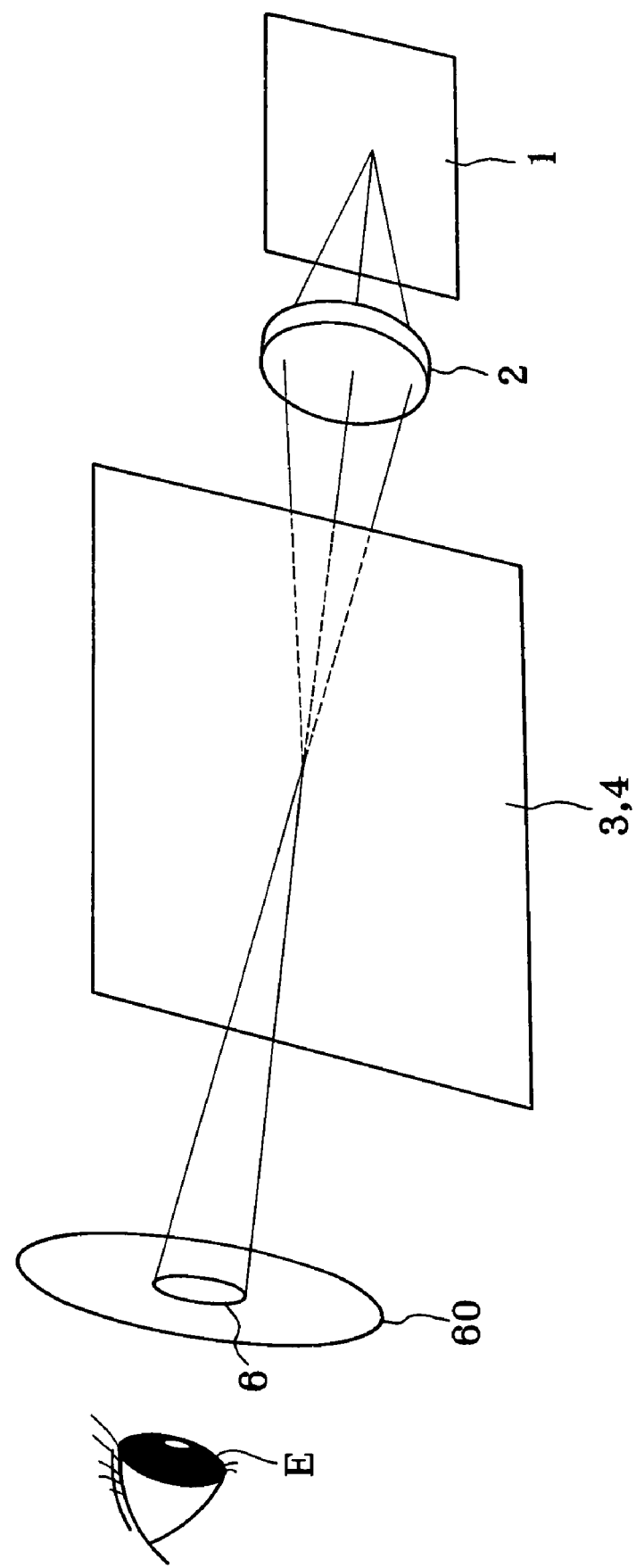
FIG. 3 is illustrative of the diffusion action of a diffusing plate that magnifies a small exit pupil to an exit pupil having a pupil diameter of easy-to-view magnitude.

Further in the invention, a common single diffusing plate 4 is located near to the projected images 51 and 52. Referring to FIG. 3, a small exit pupil image 6 of a projection optical system 2, projected through an eyepiece optical system 3, is magnified to an exit pupil image 60 having a pupil diameter of easy-to-view size, making use of the diffusibility of the diffusing plate 4. It is thus possible to provide a view-friendly projection viewing system capable of viewing the projected images $5_1$ and $5_2$ (FIGS. 1 and 2) even when the eye E of a viewer is slightly out of place. According to the invention, the diffusing plate 4, too, may be reduced in size because of being located near to the projected images. For diffusion purposes, a holographic optical device (HOE) may be used, too.

It is here noted that both the eyepiece optical system 3 and the diffusing plate 4 are located in the vicinity of the images $5_1$ and $5_2$ projected through the projection optical systems 2, $2_1$ and $2_2$. Thus, the diffusing plate 4 could be designed by forming a diffusing surface having a diffusing action on at least one surface of the eyepiece optical system 3 as an integral piece. Alternatively, the diffusing plate 4 could be provided separately from the eyepiece optical system 3.

In the projection viewing system of the invention set up as described above, the optical axes of the projection optical systems $2_1$ and $2_2$ cross the eyepiece optical system 3. Then, an angle where a perpendicular to the eyepiece optical system 3 at a point of intersection with either one of the optical axes subtends that perpendicular should preferably be 10° or greater.

Figure 4:
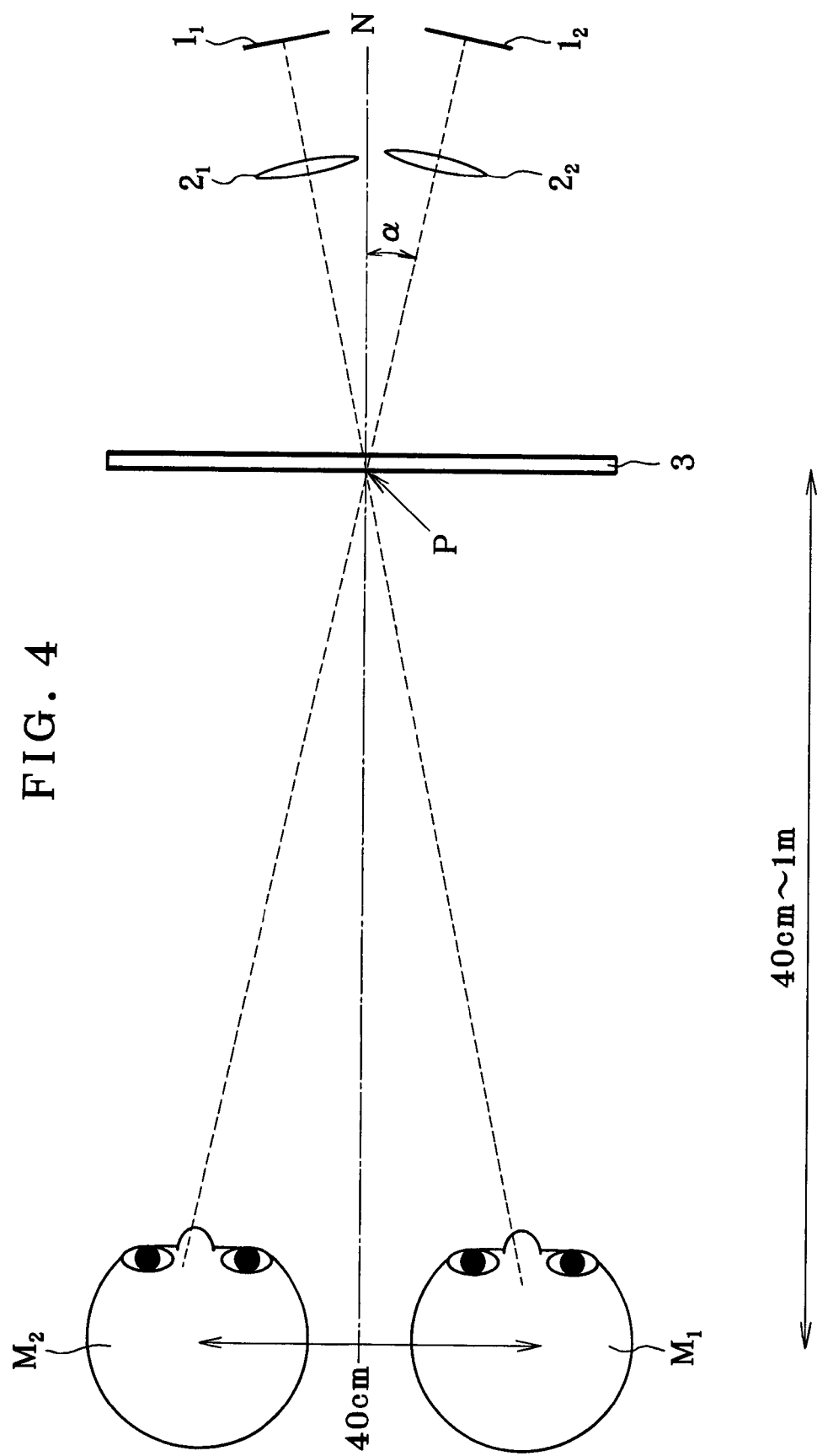
FIG. 4 is illustrative of the angle that the optical axes of two-dimensionally decentered projection optical systems subtend a perpendicular to an eyepiece optical system.

As shown in FIG. 4, optical axes extending from projection optical systems $2_1$ and $2_2$ to the center of a projection plane defined by an eyepiece optical system 3 arrive at the eyeball positions of viewers $M_1$ and $M_2$ substantially through the centers of a diffusing plate 4 and the eyepiece optical system 3. It is here understood that the diffusing action of the diffusing plate 4 is not taken into account.

The projection viewing system of the present invention has a possible application as a personal display. The personal display is designed such that at least two viewers can view an image projected onto one single projection plane; the distance between the projection plane and the viewers is of the order of 40 cm to 1 m. Upon viewing, the faces of two or more viewers, for instance, two viewers $M_1$ and $M_2$ are less likely to be close to each other. In other words, the facial centers of both would be spaced at least 40 cm away from each other. In this case, the angle that the optical axis of the projection optical system $2_1$ subtends that of the projection optical system $2_2$ is in the range of 53° to 22.6°. In view of psychological factors of both faces being close to each other, the angle $\alpha$ that a perpendicular N to the eyepiece optical system 3 subtends either one of the optical axes of the projection optical systems $2_1$ and $2_2$ at a point P should preferably be at least 10°. Here the point P is located where at least either one of the optical axes of the projection optical systems $2_1$ and $2_2$ intersects the eyepiece optical system 3. It is noted that the perpendicular N to the eyepiece optical system 3 is to the major surface of the eyepiece optical system 3. It is also noted that when the eyepiece optical system 3 is constructed of a Fresnel lens or reflecting mirror, the perpendicular is defined with respect to that Fresnel lens or reflecting mirror.

Figure 5:
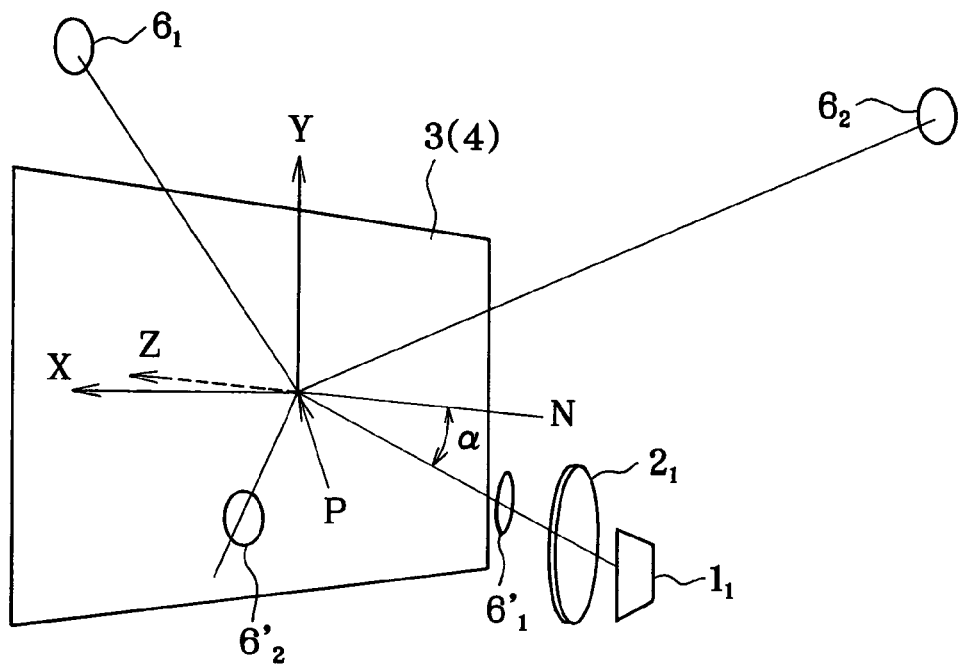
FIG. 5 is a schematic, similar to FIG. 4, for three-dimensionally decentered projection optical systems.

FIG. 4 illustrates an arrangement wherein the projection optical systems $2_1$ and $2_2$ are located in a two-dimensionally decentered manner. The same holds true for the case where they are three-dimensionally located. FIG. 5 is illustrative in schematic of an arrangement wherein projection optical systems $2_1$ and $2_2$ are located in a three-dimensionally decentered fashion. It is noted that only one projection optical system $2_1$ is shown in FIG. 5. The exit pupils of the projection optical systems $2_1$ and $2_2$ are indicated by $6_1'$ and $6_2'$, respectively, and exit pupil images that are projected images created by the eyepiece optical system 3 by $6_1$ and $6_2$, respectively. When the projection optical systems $2_1$ and $2_2$ are three-dimensionally located as shown in FIG. 5, too, it is desired that the angle $\alpha$ that the perpendicular N subtends the projection optical system $2_1$ at the point N is at least 10°, as in FIG. 4.

In the arrangements of FIGS. 4 and 5, the images on the display devices $1_1$ and $1_2$ are projected onto the eyepiece optical system 3 from oblique directions. When, in this case, the projection optical systems 2, $2_1$ and $2_2$ are each constructed of a rotationally symmetric optical system, the projected images are tilted to cause an image distortion. This image distortion can be corrected by parallel location of the display screens of the display devices $1_1$ and $1_2$ and the major surfaces of the projection optical systems $2_1$ and $2_2$ and shifting of the projection optical systems $2_1$ and $2_2$ vertically to the optical axis, as shown in FIG. 5. Alternatively, the image distortion may be corrected by locating these three members in such a way as to satisfy Shymfluk law.

Still alternatively, such an image distortion could be corrected in an electrical fashion. In this case, the images formed by the display devices 11 and 12 are previously distorted while allowing for electrical cancellation of that image distortion.

Of course, it is acceptable to make use of both the optical correction method and the electrical correction method.

A decentered optical system should preferably be used as each of the projection optical systems 2, $2_1$ and $2_2$. Preferably in this case, each projection optical system 2, $2_1$, $2_2$ should have a rotationally asymmetric surface. Preferably but not exclusively, a free-form surface is used as the rotationally asymmetric surface. The free-form surface, for instance, is defined by formula (a) set forth in Patent Publication 3 (Patent Publication 4), wherein the Z-axis is the axis of the free-form surface.

At least one of the projection optical systems $2_1$ and $2_2$ is constructed of a decentered prism optical system. The decentered prism optical system comprises at least one decentered prism formed of a medium having a refractive index of greater than 1 (n>1). The decentered prism comprises an entrance surface for entering a light beam leaving the display device in the prism, at least one reflecting surface for reflecting the light beam in the prism and an exit surface through which the light beam leaves the prism. The at least one reflecting surface of the decentered prism should preferably have a curved surface shape to give power to a light beam, wherein the curved surface shape is defined by a rotationally asymmetric surface shape capable of correcting decentration aberrations. This ensures that the ability to correct an image distortion is much improved. This is particularly preferable for the case where the optical axes of at least two projection optical systems $2_1$ and $2_2$ make an angle of at least 30°.

Figure 6:
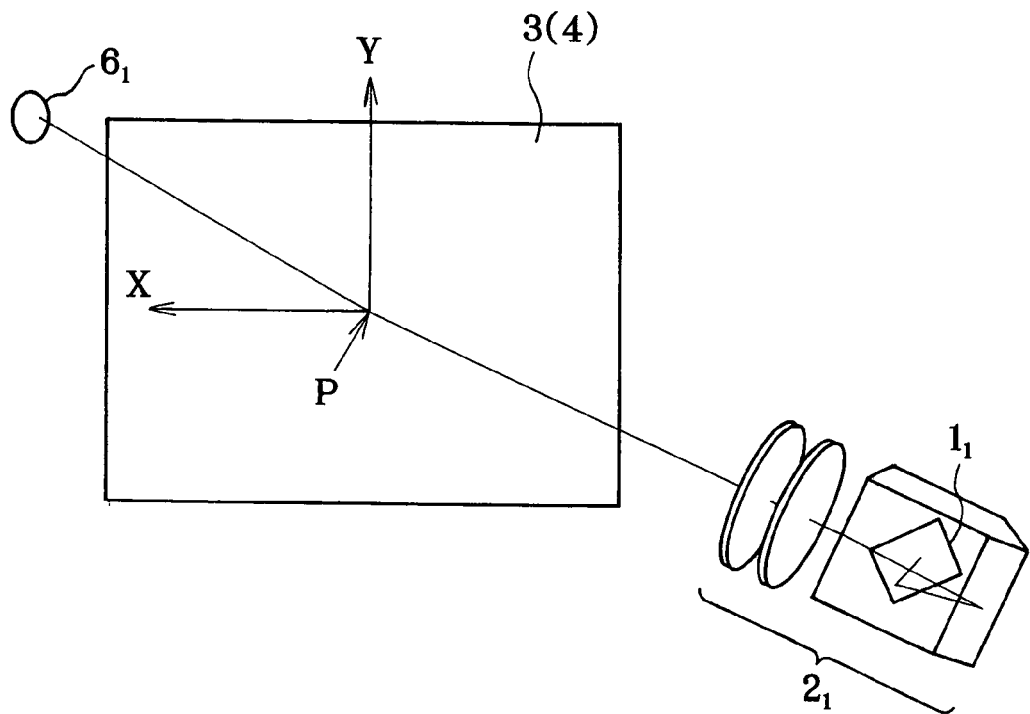
FIG. 6 is illustrative in schematic of an optical system comprising a projection optical system comprising a combination of a rotationally symmetric lens system and a decentered prism.

It is noted that the decentered prism optical system used as the projection optical system $2_1$, $2_2$ may comprise one or more decentered prisms. Alternatively, it is acceptable to use a combined rotationally symmetric lens system and decentered prism, as schematically shown in FIG. 6.

One example of the decentered prism has the following construction and features; that is, it comprises:

an entrance surface for entering light beams from the display devices $1_1$ and $1_2$ in the prism, a first reflecting surface for reflecting the light beams entering the prism through the entrance surface in the prism, a second reflecting surface for reflecting light beams reflected at the first reflecting surface in the prism, and an exit surface through which the light beams reflected at the second reflecting surface leave the prism, wherein:

the entrance surface, the first and second reflecting surfaces and the exit surface are arranged such that the light beams from the entrance surface toward the first reflecting surface and the light beams from the second reflecting surface toward the exit surface cross each other in the prism, and at least one of the entrance surface, the first and second reflecting surfaces and the exit surface comprises a rotationally asymmetric surface.

The use of such a decentered prism ensures that the optical path through the prism crosses over itself to make the angle of incidence of light on the reflecting surfaces (the first and second reflecting surfaces) small with the result that the amount of decentration aberrations produced can be reduced.

Another example of the decentered prism used for the projection optical system $2_1$, $2_2$ has the following construction and features; that is, it comprises:

an entrance surface for entering light beams from the display devices $1_1$ and $1_2$ in the prism, a first reflecting surface for reflecting the light beams entering the prism through the entrance surface in the prism, a second reflecting surface for reflecting the light beams reflected at the first reflecting surface in the prism, and an exit surface through which the light beams reflected at the second reflecting surface leave the prism, wherein:

the entrance surface and the second reflecting surface are defined by one single surface.

The decentered prism of the type that combines the second reflecting surface with the entrance surface allows light rays to be largely flexed at the second reflecting surface. On the other hand, the first reflecting surface-reflects the light rays toward the second reflecting surface at a small angle of flexion. It is thus possible to reduce the thickness of the prism optical system in the incident light ray direction.

The projection optical system $2_1$, $2_2$ constructed of such a decentered prism optical system has the following advantages. When images on the display devices $1_1$ and $1_2$ are entered in the eyepiece optical system 3 from an oblique direction, the decentered prism optical system symmetric with respect to plane makes it easy to correct a distortion of a tilted image. An image distortion occurring in this oblique arrangement is of asymmetric shape as viewed from a given direction. However, this asymmetric shape is in line with the direction of occurrence of an asymmetric image distortion produced by the decentered prism optical system. It is thus possible to make correction for the image distortion by the decentration aberrations of the decentered prism optical system and, hence, make correction of aberrations easy. The "given direction" used herein is understood to refer to the plane-of-symmetry direction of the decentered prism optical system inclusive of a point P where the optical axis of the projection optical system $2_1$, $2_2$ crosses the eyepiece optical system 3.

In this case, too, such an image distortion could be corrected in an electrical fashion. It is then noted that the images appearing on the display devices 11 and 12 are previously distorted, allowing for electrical cancellation of the image distortion. Of course, it is acceptable to rely on the above optical and electrical correction methods.

Suppose now that the projection optical system $2_1$, $2_2$ is constructed of the decentered prism optical system of shape symmetric with respect to plane. In this case, too, the angle that the perpendicular to the eyepiece optical system 3 subtends the (at least one) optical axis of the projection optical systems $2_1$ and $2_2$ at the point P must be at least 10° as already described.

A preferable arrangement for the decentered prism and the display devices is now explained with reference to FIG. 6. In FIG. 6, P is a point of intersection of the optical axis of a decentered prism optical system $2_1$ with an eyepiece optical system 3. Having a plane of symmetry, the decentered prism optical system $2_1$ is located in such a way that the plane of symmetry includes the point P. A display device $1_1$ is provided on the entrance surface (object plane) side of the decentered prism optical system $2_1$. Then, the display device $1_1$ is turned around its optical axis in such a way that when the display screen of the display device $1_1$ is projected onto the vicinity of the eyepiece optical system 3, the longitudinal or lateral direction of the projected display screen is substantially in line with the longitudinal or lateral direction of the eyepiece optical system 3. The same holds true for the decentered prism $2_2$ and the display device $1_2$.

By locating such display devices $1_1$ and $1_2$ in this arrangement, a rotational asymmetric image distortion can be corrected with the decentered prism optical system of shape symmetrical with respect to plane. This rotationally asymmetric image distortion is caused by the oblique location of the projection optical systems $2_1$ and $2_2$ with respect to the eyepiece optical system 3. In the present invention, it is possible to provide the decentered prism optical systems of the same shape for both the projection optical systems $2_1$ and $2_2$. Thus, the fabrication cost of both the projection optical systems $2_1$ and $2_2$ can be much more reduced than that of the projection optical systems $2_1$ and $2_2$ of varying shapes.

The diffusing plate is now explained. Preferably, the diffusing plate 4 should have an angle of diffusion of up to 20° at full width half maximum. In the projection viewing system of the invention, the projection optical systems $2_1$ and $2_2$ are located at given angles with respect to the eyepiece optical system 3, so that images can be viewed from varying directions, as described above. However, if light is overly diffused through the diffusing plate 4 even in this arrangement, some light, if not strong, of the projected image to reach the eyeball of one viewer is likely to reach the eyeball of another viewer. However, if the diffusbility as described above is imparted to the diffusing plate 4, it is then possible for each viewer to view the associated projected image $5_1$, $5_2$.

As the upper limit of 20° to this condition is exceeded in the case of different projected images $5_1$ and $5_2$, there will occur a crosstalk where the projected images $5_1$ and $5_2$ are seen as a double image, and so the viewer will be incapable of obtaining any proper viewing of what is displayed. It is noted that there is no problem with the same projected images $5_1$ and $5_2$. As the angle of diffusion becomes too large, the images under observation becomes dark, resulting in an increase in the bulkiness of an illumination unit for illuminating an object under observation. In this connection, the diffusibility of the diffusing plate should preferably be such that the intensity of diffused light drops sharply from full width half maximum.

Further, the diffusibility of the diffusing plate 4 should preferably be such that the angle of diffusion at $\frac{1}{10}$ full width is up to 40°. Light rays that diffuse at an angle of at least 40° at $\frac{1}{10}$ full width is unlikely to reach the viewer; satisfaction of the above condition leads to illumination light savings, i.e., efficient utilization of illumination light. It is thus possible to use a small, low-output light source for the illumination of the display devices 1, $1_1$ and $1_2$ and, hence, make the overall system compact.

Furthermore, the diffusibility of the diffusing plate 4 should preferably be such that the angle of diffusion is up to 30° at ⅒ full width. Light rays that diffuse at an angle of at least 30° is relatively less likely to reach the viewer; satisfaction of the above condition leads to efficient utilization of illumination light.

The surface roughness of the diffusing plate 4 that ensures such an angle of diffusion as described above is now explained.

Figure 7:
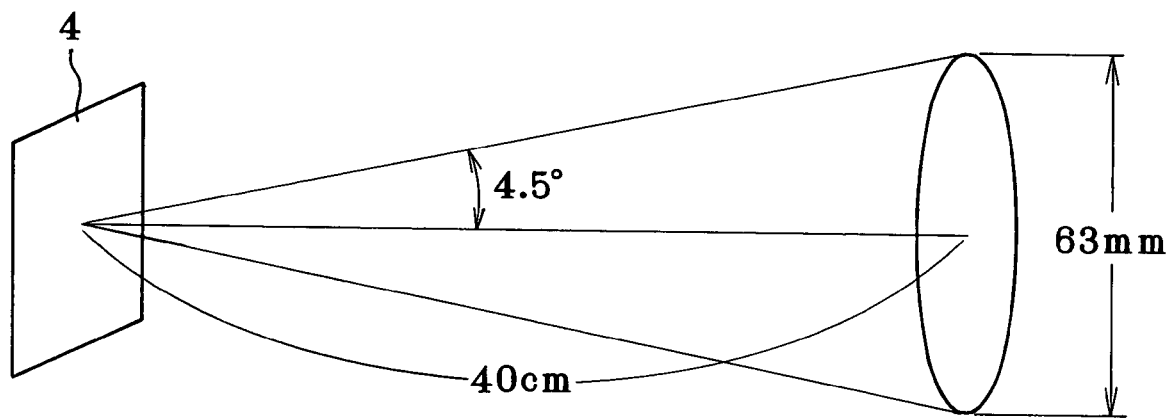
FIG. 7 is a schematic for finding the relation between the arithmetic mean roughness Ra and the mean pit-to-projection space Sm of a transmission type diffusing plate according to the invention.
Figure 8:
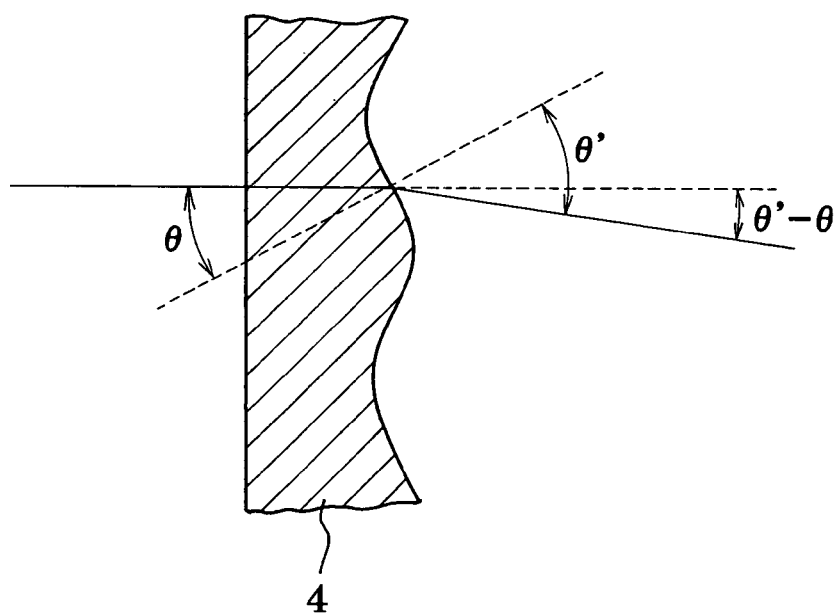
FIG. 8 is illustrative of the relation between the angle of incidence and the angle of refraction on the diffusing surface of the transmission type diffusing plate.

FIG. 7 is illustrative of the surface roughness of a transmission type diffusing plate 4. Suppose now that a light ray is magnified to a φ63 mm size at a distance 40 cm away from the transmission type diffusing plate 4. Then, the angle of diffusion of the light ray must be 4.5° at half width. When light rays are refracted by fine pits and projections on the surface of the diffusing plate 4, the pit-and-projection is assumed to be of sine wave shape and the diffusing surface to have a refractive index of 1.5. From $\theta'-\theta=4.5°$ where $\theta$ is the angle of incidence and $\theta'$ is the angle of refraction and Snell's formula, it is then found that the angle of incidence $\theta$ must have a gradient of about 8.86°, as shown in FIG. 8. It follows that the maximum value of the gradient of the surface roughness must be 8.86°. Here the diffusing surface is assumed to be of smooth sine wave shape. Hence, the diffusing surface shape is expressed by $$y = a \times \sin(2\pi x/T)$$

Here a is an amplitude and T is a period. Then, the gradient of the diffusing surface becomes $$(\text{Gradient}) = dy/dx = a \times \cos(2\pi x/T) \times 2\pi/T$$

At $x=2\pi m$ (m is an integer) the gradient reaches a maximum. Hence, $$(\text{Maximum value of gradient}) = a \times 2\pi/T$$

It is thus possible to find a/T at which the maximum value of gradient is 8.86°.

$$(\text{Maximum value of gradient}) = a/T \times 2\pi = 8.86/180 \times \pi = 0.154$$

From this, one can obtain $$a/T = 0.0246$$

When the diffusing surface is of sine wave shape, the relation between the arithmetic mean roughness Ra according to JIS B0601 and a becomes $$Ra/\sqrt{2} = a$$

The relation between the pit-to-projection mean space Sm and the above period T becomes $$Sm = T$$

From this, one can obtain the following result with respect to the surface roughness.

$$Sm = 28.7 Ra$$

In this case, the maximum gradient of the diffusing surface is 8.83°. At a refractive index of 1.5, a diffusing plate having a half angle of diffusion of 4.5° and a total angle of diffusion of 9° with respect to light rays is obtained.

Figure 9:
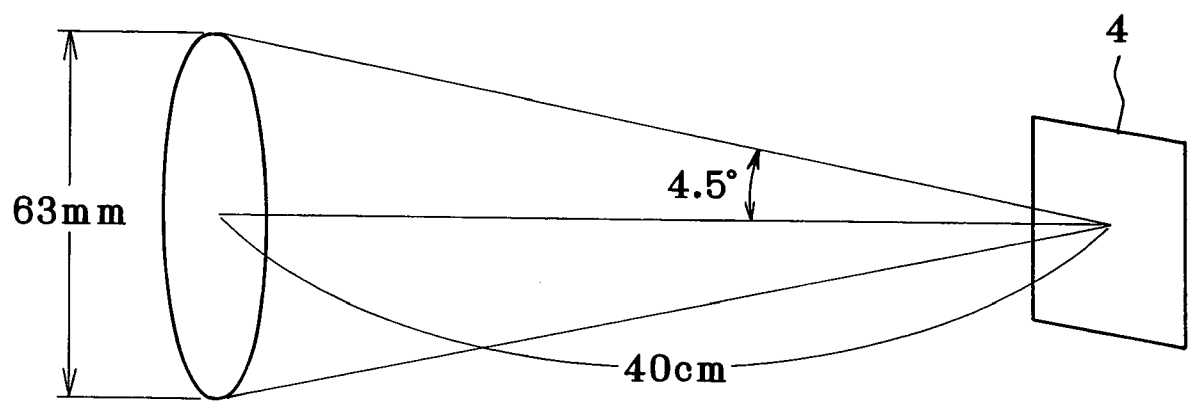
FIG. 9 is a schematic for finding the relation between the arithmetic mean roughness Ra and the mean pit-to-projection space Sm of a reflection type diffusing plate according to the invention.
Figure 10:
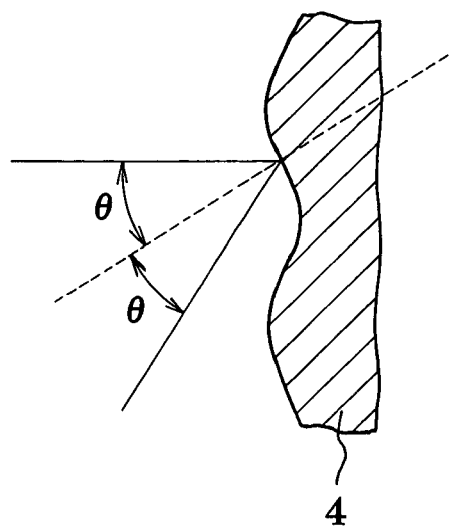
FIG. 10 is illustrative of the relation between the angle of incidence and the angle of refraction on the diffusing surface of the reflection type diffusing plate.

FIG. 9 is illustrative of the surface roughness of a reflection type diffusing plate 4. Suppose now that a light ray is magnified to a φ63 mm size at a distance 40 cm away from the reflection type diffusing plate 4. Then, the angle of diffusion of the light ray must be 4.5° at half width. When light rays are reflected by fine pits and projections on the surface of the diffusing plate 4, the pit-and-projection is assumed to be of sine wave shape and the diffusing surface to have a refractive index of 1.5. In this case, the angles of incidence and reflection are given by $\theta$, as shown in FIG. 10. From $2\theta=4.5°$, it is then found that the angle of incidence $\theta$ must have a gradient of about 2.25° that is about half of 4.5°, as shown in FIG. 10. It follows that the maximum value of the gradient of the surface roughness must be 2.25°. Here the diffusing surface is assumed to be of smooth sine wave shape. Hence, the diffusing surface shape is expressed by $$y = a \times \sin(2\pi x/T)$$

Then, the gradient of the diffusing surface becomes $$(\text{Gradient}) = dy/dx = a \times \cos(2\pi x/T) \times 2\pi/T$$

At $x=2\pi m$ (m is an integer) the gradient reaches a maximum. Hence, $$(\text{Maximum value of gradient}) = a \times 2\pi/T$$

It is thus possible to find a/T at which the maximum value of gradient becomes 2.25°.

$$(\text{Maximum value of gradient}) = a/T \times 2\pi = 2.25/180 \times \pi = 0.03927$$

From this, one can obtain $$a/T = 0.00625$$

When the diffusing surface is of sine wave shape, the relation between the arithmetic mean roughness Ra according to JIS B0601 and a becomes $$Ra/\sqrt{2} = a$$

The relation between the pit-to-projection mean space Sm and the above period T becomes $$Sm = T$$

From this, one can obtain the following result with respect to the surface roughness.

$$Sm = 113.14 Ra$$

In this case, the maximum gradient of the diffusing surface becomes 2.25°, giving a diffusing plate having a half angle of diffusion of 4.5° by reflection and a total angle of diffusion of 9°.

Figure 11:
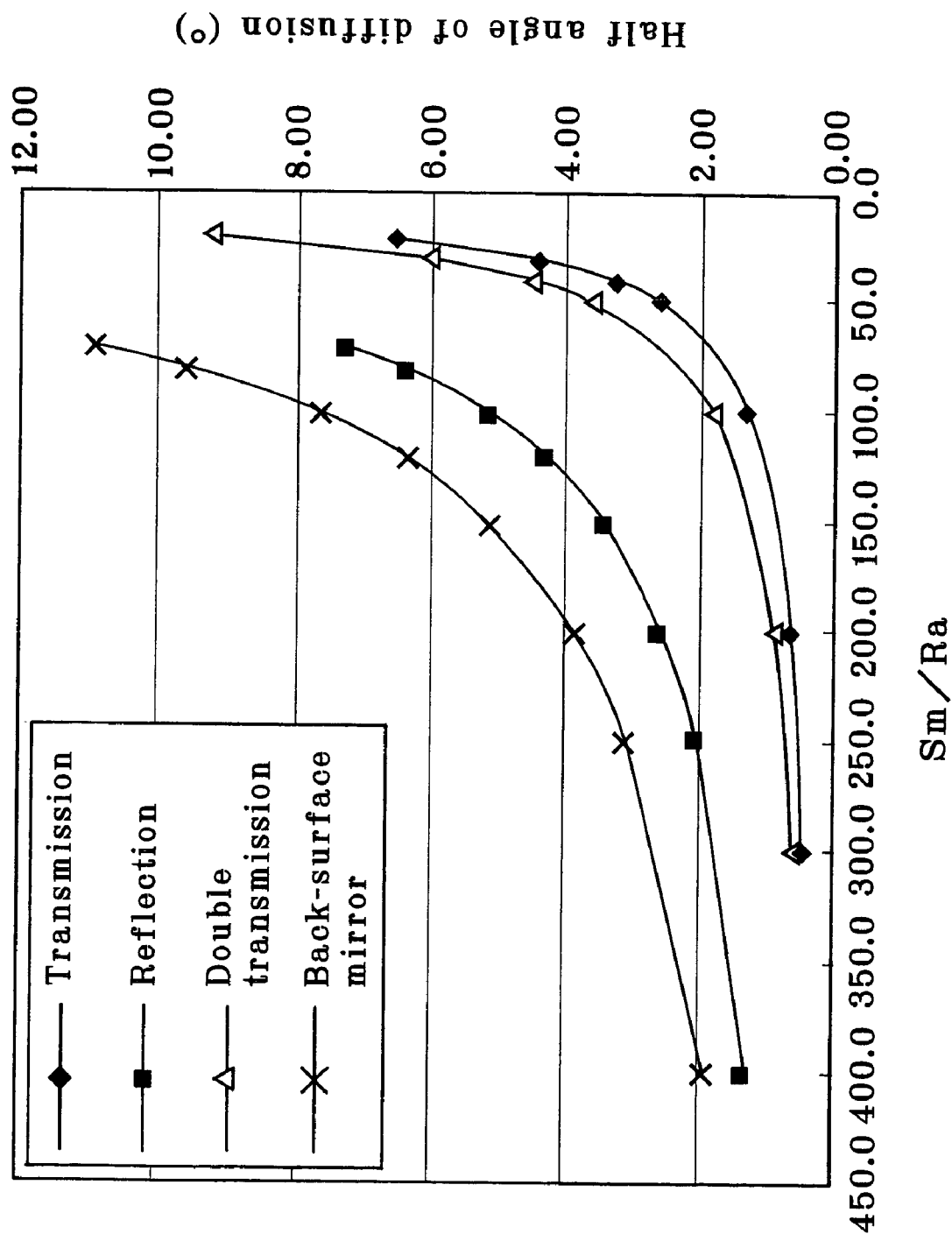
FIG. 11 is illustrative of the relation between Sm/Ra and the half angle of diffusion of the diffusing plate according to the invention.

This is extended to a double-transmission type diffusing plate and a back-surface mirror type diffusing plate. The relations between Sm/Ra and the half angle of diffusion are illustrated in FIG. 11. Here the pit-and-projection surface of the diffusing surface is assumed to be approximate to the sine wave shape.

From such findings as described above, the surface roughness of the diffusing plate 4 should preferably satisfy the following condition (1).

$$5 < (Sm/Ra) < 1,000 \qquad (1)$$

This condition is required to impart preferable diffusibility to the diffusing plate 4. Here the diffusibility is given to the diffusing plate 4 via the fine surface pit-and-projection shape. It is preferable to diffuse light rays by the fine surface pit-and-projection shape of the diffusing plate 4, because the diffusibility is little dependent on wavelength. Reflection of light rays occurs only through Fresnel reflection at the surface of the diffusing plate 4. This diffusion method is much improved in terms of transmittance drop than other diffusion methods. If an AR (antireflection) coat or the like is applied on the diffusing plate 4, it is then possible to obtain further transmittance improvements.

More preferably, $$10<(Sm/Ra)<500 \qquad (1\text{-}1)$$

The diffusing surface of the diffusing plate 4 according to the present invention should preferably have a random pit-and-projection shape in such a way as to satisfy the following conditions. This makes it possible to obtain scintillation-free, clear, bright images with a large exit pupil diameter.

Preferably for the single transmission type diffusing plate, $$5<(Sm/Ra)\times(Ep/400)<70 \qquad (2)$$

Preferably for the double-transmission type diffusing plate, $$10<(Sm/Ra)\times(Ep/400)<80 \qquad (3)$$

Preferably for the front-surface reflection type diffusing plate, $$50<(Sm/Ra)\times(Ep/400)<200 \qquad (4)$$

Preferably for the back-surface reflection type diffusing plate, $$80<(Sm/Ra)\times(Ep/400)<250 \qquad (5)$$

Here Sm is a mean pit-to-projection space of the diffusing surface according to JIS B0601 (μm), Ra is a center-line mean roughness of the diffusing surface (μm), and EP is a distance from the diffusing surface to the position of a viewer's eye (an eye point (mm)).

As the lower limits to conditions (2) to (5) are not reached, the angle of diffusion becomes too small to obtain any large pupil diameter. As the upper limits are exceeded, the diffusion of light becomes too large and so images under observation become dark.

It is noted that when a Fresnel lens is used for the eyepiece optical system 3, it is more preferable to make the pit-and-projection shape of the diffusing surface random. A pit-and-projection shape having periodicity causes moiré fringes between the pitch of the Fresnel lens and the diffusing surface, which are then superposed on an image under observation. As a result, the image becomes difficult to see.

More preferably for the single transmission type diffusing plate, $$10<(Sm/Ra)\times(Ep/400)<40 \qquad (2\text{-}1)$$

More preferably for the double-transmission type diffusing plate, $$15<(Sm/Ra)\times(Ep/400)<60 \qquad (3\text{-}1)$$

More preferably for the front-surface reflection type diffusing plate, $$70<(Sm/Ra)\times(Ep/400)<150 \qquad (4\text{-}1)$$

More preferably for the back-surface reflection type diffusing plate, $$100<(Sm/Ra)\times(Ep/400)<200 \qquad (5\text{-}1)$$

Further, the present invention should preferably satisfy condition (6) with respect to the pit-to-projection mean space Sm of the diffusing surface of the diffusing plate.

$$Sm<200 \text{ μm} \qquad (6)$$

This condition (6) concerns the scintillation of a viewing screen. In the projection viewing system of the present invention in particular, a narrow light beam (having a small NA) is emitted from the projection optical system 2, $2_1$, $2_2$. Then, this narrow light beam is used to form a projection image in the vicinity of the diffusing plate 4. At this time, Sm values of greater than 200 μm have some significant influence on the scintillation of an image. For the diffusing surface, therefore, it is of importance to satisfy the present condition (6) while satisfying conditions (2) to (5). Reference is then made to what happens when this condition (6) is not satisfied, i.e., Sm is not smaller than 200 μm. In severe cases, as the observer moves his eyes, the whole screen looks as if it blinked slightly. In other words, scintillation is visible. In less severe cases, the image lacks clearness. For instance, the image (under observation) looks like an image projected onto ground glass. As a result, it is impossible to view any vivid image.

More preferably, $$Sm<100 \text{ μm} \qquad (6\text{-}1)$$

Even more preferably, $$Sm<50 \text{ μm} \qquad (6\text{-}2)$$

For instance, the diffusing plate 4 of the present invention that satisfies such conditions as set forth above is disclosed in Japanese Patent Application No. 2001-370950 filed by the present applicant. This publication discloses how to fabricate diffusing plates. In the present invention, diffusing plates fabricated by such a method could be used. For instance:

(1) A diffusing plate fabricated by sandblasting. Spherical beads having limited diameters are blown onto a substrate, so that a group of concave facets or a group of facets similar to such facets or convex facets complementary to such facets can be formed on the surface of the substrate. In these groups, the facets are at random, defining a diffusing surface. In this way, the diffusing plate is fabricated.

(2) A diffusing plate fabricated by sandblasting plus copying. Spherical beads are blown onto a metal substrate to form a group of randomly arranged concave facets. This metal substrate is used as a master to copy the group of randomly arranged concave facets to a transparent substrate, so that a diffusing plate can be fabricated.

(3) A diffusing plate fabricated by sandblasting plus transfer. First, a metal substrate is provided with a layer. Then, spherical beads are blown onto the layer on the metal substrate to form a group of randomly arranged concave facets. Subsequently, the group of randomly arranged concave facets formed on the layer is similarly transferred onto the surface of the metal substrate. Finally, the metal substrate is used as a master to copy the group of randomly arranged concave facets to a transparent substrate, so that a diffusing plate can be fabricated.

(4) In the diffusing plate (1), (2) or (3), glass beads having a diameter of 0.01 mm to 2 mm are used as the spherical beads.

(5) In the diffusing plate (1), (2), (3) or (4), the spherical beads are blown at a pneumatic pressure of 0.5 to 3.0 kg/cm².

(6) In the diffusing plate according to any one of (1) to (5), the metal substrate is a brazen substrate.

(7) In the diffusing plate according to any one of (1) to (6), the metal substrate is formed of a metal whose hardness is higher than that of the spherical beads.

(8) In the diffusing plate according to any one of (2) to (7), injection molding or press molding is used to copy the group of concave facets formed on the surface of the metal substrate to the transparent substrate.

(9) A diffusing plate fabricated by a method wherein resin droplets are sprayed onto a substrate to form a group of randomly arranged convex facets, and the group of randomly arranged convex facets is similarly transferred onto the substrate side (the surface of the substrate) or a group of concave facets complementary to the group of convex facets is transferred onto the substrate side (the surface of the substrate).

In addition, the diffusing plate set forth in Patent Publication 5, too, could be used. This diffusing substrate is fabricated by roughening one or both sides of a transparent substrate. One or both sides of the transparent substrate, for instance, could be roughened by the following methods (1) to (4).

(1) Etching; that is, one or both sides of the transparent substrate is etched.

(2) Coating or printing; that is, a resin or filler is provided on one or both side of the transparent substrate in a single layer or multilayer form by means of coating or printing. If required, a painting material or ink dispersed in water or an organic solvent is used.

(3) Electrostatic or electrodepositing coating of powders; that is, a resin or filler or their mixture is provided on one or both sides of the transparent substrate by means of electrostatic or electrodepositing coating.

(4) Film formation by extrusion molding, injection molding or the like; that is, an organic or inorganic filler together with a resin is melted with the application of heat and pressure, and the melt is formed into a film by extrusion molding, injection molding or the like. The resulting diffusing plate should preferably have a HAZE value (JIS K7105) in the range of 10 to 40.

Furthermore, the diffusing plate fabricated according to Patent Publication 6, too, could be used. This method of fabricating a diffusing plate comprises the steps of laminating a binder layer directly or via an additional layer on a substrate, embedding a filler material into the binder layer by means of a pressurizing medium, and removing extra filler deposited onto the laminate.

As already described, the eyepiece optical system 3 should preferably be constructed of a Fresnel surface represented by a Fresnel lens or mirror. The eyepiece optical system 3 could also be constructed of a decentered Fresnel reflecting surface. If the eyepiece optical system 3 is formed of the Fresnel surface, then it can be slimmed down. As a result, the projection viewing system can be made compact and easily foldable. As exemplified in the examples given later, the eyepiece optical system may be constructed of one concave mirror.

Further, the eyepiece optical system 3 could be made up of a catoptric system that functions well to reduce aberrations produced at the exit pupils (exit pupil images) of the projection optical systems projected on the viewer side. This ensures a wide field of view without enhancing the diffusibility of the diffusing plate 4. In addition, the quantity of light diffusing in unnecessary directions is so reduced that an image under observation becomes bright without increasing the quantity of illumination light. Especially in an optical system wherein the optical axis of the eyepiece optical system 3 is decentered as contemplated herein, there are some considerable decentration aberrations. Moreover, when the eyepiece optical system 3 is of simple construction, it is difficult to provide another surface for correction of such decentration aberrations. In this regard, it is preferable to rely on a catoptric system with reduced decentration aberrations.

Constructed of the Fresnel surface, the eyepiece optical system 3 can be slimmed down, because of being defined by a substantial plane. In a reflection type Fresnel surface, the surface of optical action is defined by a zonal reflecting surface. The angle of the zonal reflecting surface subtending a surface vertical to the optical axis is smaller than that of a refraction type Fresnel surface (a Fresnel lens). With the reflection type Fresnel surface, therefore, there is a reduction of ghost light produced at a Fresnel end face (an inactive surface), which is a problem with the Fresnel lens, and the transmittance efficiency for light rays can be increased as well. The use of the reflection type Fresnel surface is particularly desired when the angles of two optical axes determined by the projection optical systems $2_1$ and $2_2$ are large, as described later.

Referring again to the projection viewing systems set up as shown in FIGS. 1-6, diffusibility is primarily imparted to the diffusing plate 4 by a directional fine pit-and-projection surface or a roughened surface. However, a diffusing plate comprising a hologram could be used as the diffusing plate 4 for each projection viewing system. A transmission hologram and a reflection hologram would be used as possible hologram diffusing plates. Referring to a hologram recorded in a volume type photosensitive material, the transmission hologram is of low wavelength selectivity whereas the reflection hologram is of high wavelength selectivity. For a projection viewing system that presents color images, it is necessary to multi-record three hologram interference fringes, thereby diffusing light components of three R (red), G (green) and B (blue) wavelengths. For this reason, it is preferable to use a transmission hologram of relatively low wavelength selectivity as the hologram. For a projection viewing system of small size, it is preferable that a concave mirror (inclusive of a Fresnel concave reflecting mirror) as the eyepiece optical system is used in combination with a diffusing plate comprising such a transmission hologram. In the present disclosure, the diffusing plate comprising a transmission hologram will simply be called the hologram diffusing plate. A projection viewing system comprising an eyepiece optical system made up of a concave mirror 24 and a hologram diffusing plate 25 is now explained. It is here noted that the display device and light sources in the projection viewing system of this construction are not illustrated. As in FIGS. 1-6, the eyepiece optical system is located on the entrance side of a projection optical system 2. It is also noted that only one of a plurality of optical systems in a plurality of viewing directions is explained, and the rest is not referred to.

Figure 12A:
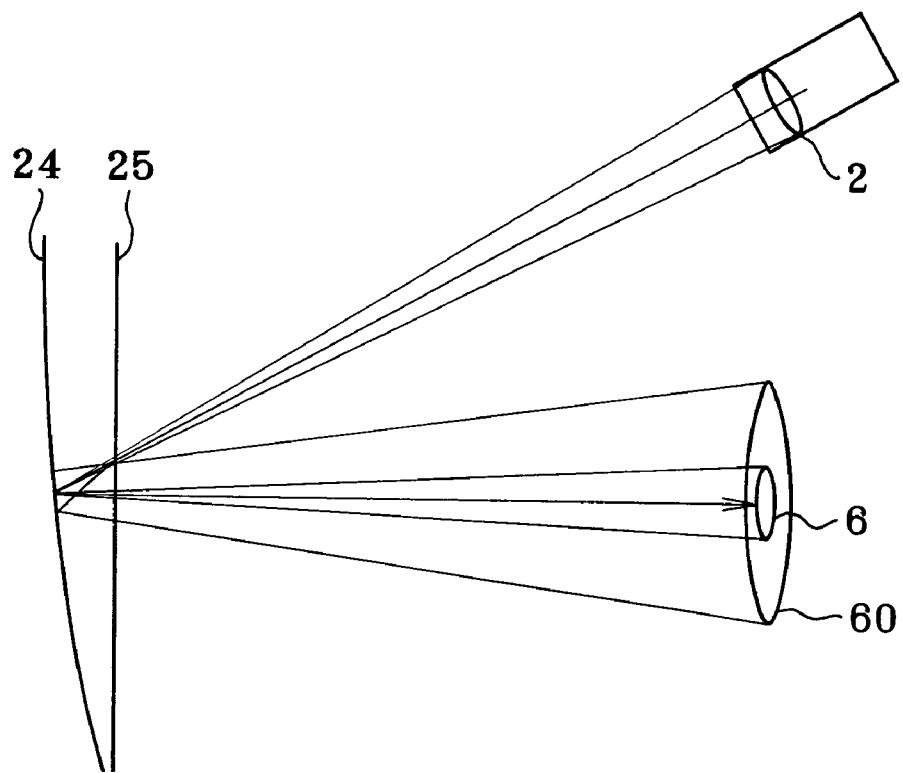
FIG. 12(*a*) is illustrative in conception of optical systems in the projection viewing system constructed according to the present invention, and FIG. 12(*b*) is illustrative of how that projection viewing system is set up.
Figure 12B:
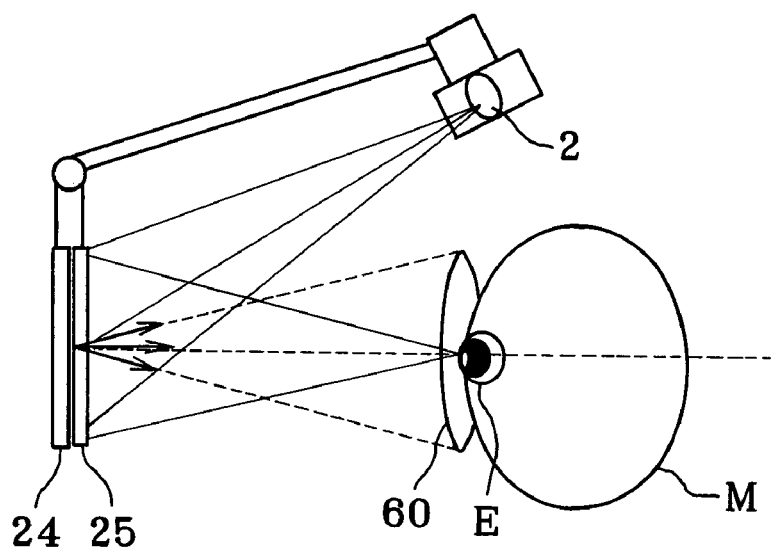

FIG. 12(a) is illustrative in conception of an optical system in the projection viewing system constructed according to the present invention, and FIG. 12(b) is illustrative of how that projection viewing system is set up. In FIG. 12(b), a concave mirror 24 is constructed of a Fresnel concave reflecting mirror. As already described, the display device and light sources are not shown. In FIG. 12(b), an image appearing on the display device is magnified and projected through a projection optical system 2. A hologram diffusing plate 25 and an eyepiece optical system are located in the vicinity of the projected image. Comprising the concave mirror 24, the eyepiece optical system forms the exit pupil of the projection optical system 2 at a given position that is substantially in line with the eyeball of a viewer M. An exit pupil image 6 formed through the eyepiece optical system 24 in the projection optical system 2 is then magnified to an exit pupil image 60 of easy-to-view size by the hologram diffusing plate 25. It is thus possible for the viewer M to view the projected image as an image under observation even when the eye E of the viewer M is more or less displaced from the exit pupil image 6. As a result, it is possible to achieve an easy-to-observe projection viewing system, as in FIG. 1 or the like.

In the present invention, the hologram diffusing plate 25 is located on the entrance side of the concave mirror 24 forming the eyepiece optical system, as shown in FIG. 12(a). Accordingly, light rays from the projection viewing system 2 to the position of the exit pupil 60 make a total of two roundtrip transmissions through the hologram diffusing plate 25. This is a feature of the present invention. In other words, the light is diffracted twice through the hologram diffusing plate 25. On the basis of this, the angle of the first transmission (before incidence on the concave mirror 24) of light through the hologram diffusing plate 25 is intentionally allowed to differ from the angle of the second transmission (after incidence on the concave mirror 24) of light through the hologram diffusing plate 25, thereby preventing light from being diffracted only once depending on the wavelength selectivity of that hologram. The arrangement for this will be described later.

As is the case with the diffusing plate 4, the hologram diffusing plate 25 should preferably have an angle of diffusion of up to 20° at full width half maximum. Moreover, the diffusibility of the diffusing plate 25 should be such that the angle of diffusion is preferably up to 40° and more preferably up to 30° at a ¹⁄₁₀ full width.

Figure 13A:
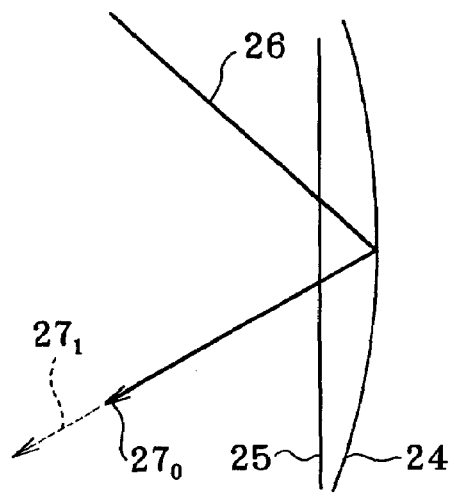
FIGS. 13(*a*), 13(*b*) and 13(*c*) are optical path diagrams for a combination of a diffusing plate comprising a transmission hologram through which light is flexed upon the first transmission with a concave mirror forming the eyepiece optical system.

Next, the relation between the flexion and the chromatic dispersion of the diffusing plate 25, and the position relation between the concave mirror 24 forming the eyepiece optical system and the hologram diffusing plate 25 is explained. The hologram diffusing plate 25 is fabricated by recording of interferences between reference light and object light from a diffusing light source (secondary light source). Suppose here that reference light and object light are coaxially (in-line) positioned. Then, as shown in FIG. 13(a), an axial chief ray 26 from the projection optical system 2 is first incident on the diffusing plate 25, passing straightforward or without being flexed through the diffusing plate 25. The chief ray passing straightforward through the diffusing plate 25 is reflected at the concave mirror 24, turning direction. The reflected chief ray enters the diffusing plate 25 from its back surface, passing straightforward through the diffusing plate 25. If, in this case, the angle of incidence of the incident light upon the first incidence satisfies the angle of incidence of reconstruction light of the hologram diffusing plate 25 (the angle at which diffraction efficiency reaches substantially a peak), then diffused light by diffraction is distributed around the chief ray passing straightforward at the first transmission. Upon the second transmission, the diffused light passes substantially straightforward through the diffusing plate 25. On the other hand, if, upon the second incidence, the angle of incidence of the incident light satisfies the angle of incidence of the reconstruction light, then the axial chief ray 26 passes substantially straightforward or without being diffracted through the diffusing plate 25 upon the first transmission. Upon the second transmission, diffused light by diffraction is distributed around the chief ray passing straightforward through the diffusing plate 25. In any case, zero-order light $27_0$ and chief ray $27_1$ propagate in the same direction, as shown in FIG. 13(a), in which no diffused light is shown. In FIG. 13(a), only zero-order light $27_0$ not diffracted through the diffusing plate 25 and only chief ray (center ray) $27_1$ in the diffused light by diffraction are shown. In FIG. 13(a), the zero-order light $27_0$ and chief ray $27_1$ propagate in the same direction, arriving at the center of the exit pupil 60 of the viewing system.

Therefore, when the diffusing plate 25 has only a diffusing action and has not any optical-path flexing action as shown in FIG. 13(a), not only the diffused light but also the zero-order light $27_0$ not diffused by diffraction arrives at the exit pupil 60. This is not preferable because the spot of zero-order light $27_0$ appears at the center of an image under observation.

Figure 13B:
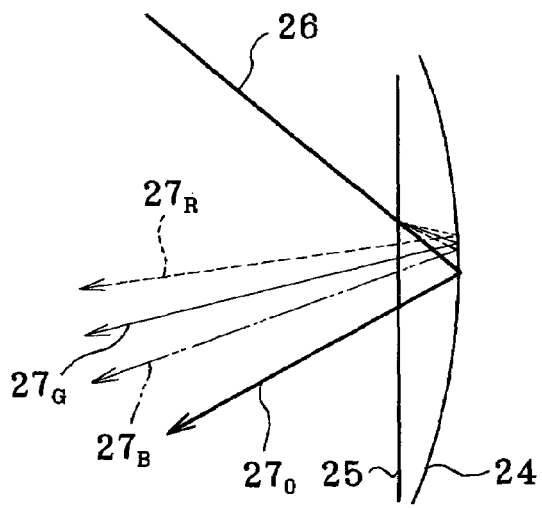
Figure 13C:
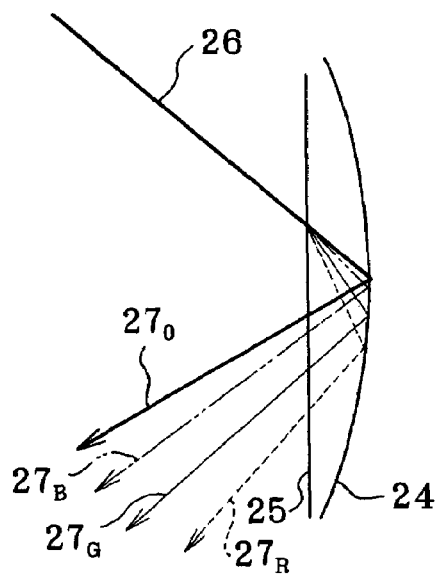
Figure 14A:
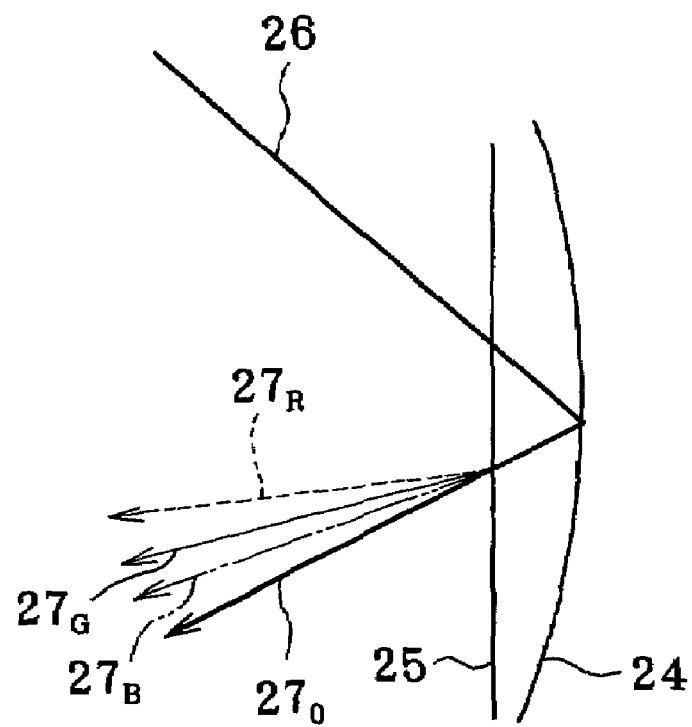
FIGS. 14(*a*) and 14(*b*) are optical path diagrams for a combination of a diffusing plate comprising a transmission hologram through which light is flexed upon the second transmission with a concave mirror forming the eyepiece optical system.
Figure 14B:
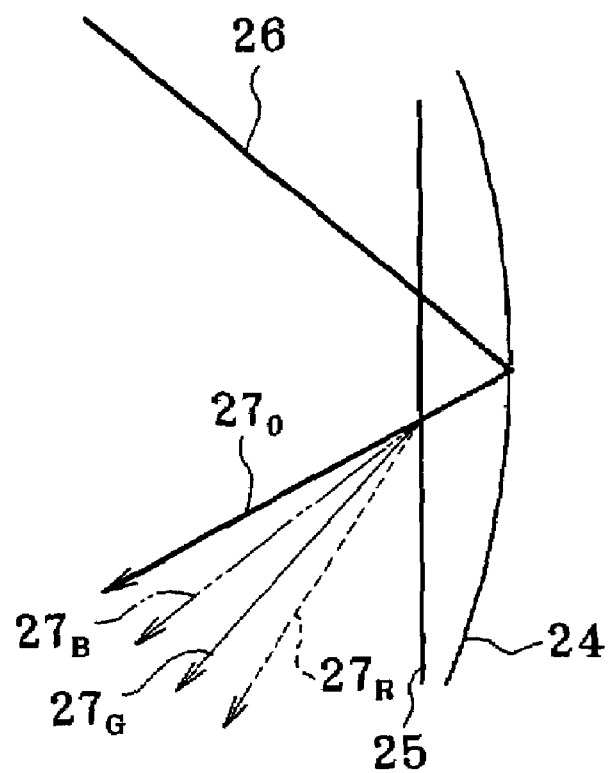

Therefore, a diffusing plate obtained by recording of interferences between reference light and object light in an off-line relation, viz., in a mutually uncoaxial relation is used as the hologram diffusing plate 25. When light that satisfies the angle of incidence of reconstruction light is diffracted through the hologram diffusing plate 25 obtained in such an off-line relation, the flexion of light rays occurs with chromatic dispersion. Such optical paths as shown in FIGS. 13(b) and 13(c) and such optical paths as shown in FIGS. 14(a) and 14(b) are taken depending on the direction of that flexion. However, it is noted that in FIGS. 13(b) and 13(c), the condition regarding the angle of incidence of reconstruction light for the hologram diffusing plate 25 is satisfied upon the first incidence, and in FIGS. 14(a) and 14(b), that condition is satisfied upon the second incidence. In FIG. 13(b) and FIG. 14(a), the direction of flexion of light through the hologram diffusing plate 25 is such that the angle of diffraction becomes small with respect to the angle of incidence to normal, and in FIG. 13(c) and FIG. 14(b), that direction is such that the angle of diffraction becomes large with respect to the angle of incidence. In these figures, no diffused light is shown. Chief rays (center rays) of R, G and B wavelengths diffracted and flexed through the hologram diffusing plate 25 are indicated by $27_R$, $27_G$ and $27_B$. Suppose now that a transmission hologram having an action on the flexion of light rays is used. As can be seen from FIGS. 13 and 14, zero-order light $27_0$ not diffracted through the hologram can then be separated from diffracted light $27_R$, $27_G$ and $27_B$, thereby ensuring that the zero-order light be not incident on the exit pupil 60 of the viewing system. Specifically, it is desired that the zero-order light 270 be incident on a position away from the center of the exit pupil 60 by at least ½ of the pupil diameter.

Here, the angle of flexion (deflection) of light through the transmission type hologram is defined by the absolute value γ of a difference between the angle of incidence and the angle of diffraction, as measured at a d-line (of 587.6 nm wavelength). As the angle of flexion γ is too small, the zero-order light is entered in the image under observation, as described above. Conversely, as the angle of flexion is too large, chromatic dispersion becomes too large. As a result, the range where three R, G and B wavelengths are put one upon another at the exit pupil 60, i.e., the exit pupil area where images can be viewed with good chromatic reproducibility becomes too narrow.

Accordingly, the angle of flexion (deflection) γ at d-line through the hologram diffusing plate 25 should preferably satisfy the following condition.

$$\gamma > 1° \tag{7}$$

More preferably, $$\gamma > 2° \tag{7-1}$$

On the other hand, it is also preferable to satisfy the following condition:

$$\gamma < 45° \tag{8}$$

More preferably, $$\gamma < 20° \tag{8-1}$$

Here let R be light of 700 nm wavelength and B be light of 400 nm wavelength. Then, the difference in the angle of diffraction between chief light rays $27_R$ and $27_B$ should preferably be reduced as much as possible. Specifically, that difference should preferably be up to 18°. This is necessary to prevent the exit pupil area where images can be viewed with good reproducibility from becoming too narrow, as described above. Again let R be light of 700 nm wavelength and B be light of 400 nm wavelength. At the position of the exit pupil 60 of the viewing system, the difference in the entrance position between chief light rays $27_R$ and $27_B$ should preferably be reduced as much as possible. Specifically, that difference should preferably be up to ½ of the diameter of the exit pupil 60.

In FIGS. 13 and 14, the axial chief ray 26 from the projection optical system 2 or the zero-order light $27_0$ is assumed to be obliquely incident on the concave mirror 24 (at an angle β with respect to normal at the entrance position of the concave mirror 24). Suppose here that the axial chief rays 26 or the zero-order light $27_0$ is incident at substantial right angles (β≈0°) on the concave mirror 24. Then, the chief light rays 27R, 27G and 27B leaving the hologram diffusing plate 25 after passed twice through the hologram diffusing plate 25 travel in a substantially opposite direction to the axial chief ray 26. This results in interference of the position of the exit pupil 60 of the viewing system with the projection optical system 2. Accordingly, the angle of incidence β of the axial chief ray 27 from the projection optical system 2 or the zero-order light $27_0$ on the concave mirror 24 should preferably satisfy the following condition.

$$0° < \beta < 45° \tag{9}$$

Figure 15A:
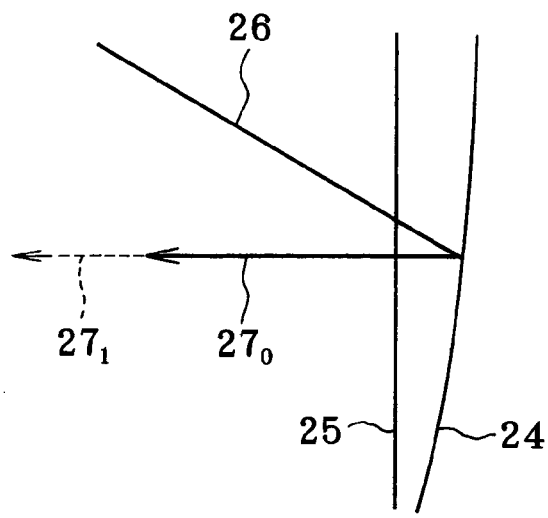
FIGS. 15(*a*), 15(*b*) and 15(*c*) are optical path diagrams for a combination of a diffusing plate comprising a transmission hologram through which light is flexed upon the first transmission with a concave mirror forming the eyepiece optical system.
Figure 15B:
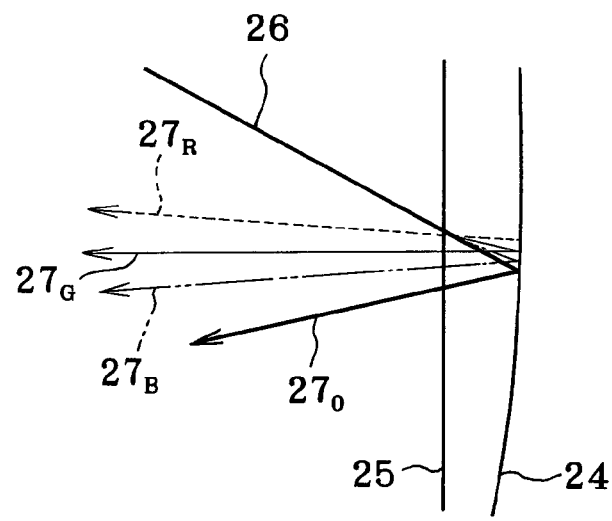
Figure 15C:
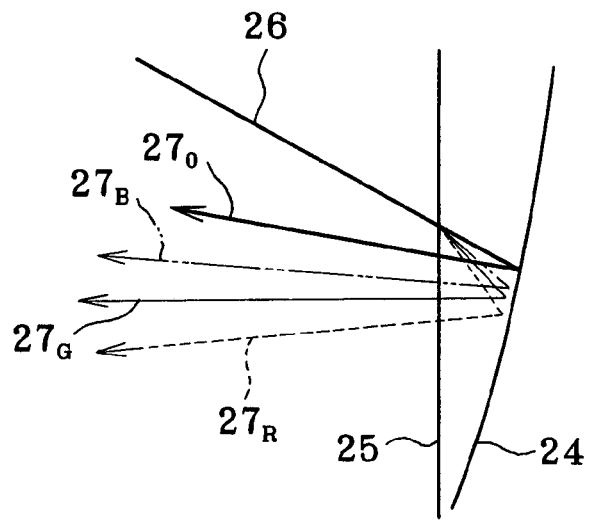

In FIGS. 13 and 14, the axial chief ray 26 from the projection optical system 2 is assumed to be incident on substantial centers of the hologram diffusing plate 25 and the concave mirror 24 on the back surface side thereof, and there is assumed to be no decentration between the hologram diffusing plate 25 and the concave mirror 24. As can be seen from FIGS. 13 and 14, the chief rays $27_R$, $27_G$ and $27_B$ transmitting twice through the hologram diffusing plate 25 are at angles with respect to the diffusing plate 25, and the exit pupil 60 of the viewing system is not positioned on the front of the hologram diffusing plate 25. Accordingly, the viewer would view images projected from an oblique direction; the image under observation would become a tilted image leading to an image distortion. To avoid this, the concave mirror 24 is decentered (e.g., upward) with respect to the hologram diffusing plate 25, as shown in FIGS. 15(a), 15(b) and 15(c), so that the chief rays $27_R$, $27_G$ and $27_B$ reflected at the concave mirror 24 are at substantially right angles with the hologram diffusing plate 25 after the second transmission through the hologram diffusing plate 25. It is noted that FIGS. 15(a), 15(b) and 15(c) correspond to FIGS. 13(a), 13(b) and 13(c), respectively.

Referring to FIGS. 15(a), 15(b) and 15(c), it should be understood that since the projected image is projected from the projection optical system 2(9) obliquely onto the hologram diffusing plate 25, the projected image on the hologram diffusing plate 25, too, becomes a tilted image leading to an image distortion. It is thus preferable to use an optical system having a function to correct such a tilted image leading to an image distortion as the projection optical system 2.

The exit pupil 60 of the viewing system is positioned on the front of the hologram diffusing plate 25, and the axial chief ray 26 from the projection optical system 2 or the zero-order light $27_0$ is allowed to be obliquely incident on the concave mirror 24, so that surface specular light providing noise light can be prevented from entering the exit pupil 60 of the viewing system. This noise light stems from the reflection at the surface of the hologram diffusing plate 25 of the projected light from the projection optical system 2.

The ratio γ/β between the above angle of flexion (deflection) γ and the angle of incidence β of light on the concave surface 24 should preferably satisfy the following condition.

$$0.01 < \gamma/\beta < 1{,}000 \tag{10}$$

When the hologram diffusing plate 25 is used, it is desired to use LEDs or LDs of high chromaticity for light sources for illuminating the display devices 1, $1_1$, $1_2$, preferably in combination with three RGB colors.

For the display device used with the projection viewing system according to the invention, it is acceptable to rely on not only the surface type display device such as a liquid crystal display device or a DMD, set forth in Patent Publication 7 or the like, but also a display device comprising a combined scanning mirror and scanning optical system having a gimbal structure for scanning a light beam from a light source in a two-dimensional direction. In this case, it is not always required to use a projection optical system; it is only needed to collect a light beam two-dimensionally scanned by the scanning mirror directly near to the positions of a diffusing plate and an eyepiece optical system by means of the scanning optical system. Alternatively, the scanning plane may be projected near to the positions of the diffusing plate and the eyepiece optical system.

Embodiments of the projection viewing system of the invention are now explained.

Figure 16:
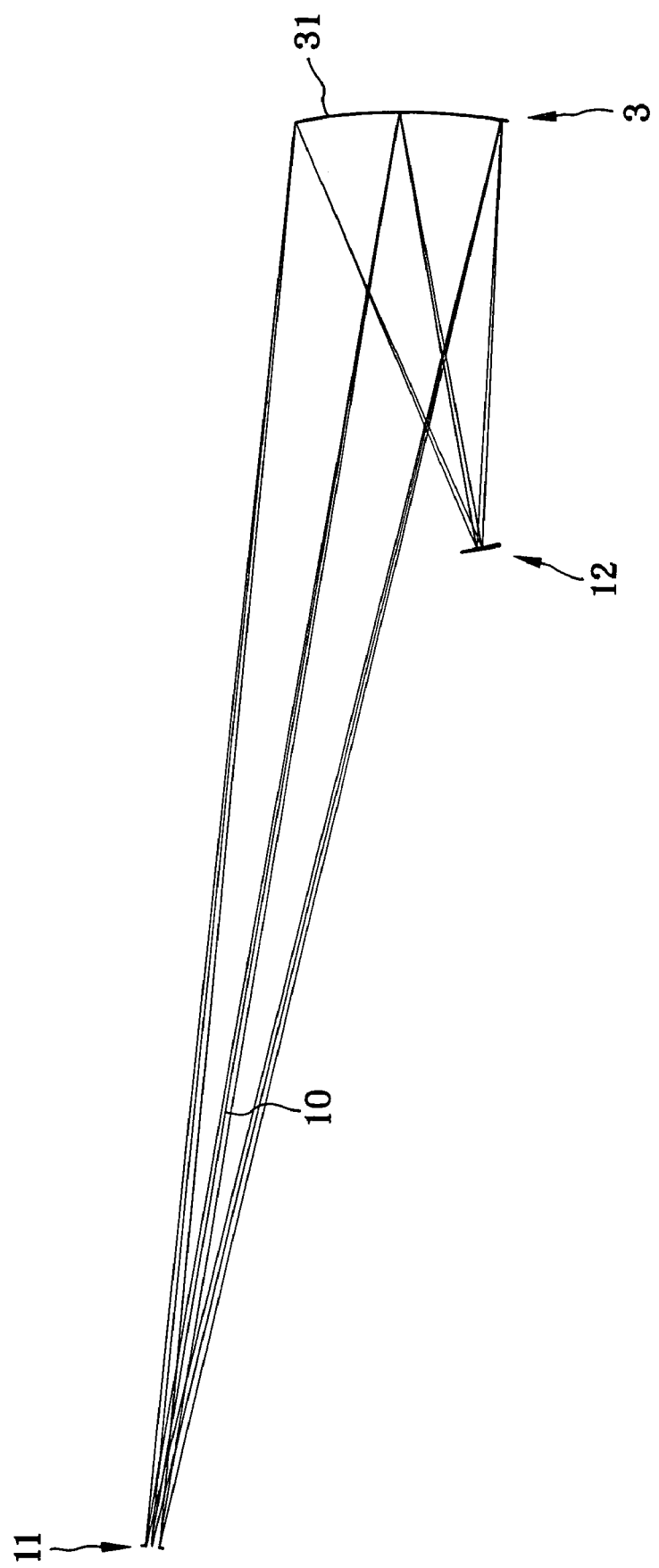
FIG. 16 is an optical path diagram for the eyepiece optical system in Example 1 of the invention, inclusive of its optical axis.
Figure 17:
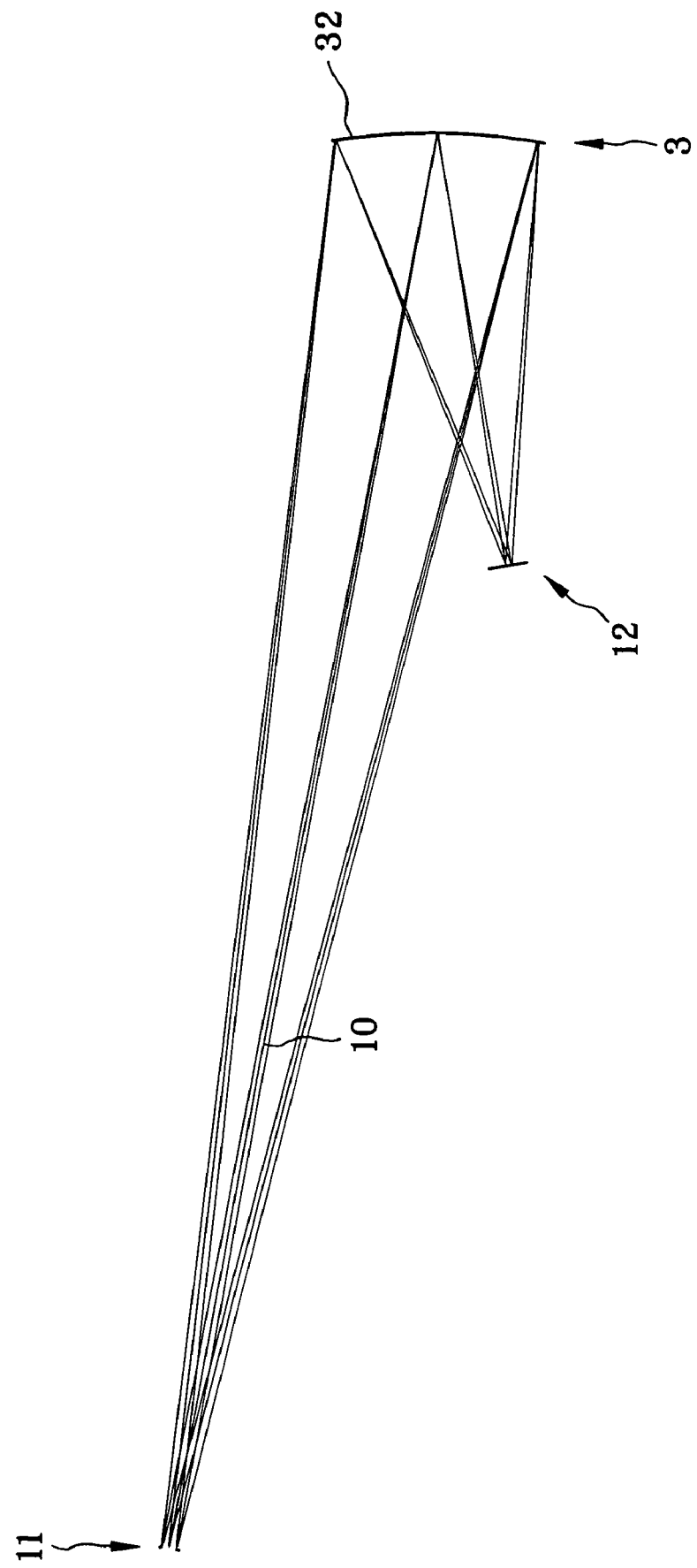
FIG. 17 is an optical path diagram for the eyepiece optical system in Example 2 of the invention, inclusive of its optical axis.
Figure 18:
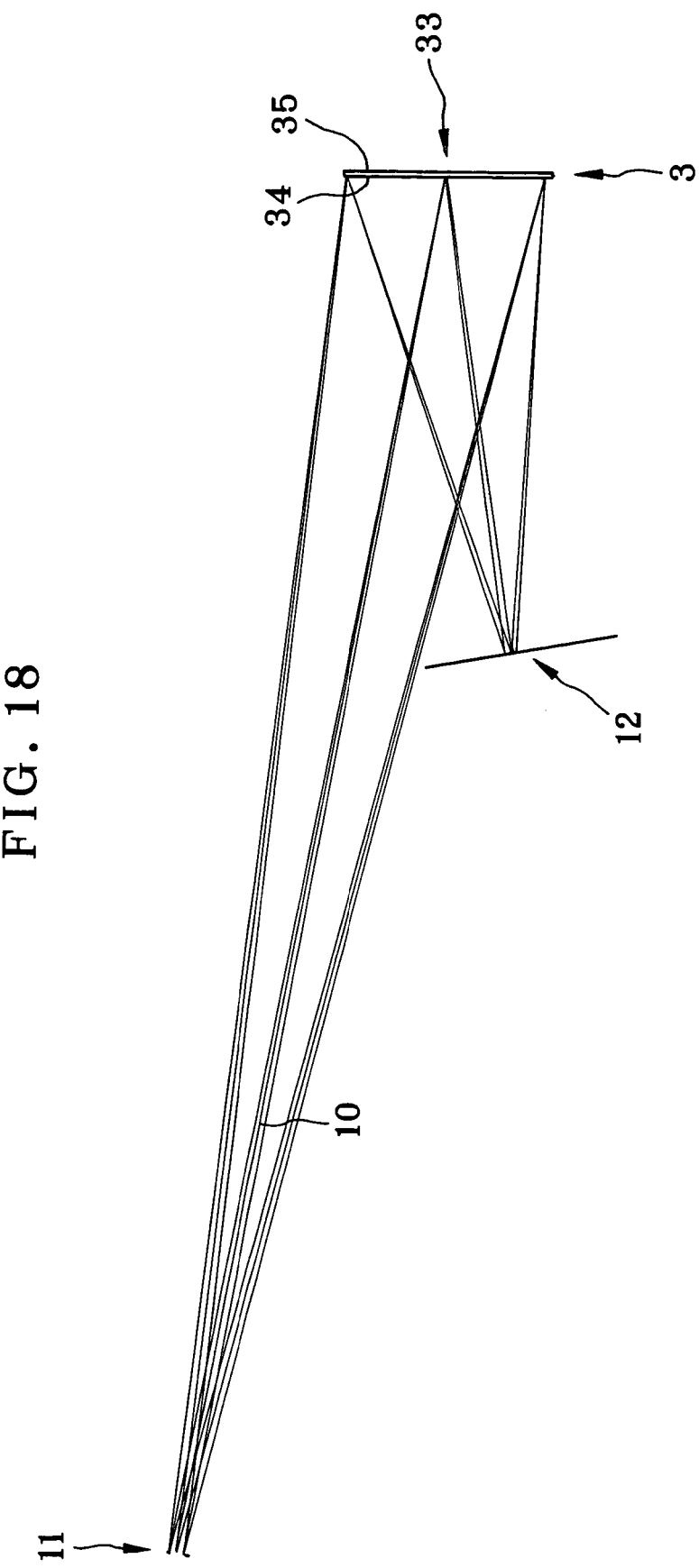
FIG. 18 is an optical path diagram for the eyepiece optical system in Example 3 of the invention, inclusive of its optical axis.

First, examples of the eyepiece optical system 3 are given. The eyepiece optical system 3 used with the projection type optical system of the invention is embodied as in Examples 1 to 3. Optical path diagrams for the respective examples are shown in FIGS. 16 to 18. In each example, ray tracing is carried out in the form of back tracing from a surface 11 (object plane) to a surface 12 (image plane). Here the surface 11 corresponds to the pupil position of the viewer, and the surface 12 corresponds to the position of the exit pupils of the projection optical system. It is noted that in a practical embodiment of the projection viewing system, a diffusing surface having a diffusing action or a diffusing plate having a diffusing action is located in the vicinity of the eyepiece optical system. In Examples 1 to 3 given below, however, it is presumed that there is neither any diffusing plate nor any diffusing surface.

Each surface is expressed in terms of the amount of decentration from a reference eyepiece optical system 3, and the diffusing surface having a diffusing action is to be located in the vicinity of the surface of the eyepiece optical system 3.

In any case, the size of the screen (the eyepiece optical system) is 162.56×121.92 mm.

EXAMPLE 1

As shown in FIG. 16, an anamorphic reflecting mirror 31 is constructed as the eyepiece optical system 3.

EXAMPLE 2

As shown in FIG. 17, a reflecting surface 32 defined by a free-form surface is constructed as the eyepiece optical system 3.

EXAMPLE 3

As shown in FIG. 18, a Fresnel back-surface mirror 33 is constructed as the eyepiece optical system 3. The Fresnel back-surface mirror 33 has an entrance surface 34 defined by a plane and a back surface 35 defined by a Fresnel reflecting surface.

Construction parameters for Examples 1-3 will be given later.

Figure 19:
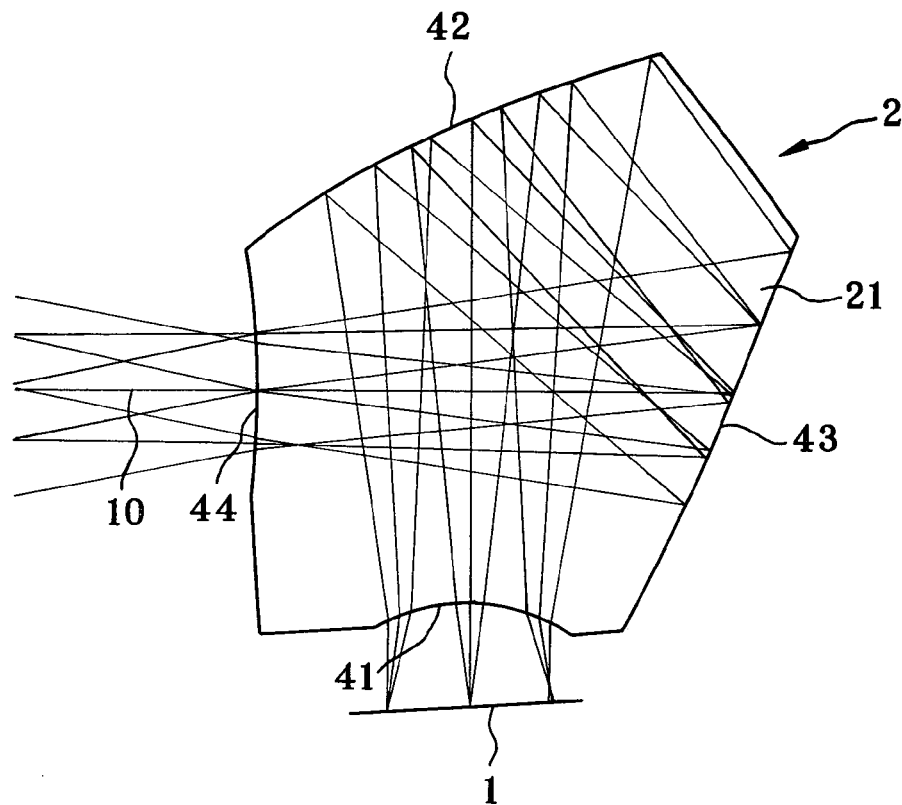
FIG. 19 is an optical path diagram for the projection optical system in Example 4 of the invention.
Figure 20:
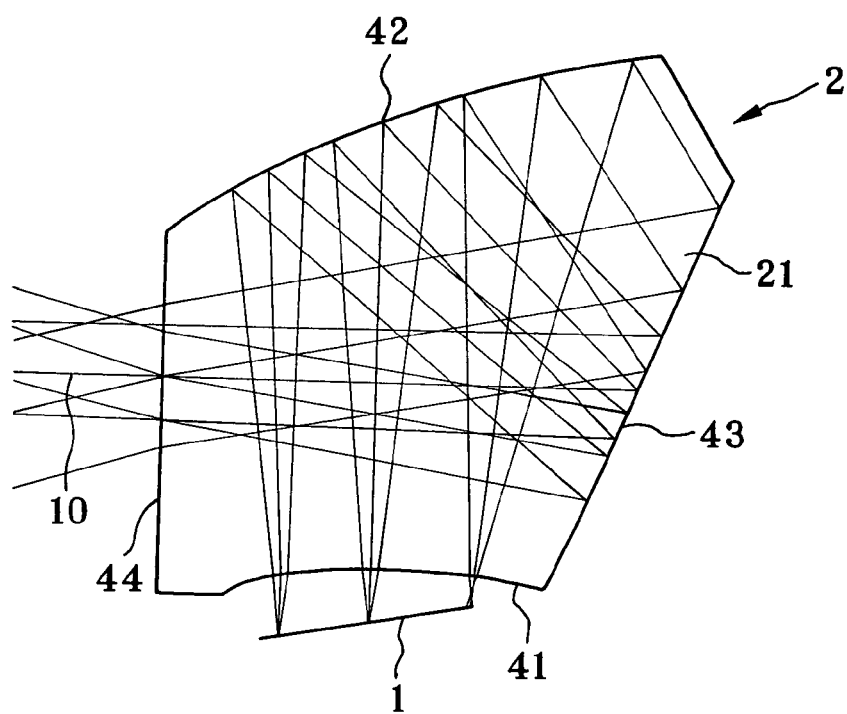
FIG. 20 is an optical path diagram for the projection optical system in Example 5 of the invention.
Figure 21:
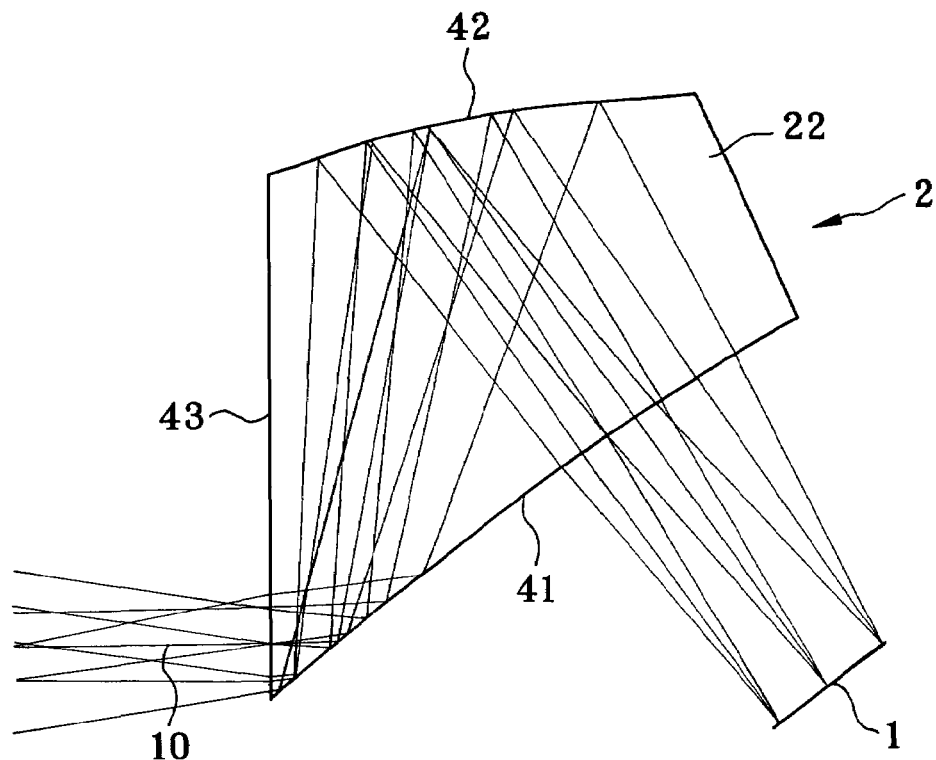
FIG. 21 is an optical path diagram for the projection optical system in Example 6 of the invention.

Examples of the projection optical system 2 are given. The projection optical system used with the projection viewing system of the invention is embodied as in Examples 4, 5 and 6. Optical path diagrams for the respective examples are shown in FIGS. 19-21. In Examples 4, 5 and 6, back ray tracing is carried out; that is, rays are traced from a projection plane for an image under observation toward a display device 1. It is noted that the projection plane for the image under observation is an image plane virtually located in the vicinity of an eyepiece optical system 3, and a diffusing plate is disposed in the vicinity of the projection plane.

For ray tracing, this projection plane is defined as an object plane and the surface of the display device 1 as an image plane. A stop surface corresponds to an exit pupil 6' of the projection optical system 2 (FIG. 5). A light ray passing through the center of the projection plane (object plane) and the center of the stop surface (the surface of the exit pupil of the projection optical system 2) is defined as an axial chief ray 10. An angle that the axial chief ray 10 subtends a perpendicular to the projection plane is 31.47°. In the following Examples 4, 5 and 6, this value may be found from decentration (1) in the numerical data given later as well as α and β.

EXAMPLE 4

As shown in FIG. 19, a projection optical system 2 is built up of a decentered prism 21 comprising four surfaces, i.e., a first surface 41, a second surface 42, a third surface 43 and a fourth surface 44. In Example 4, a light beam from a display device 1 enters the prism via the first surface 41, and leaves the prism via the fourth surface 44 upon internal reflection at the second surface 42 and the third surface 43 in this order, projecting an image appearing on the display device 1 near to an eyepiece optical system 3 (not shown). The surfaces of the decentered prism 21 are located such that, in the prism 21, a light beam from the first surface 41 toward the second surface 42 crosses a light beam from the third surface 43 toward the fourth surface 44. In the instant example, the fourth surface 44 is made up of a spherical surface, and the first surface 41, the second surface 42 and the third surface 43 are each made up of a free-form surface. The decentered prism 21 is a three-dimensionally decentered prism having no plane of symmetry.

Upon back ray tracing in the instant example, an object height is 162.50×121.92 mm, an entrance pupil diameter is φ5.0 mm, and an image height is 8.94×6.76 mm.

EXAMPLE 5

As shown in FIG. 20, a projection optical system 2 is built up of a decentered prism 21 comprising four surfaces, i.e., a first surface 41, a second surface 42, a third surface 43 and a fourth surface 44. In Example 5, a light beam from a display device 1 enters the prism via the first surface 41, and leaves the prism via the fourth surface 44 upon internal reflection at the second 42 and the third surface 43 in this order, projecting an image appearing on the display device 1 near to an eyepiece optical system 3 (not shown). The surfaces of the decentered prism 21 are located such that, in the prism 21, a light beam from the first surface 41 toward the second surface 42 crosses a light beam from the third surface 43 toward the fourth surface 44. In the instant example, the first surface 41, the second surface 42, the third surface 43 and the fourth surface 44 are each made up of a free-form surface, and the decentered prism 21 is a two-dimensionally decentered prism having one plane of symmetry.

Upon back ray tracing in the instant example, an object height is 162.50×121.92 mm, an entrance pupil diameter is φ5.0 mm, and an image height is 8.94×6.76 mm.

EXAMPLE 6

As shown in FIG. 21, a projection optical system 2 is built up of a decentered prism 22 comprising three surfaces, i.e., a first surface 41, a second surface 42 and a third surface 43. In Example 6, a light beam from a display device 1 enters the prism via the first surface 41, and is internally reflected at the second surface 42. Then, the reflected light reenters the first surface 41 at which it is totally reflected, and the reflected light leaves the prism via the third surface 33, projecting an image appearing on the display device 1 near to an eyepiece optical system 3 (not shown). In the decentered prism 22, the first surface 41 serves not only as an entrance surface but also as a second reflecting surface. In the instant example, the first surface 41, the second surface 42 and the third surface 43 are each formed of a free-form surface, and the decentered prism 22 is a two-dimensionally decentered prism having one plane of symmetry.

Upon back ray tracing in the instant example, an object height is 162.50×121.92 mm, an entrance pupil diameter is φ5.0 mm, and an image height is 8.94×6.76 mm.

Next, Examples 7, 8, 9 and 10 of a combined optical system comprising a concave mirror 24 for the magnification and projection of an exit pupil of a projection optical system 2 and a transmission type hologram diffusing plate 25. In any case, the concave mirror 24 is made up of a Fresnel concave reflecting mirror 24'. In each example, ray tracing is carried out in the form of normal ray tracing from the center of the exit pupil 16 of the projection optical system 2 to an exit pupil 60 of the viewing system while the exit pupil 16 of the projection optical system 2 (corresponding to the exit pupil 6' (FIG. 5)) is defined as an object plane and the exit pupil of the viewing system (a magnified exit pupil image of the exit pupil 16) 60 as an image plane.

EXAMPLE 7

Figure 24:
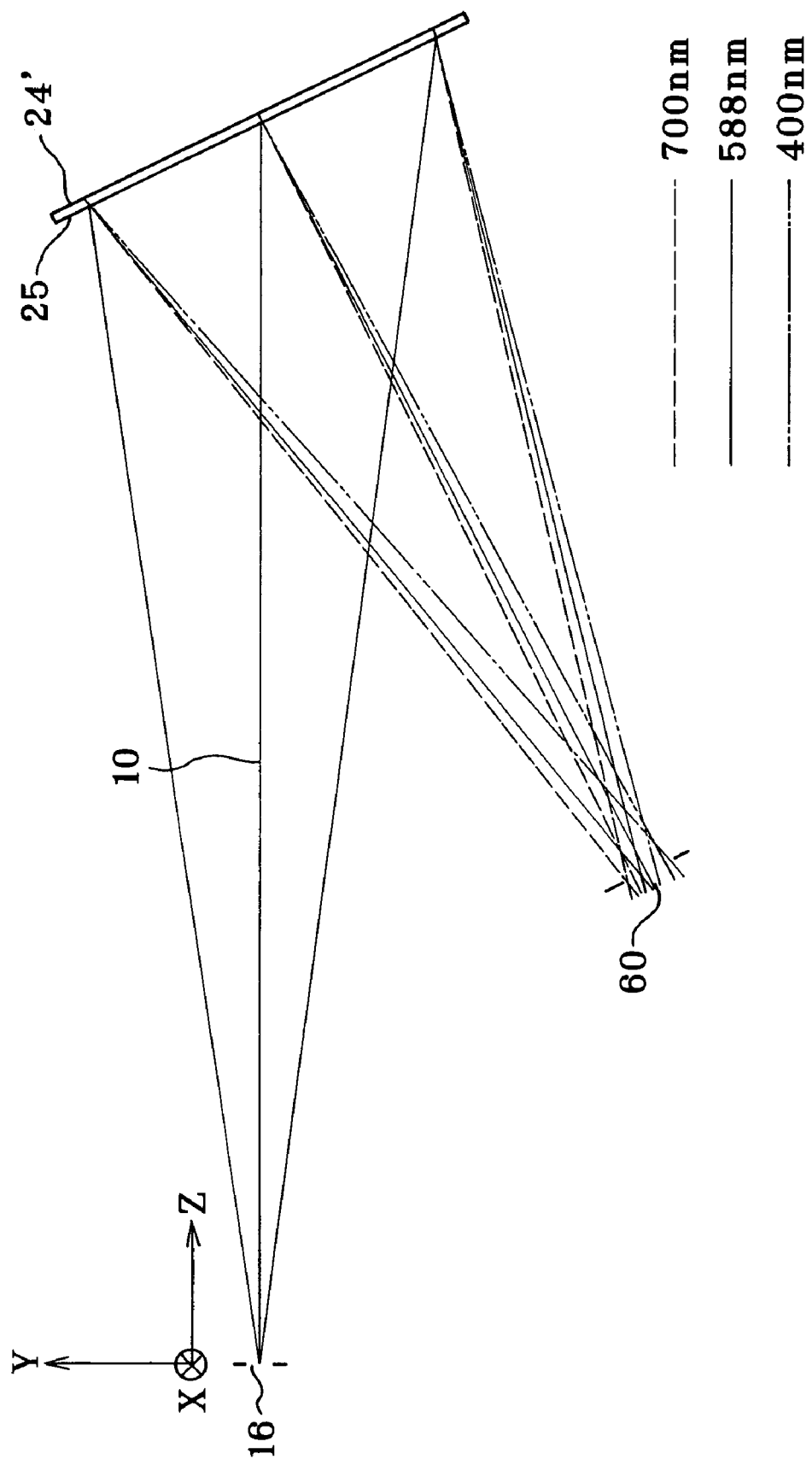
FIG. 24 is an optical path diagram illustrative in Y-Z section of Example 7 of the invention.
Figure 25:
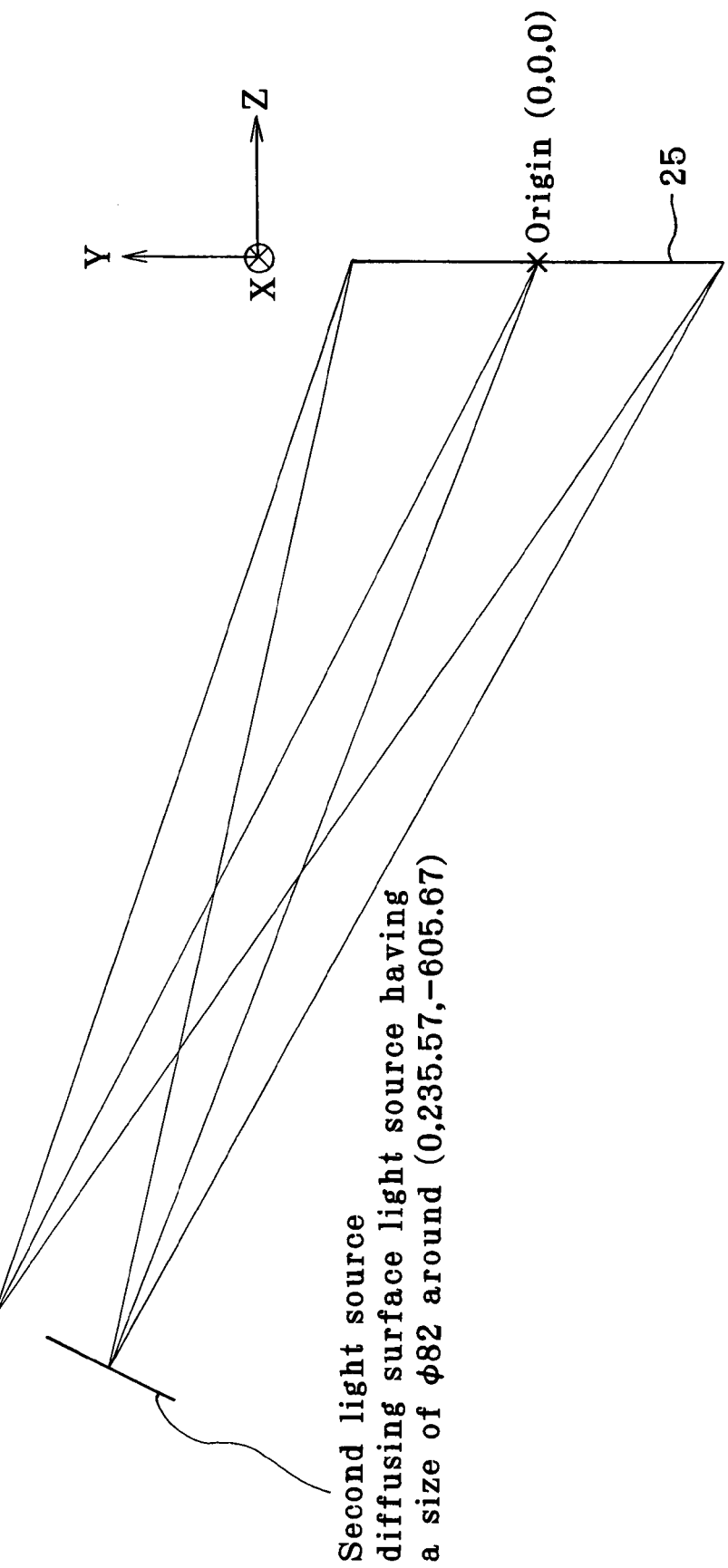
FIG. 25 is illustrative of how to fabricate a transmission type hologram used as the diffusing plate in Example 7 of the invention.
Figure 26:
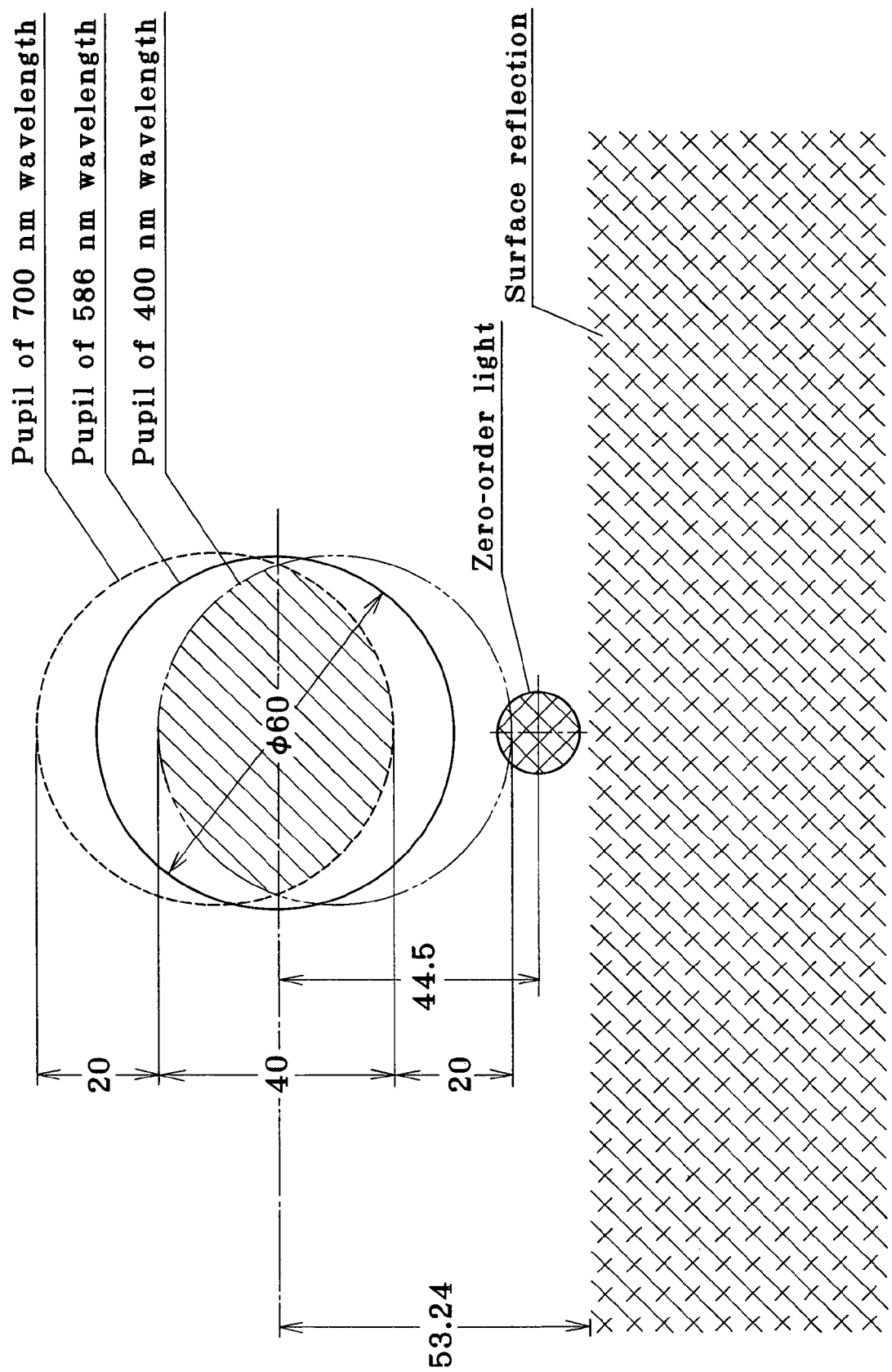
FIG. 26 is illustrative of to what degree RGB exit pupil images overlap at the position of the exit pupil of Example 7 and the positions of incidence of zero-order light and surface reflected light.

An optical path diagram in Y-Z section for this example is illustrated in FIG. 24. FIG. 25 is illustrative of how to fabricate a transmission type hologram used as a transmission type hologram diffusing plate 25 in this example. FIG. 26 is illustrative of to what degree exit pupil images overlap at the position of an exit pupil 60 in this example, and the positions of incidence of zero-order light and surface reflected light. The exit pupil images are those at 400 nm wavelength, 586 nm wavelength and 700 nm wavelength. In FIGS. 25 and 26, the numeral values are given in mm.

In Example 7 corresponding to FIG. 13(b), the condition regarding the angle of incidence of reconstruction light is satisfied upon the first incidence, and no diffraction occurs upon the second incidence. The direction of flexion of light through the hologram diffusing plate 25 is such that the angle of diffraction becomes small with respect to the angle of incidence to normal. A Fresnel concave reflecting surface 24' is made up of a Fresnel back-surface mirror. Here let MY represent the amount of decentration of the Fresnel back-surface mirror, represent the angle of deflection of an axial chief ray 10 through the hologram diffusing plate 25, and β represent the angle of incidence of light on the Fresnel concave reflecting mirror 24'. Then, MY=89.27 mm γ=13.15° (in a vitreous material having a refractive index of 1.49)

β=7.02° (in a vitreous material having a refractive index of 1.49)

Exposure conditions for the hologram diffusing plate 25 in this example are illustrated in FIG. 25, wherein the origin is defined by the point of incidence of an axial chief ray 10 on the surface of the hologram diffusing plate 25. Referring here to a coordinate system for exposure, a hologram surface is defined by an X-Y plane and a Z-axis is defined by a direction going away from the exit pupil 16 of a projection optical system 2. The first light source position (X1, Y1, Z1) for exposure is determined as follows, provided that the light source is given by a point light source.

(X1, Y1, Z1)=(0, 297.11, −578.12)

The second light source position (X2, Y2, Z2) is determined as follows, provided that the second light source is given by a diffusing surface light source having an area of φ82 mm around the light source position.

(X2, Y2, Z2)=(0, 235.57, −605.67)

The transmission type hologram fabricated under the above exposure conditions is used as the diffusing plate 25. A light beam diffused through the hologram diffusing plate 25 is reflected at the Fresnel concave back-surface mirror 24' to form a magnified pupil 60 of φ60 at the pupil plane of the viewer.

EXAMPLE 8

Figure 27:
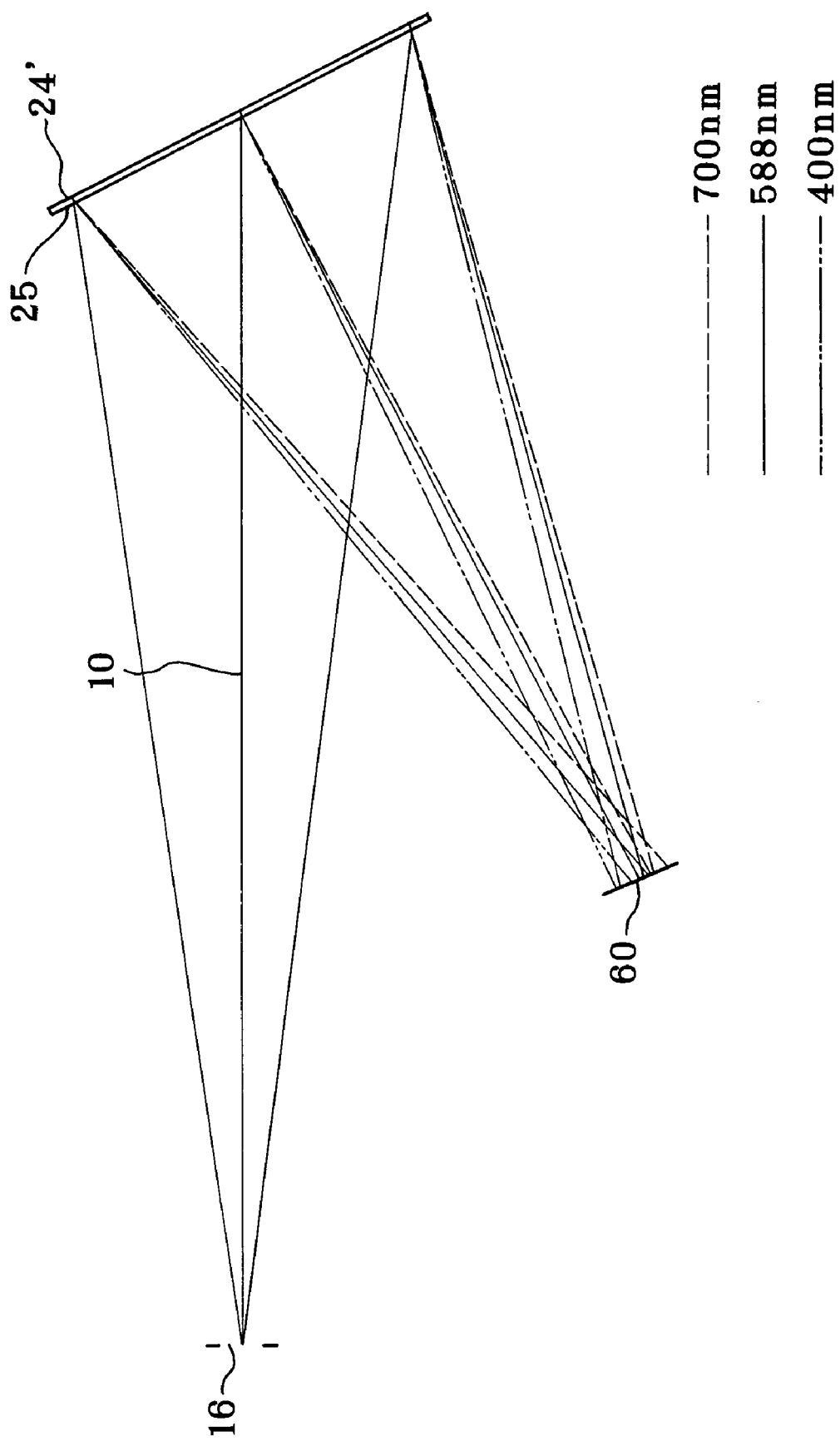
FIG. 27 is an optical path diagram illustrative in Y-Z section of Example 8 of the invention.
Figure 28:
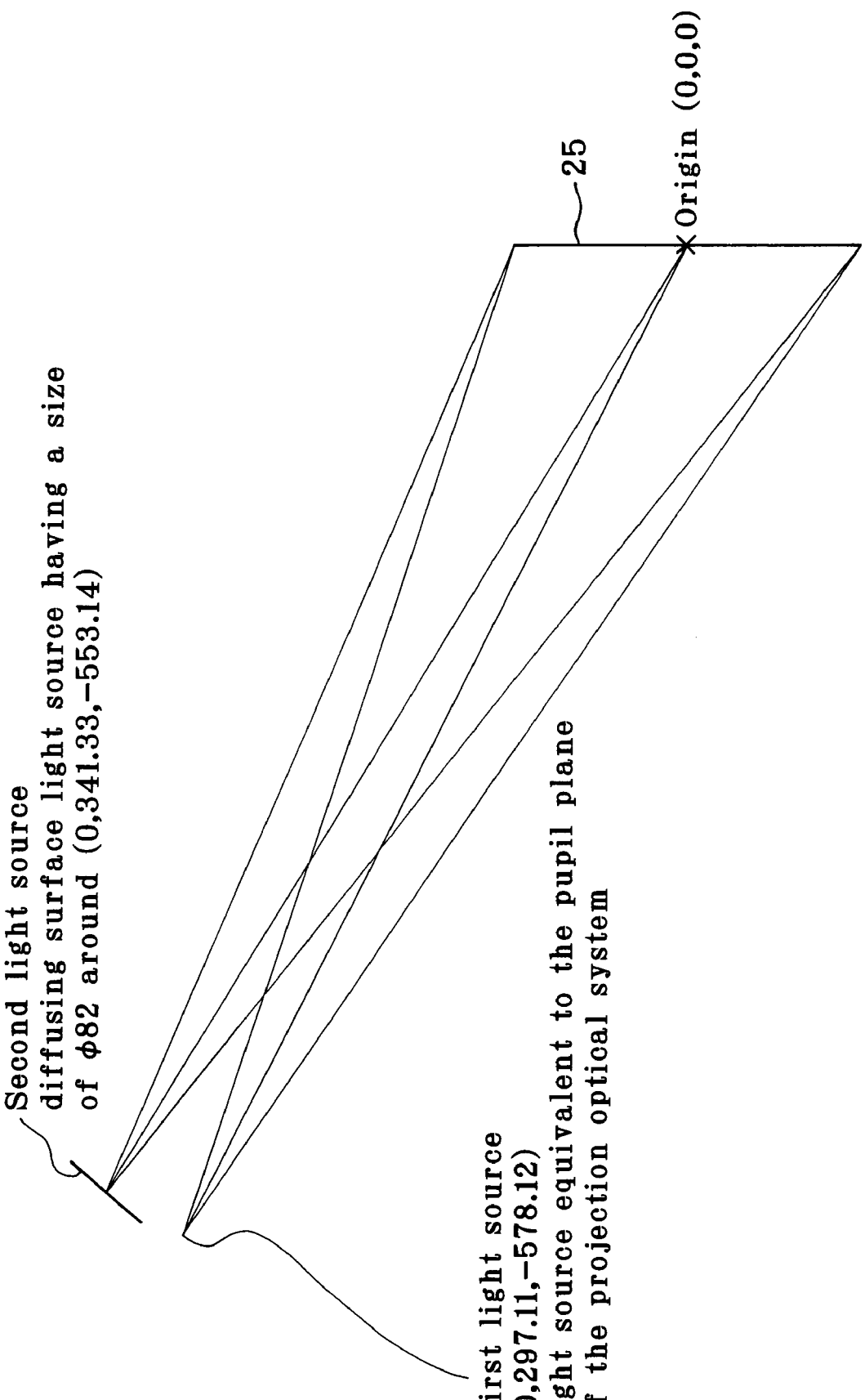
FIG. 28 is illustrative of how to fabricate a transmission type hologram used as the diffusing plate in Example 8 of the invention.
Figure 29:
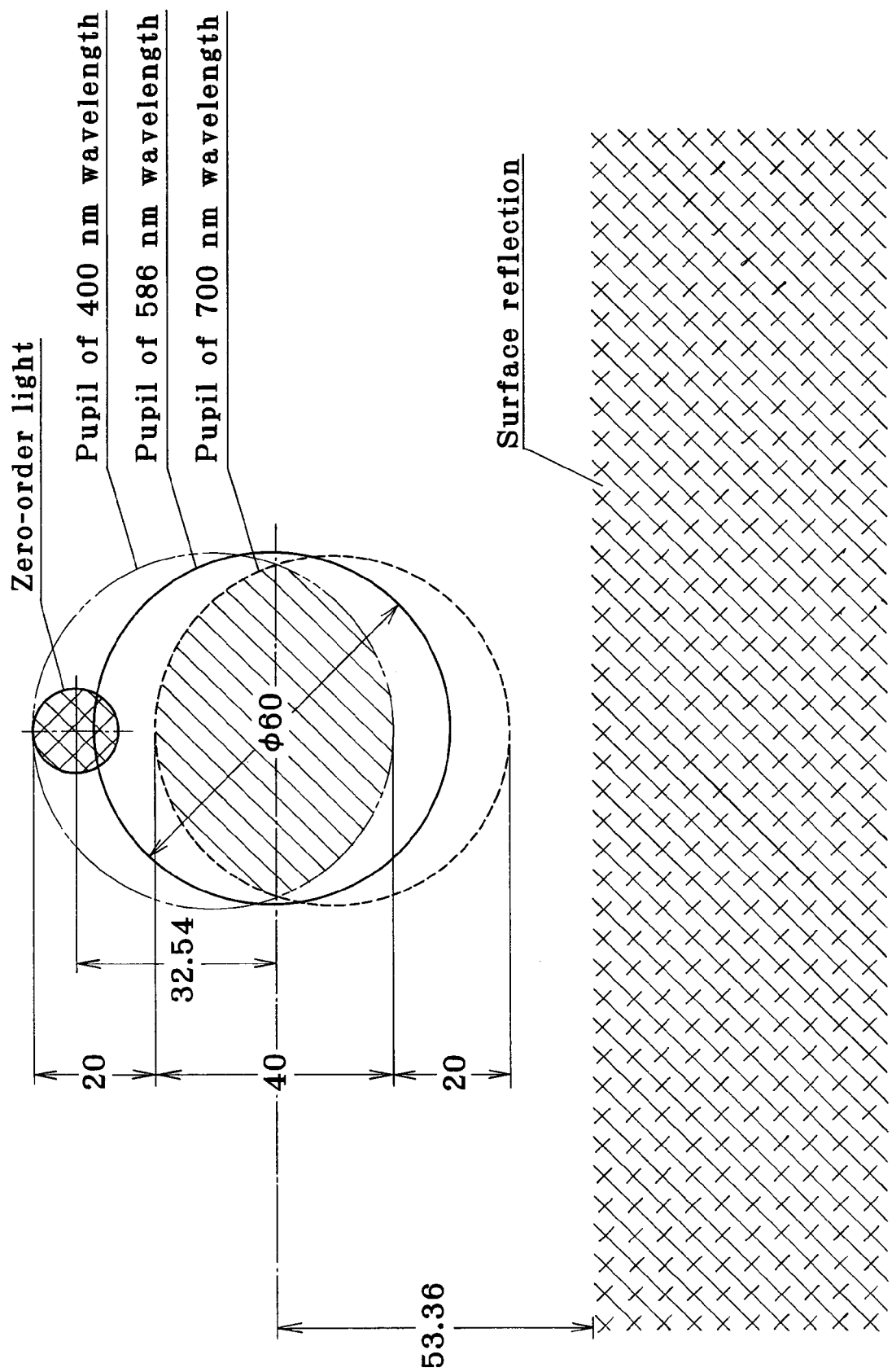
FIG. 29 is illustrative of to what degree RGB exit pupil images overlap at the position of the exit pupil of Example 8 and the positions of incidence of zero-order light and surface reflected light.

An optical path diagram in Y-Z section for this example is illustrated in FIG. 27. FIG. 28 is illustrative of how to fabricate a transmission type hologram used as a diffusing plate 25 in this example. FIG. 29 is illustrative of to what degree exit pupil images overlap at the position of an exit pupil 60 in this example, and the positions of incidence of zero-order light and surface reflected light. The exit pupil images are those at 400 nm wavelength, 586 nm wavelength and 700 nm wavelength. In FIGS. 28 and 29, the numeral values are given in mm.

In Example 8 corresponding to FIG. 13(c), the condition regarding the angle of incidence of reconstruction light is satisfied upon the first incidence, and no diffraction occurs upon the second incidence. The direction of flexion of light through the hologram diffusing plate 25 is such that the angle of diffraction becomes large with respect to the angle of incidence to normal. A Fresnel concave reflecting surface 24' is made up of a Fresnel back-surface mirror. Here let MY represent the amount of decentration of the Fresnel back-surface mirror, γ represent the angle of deflection of an axial chief ray 10 through the hologram diffusing plate 25, and β represent the angle of incidence of light on the Fresnel concave reflecting mirror 24'. Then, MY=130.46 mm γ=6.61° (in a vitreous material having a refractive index of 1.49)

β=10.29° (in a vitreous material having a refractive index of 1.49)

Exposure conditions for the hologram diffusing plate 25 in this example are illustrated in FIG. 28, wherein the origin is defined by the point of incidence of an axial chief ray 10 on the surface of the hologram diffusing plate 25. Referring here to a coordinate system for exposure, the hologram surface is defined by an X-Y plane and a Z-axis is defined by a direction going away from the exit pupil 16 of a projection optical system 2.

The first light source position (X1, Y1, Z1) for exposure is determined as follows, provided that the light source is given by a point light source.

(X1, Y1, Z1)=(0, 297.11, −578.12)

The second light source position (X2, Y2, Z2) is determined as follows, provided that the second light source is given by a diffusing surface light source having an area of φ82 mm around the light source position.

(X2, Y2, Z2)=(0, 341.33, −553.14)

The transmission type hologram fabricated under the above exposure conditions is used as the hologram diffusing plate 25. The light beam diffused through the hologram diffusing plate 25 is reflected at the Fresnel concave back-surface mirror 24' to form a magnified pupil 60 of φ60 at the pupil plane of the viewer.

EXAMPLE 9

Figure 30:
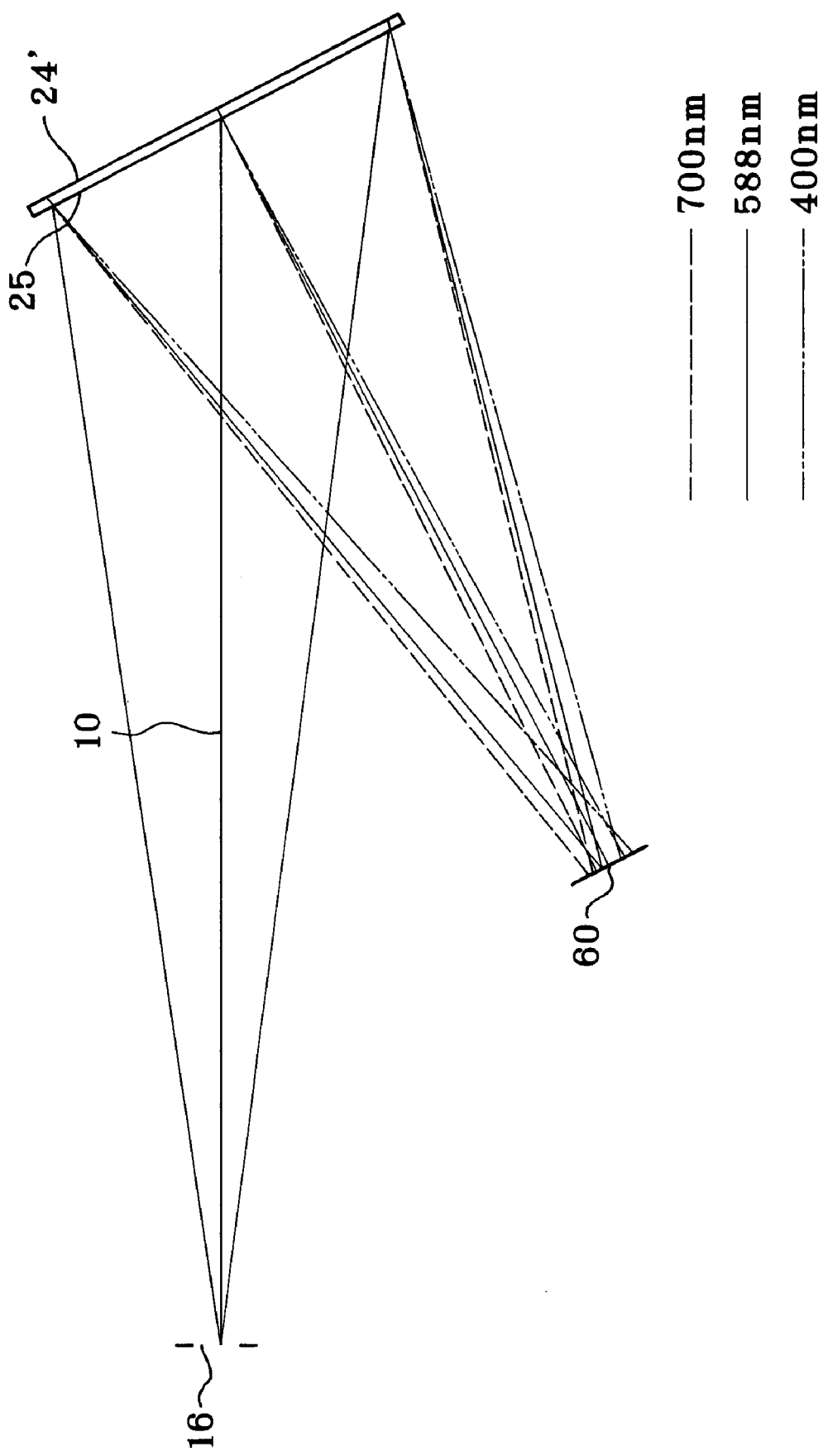
FIG. 30 is an optical path diagram illustrative in Y-Z section of Example 9 of the invention.
Figure 31:
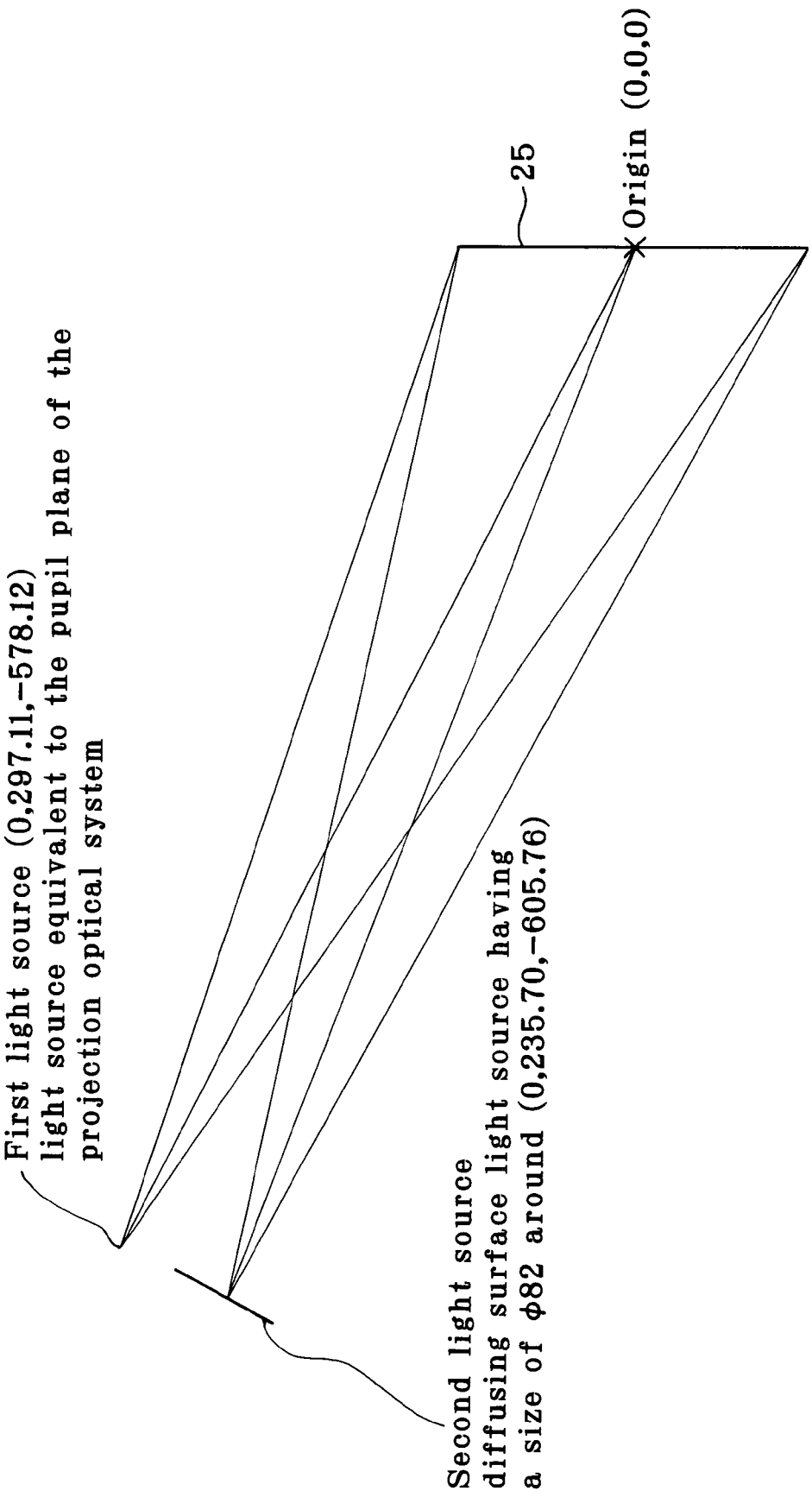
FIG. 31 is illustrative of how to fabricate a transmission type hologram used as the diffusing plate in Example 9 of the invention.
Figure 32:
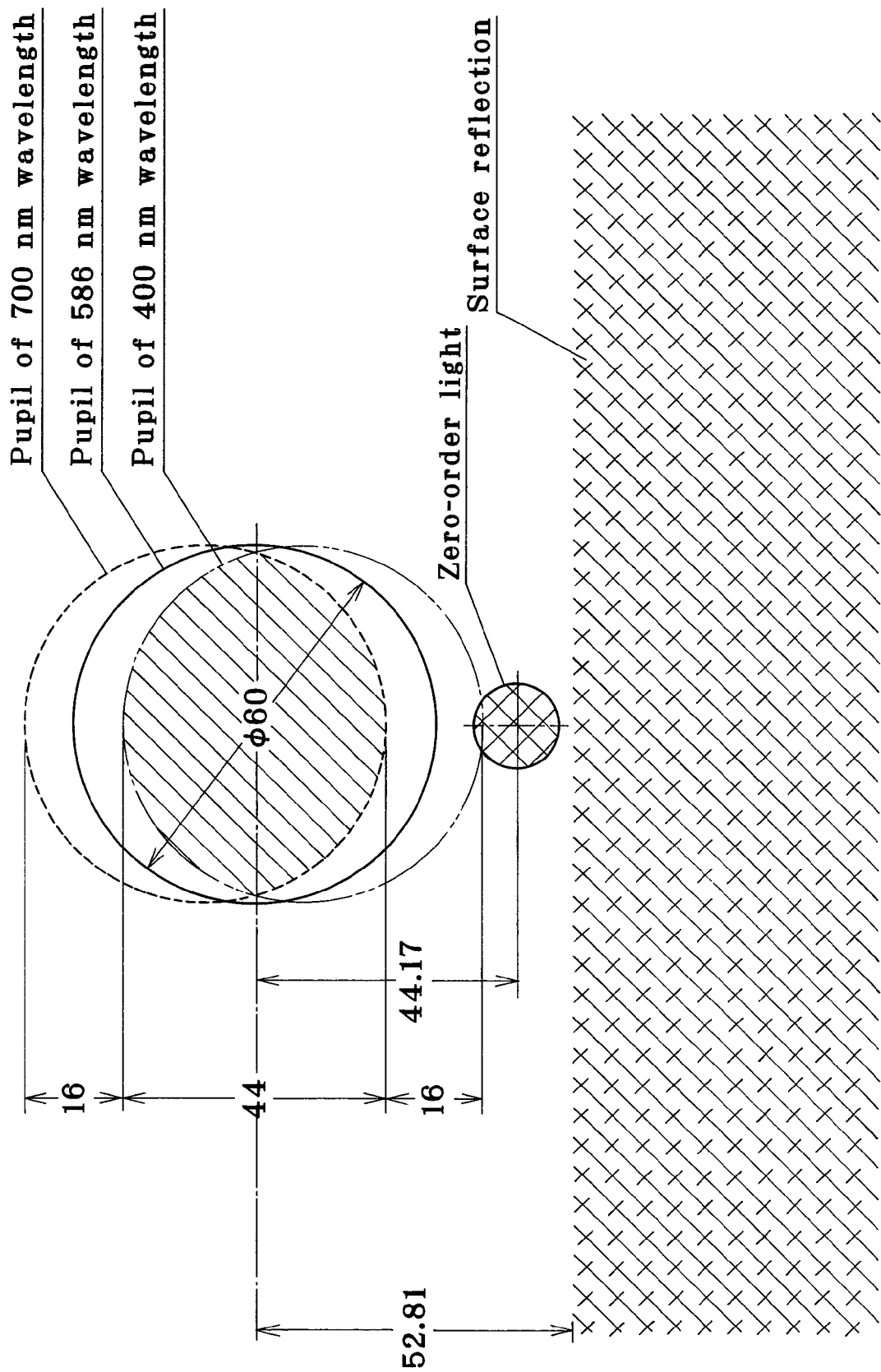
FIG. 32 is illustrative of to what degree RGB exit pupil images overlap at the position of the exit pupil of Example 9 and the positions of incidence of zero-order light and surface reflected light.

An optical path diagram in Y-Z section for this example is illustrated in FIG. 29. FIG. 30 is illustrative of how to fabricate a transmission type hologram used as a diffusing plate 25 in this example. FIG. 31 is illustrative of to what degree exit pupil images overlap at the position of an exit pupil 60 in this example, and the positions of incidence of zero-order light and surface reflected light. The exit pupil images are those at 400 nm wavelength, 586 nm wavelength and 700 nm wavelength. In FIGS. 31 and 32, the numeral values are given in mm.

In Example 9 corresponding to FIG. 13(b), the condition regarding the angle of incidence of reconstruction light is satisfied upon the first incidence, and no diffraction occurs upon the second incidence. The direction of flexion of light through the hologram diffusing plate 25 is such that the angle of diffraction becomes small with respect to the angle of incidence to normal. A Fresnel concave reflecting surface 24' is made up of a Fresnel back-surface mirror. Here let MY represent the amount of decentration of the Fresnel back-surface mirror, γ represent the angle of deflection of an axial chief ray 10 through the hologram diffusing plate 25, and β represent the angle of incidence of light on the Fresnel concave reflecting mirror 24'. Then, MY=90.64 mm γ=14.28° (in a vitreous material having a refractive index of 1.62)

β=6.46° (in a vitreous material having a refractive index of 1.62)

Exposure conditions for the hologram diffusing plate 25 in this example are illustrated in FIG. 31, wherein the origin is defined by the point of incidence of an axial chief ray 10 on the surface of the hologram diffusing plate 25. Referring here to a coordinate system for exposure, a hologram surface is defined by an X-Y plane and a Z-axis is defined by a direction going away from the exit pupil 16 of a projection optical system 2.

The first light source position (X1, Y1, Z1) for exposure is determined as follows, provided that the light source is given by a point light source.

(X1, Y1, Z1)=(0, 297.11, −578.12)

The second light source position (X2, Y2, Z2) is determined as follows, provided that the second light source is given by a diffusing surface light source having an area of φ82 mm around the light source position.

(X2, Y2, Z2)=(0, 235.70, −605.76)

The transmission type hologram fabricated under the above exposure conditions is used as a hologram diffusing plate 25. The light beam diffused through the hologram diffusing plate 25 is reflected at the Fresnel concave back-surface mirror 24' to form a magnified pupil 60 of φ60 at the pupil plane of the viewer.

EXAMPLE 10

Figure 33:
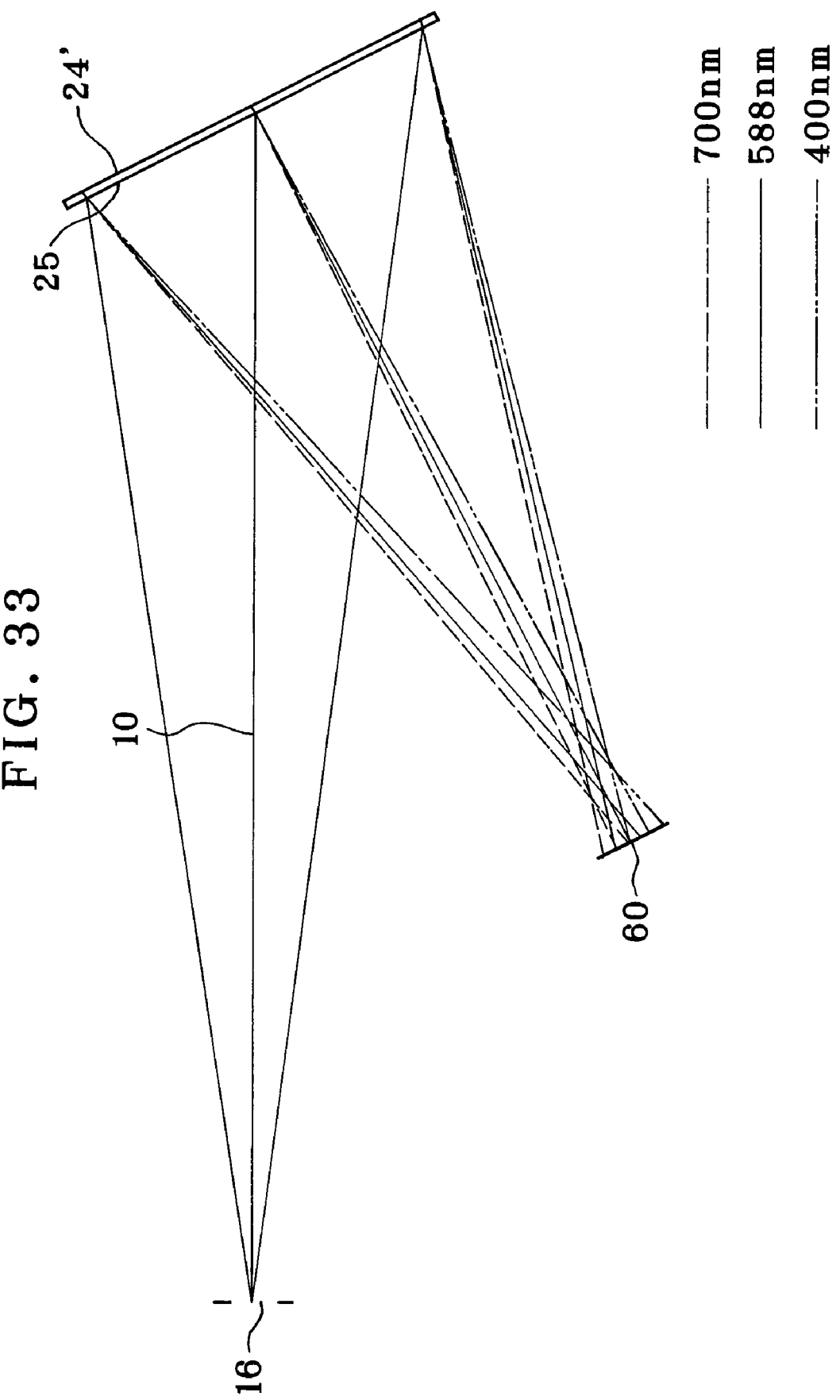
FIG. 33 is an optical path diagram illustrative in Y-Z section of Example 10 of the invention.
Figure 34:
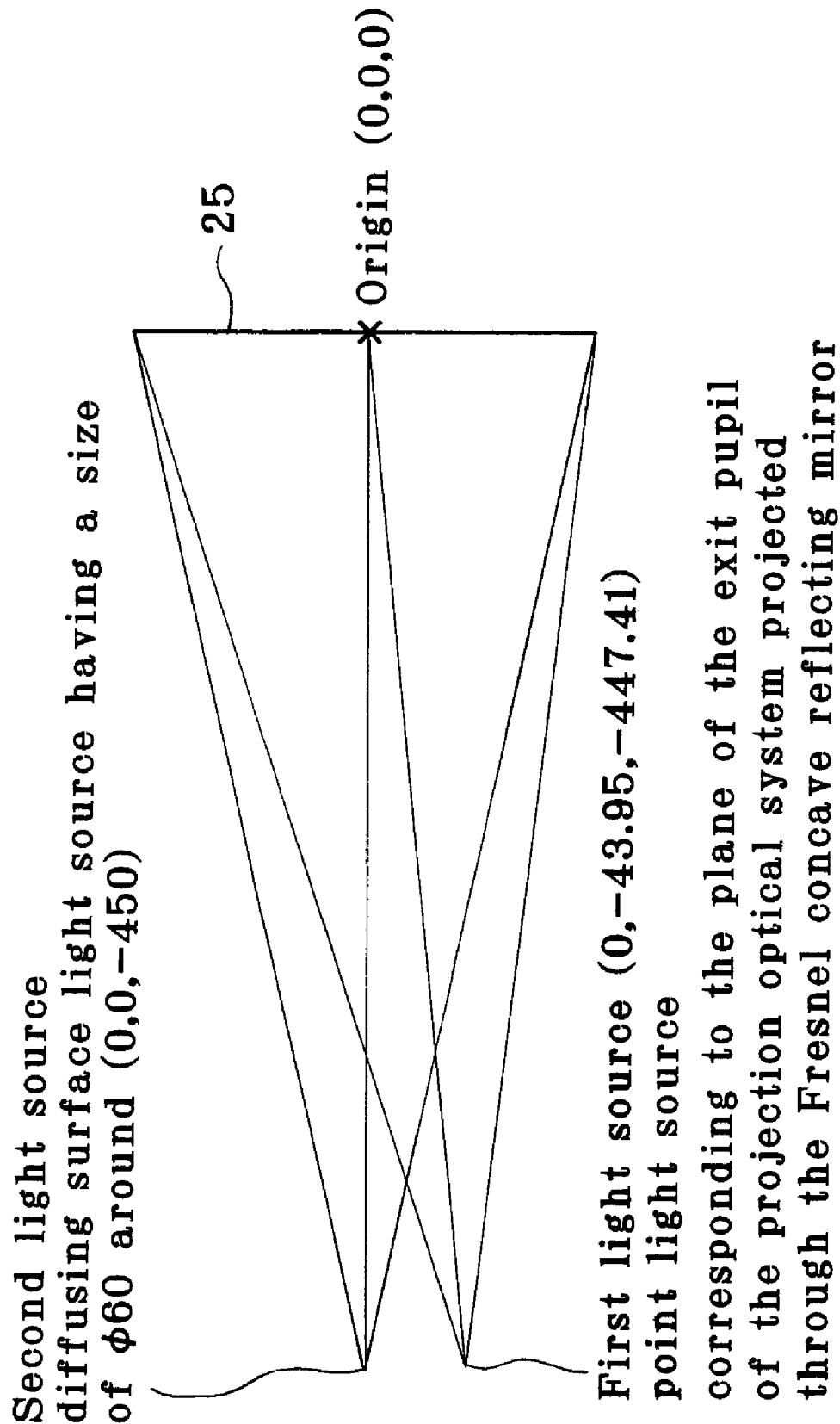
FIG. 34 is illustrative of how to fabricate a transmission type hologram used as the diffusing plate in Example 10 of the invention.
Figure 35:
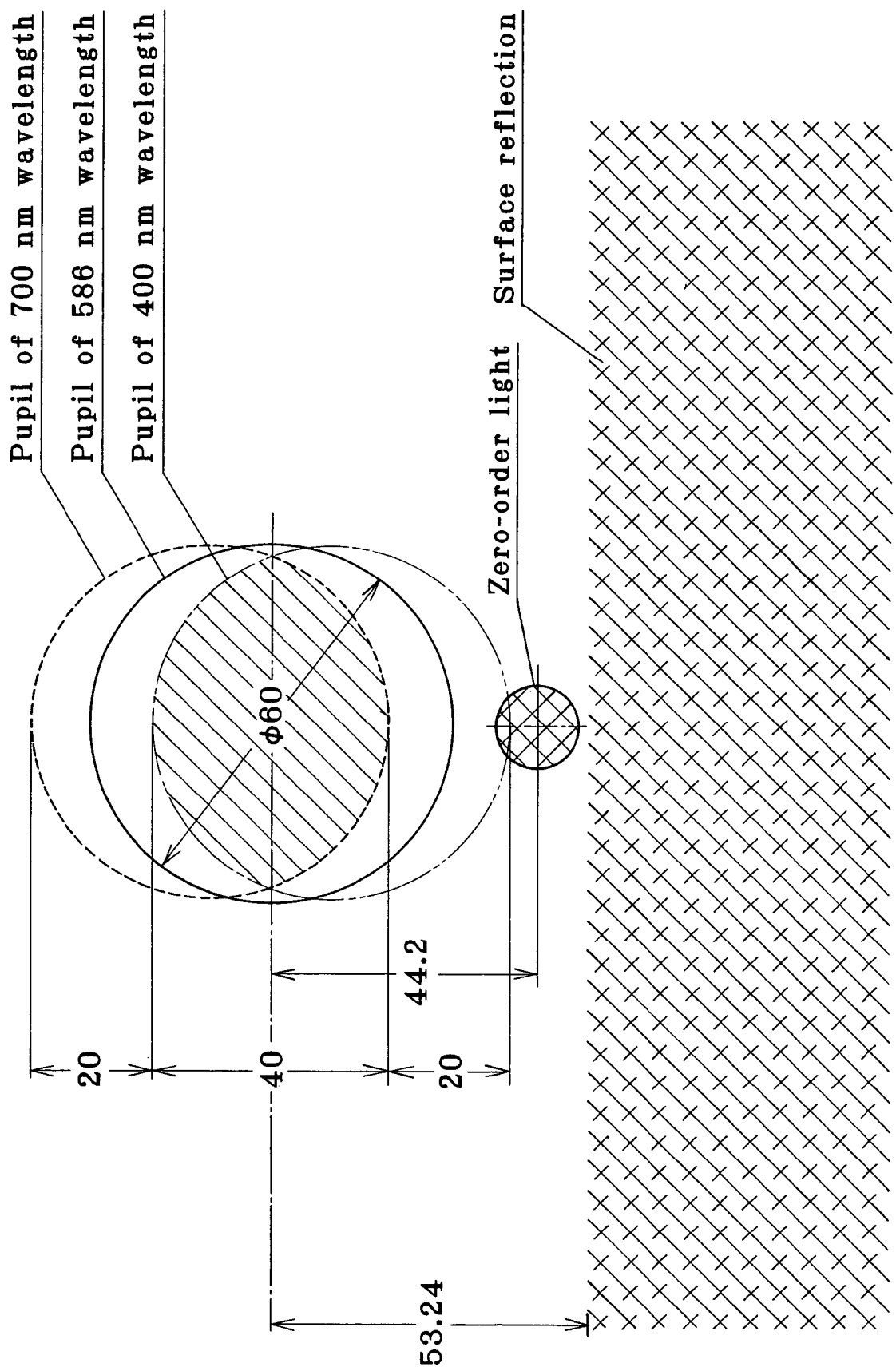
FIG. 35 is illustrative of to what degree RGB exit pupil images overlap at the position of the exit pupil of Example 10 and the positions of incidence of zero-order light and surface reflected light.
Figure 36:
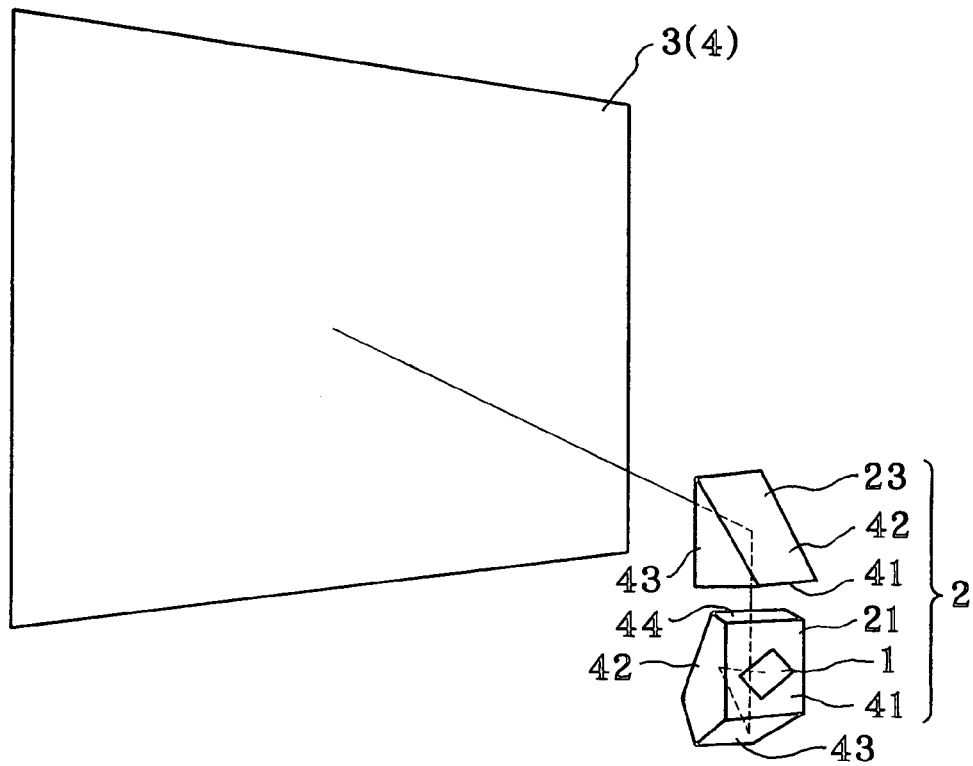
FIG. 36 is illustrative in schematic of the projection viewing system according to Example 11 of the invention.

An optical path diagram in Y-Z section for this example is illustrated in FIG. 33. FIG. 34 is illustrative of how to fabricate a transmission type hologram used as a hologram diffusing plate 25 in this example. FIG. 36 is illustrative of to what degree exit pupil images overlap at the position of an exit pupil 60 in this example, and the positions of incidence of zero-order light and surface reflected light. The exit pupil images are those at 400 nm wavelength, 586 nm wavelength and 700 nm wavelength. In FIGS. 34 and 35, the numeral values are given in mm.

In Example 10 corresponding to FIG. 14(*a*), the condition regarding the angle of incidence of reconstruction light is satisfied upon the second incidence, and no diffraction occurs upon the first incidence. The direction of flexion of light through the hologram diffusing plate 25 is such that the angle of diffraction becomes small with respect to the angle of incidence to normal. A Fresnel concave reflecting surface 24' is made up of a Fresnel back-surface mirror. Here let MY represent the amount of decentration of the Fresnel back-surface mirror, γ represent the angle of deflection of an axial chief ray 10 through the hologram diffusing plate 25, and β represent the angle of incidence of light on the Fresnel concave reflecting mirror 24'. Then, MY=89.27 mm γ=3.76° (in a vitreous material having a refractive index of 1.49)

β=10.80° (in a vitreous material having a refractive index of 1.49)

Exposure conditions for the hologram diffusing plate 25 in this example are illustrated in FIG. 34, wherein the origin is defined by the point of incidence of an axial chief ray 10 on the surface of the hologram diffusing plate 25. Referring here to a coordinate system for exposure, a hologram surface is defined by an X-Y plane and a Z-axis is defined by a direction going away from the exit pupil 16 of a projection optical system 2.

The first light source position (X1, Y1, Z1) for exposure is determined as follows, provided that the light source is given by a point light source.

(X1, Y1, Z1)=(0, 0, −450)

The second light source position (X2, Y2, Z2) is determined as follows, provided that the second light source is given by a diffusing surface light source having an area of φ60 mm around the light source position.

(X2, Y2, Z2)=(0, −41.73, −424.62)

The transmission type hologram fabricated under the above exposure conditions is used as the hologram diffusing plate 25. After reflected at the Fresnel concave reflecting mirror 24', the light beam is diffused through the hologram diffusing plate 25 to form a magnified pupil 60 of φ60 at the pupil plane of the viewer.

In Examples 7-10, at the position of the exit pupil 60 of the system, the difference in the position of incidence between the optical axis of 700 nm wavelength and the optical axis of 400 nm wavelength is not greater than ½ of the diameter of the exit pupil. In other words, the range where RGB pupils overlap is kept wide, and any incidence of zero-order light and surface reflected light at the hologram does not occur within that range. It follows that there is ensured a wide exit pupil range where images can be viewed with high color reproducibility, as can be seen from FIGS. 26, 29, 32 and 35.

Construction parameters in Examples 1-10 are set out below. Here ray tracing is carried out in the form of back ray tracking, as mentioned above. The axial chief ray 10 in Examples 1-3 is defined by a light ray that leaves the center of the object plane 11 and passes through the center of a stop surface (that is located at the position of the entrance surface of the eyepiece optical system 4), arriving at the center of the image plane 12. The axial chief ray 10 in Examples 4-6 is defined by a light ray that propagates from the center of a display screen of the projection optical system 2 through the stop surface (the surface of the exit pupil of the projection optical system 2) to the center of the display device 1. The axial chief ray 10 in Examples 7-10 is defined by a light ray that leaves the center of the exit pupil 16 of the projection optical system 2 and passes through the center of the transmission type hologram diffusing plate 25, arriving at the center of the exit pupil 60 of the system.

In Examples 1-3, back ray tracing is carried out with the origin defined by the center of the stop surface. An X-Y plane is defined by the stop surface, a Z-axis direction is defined by a direction vertical to the stop surface, and a Z-axis positive direction is defined by a direction toward the back surface of the eyepiece optical system 4. In Examples 4-6, normal ray tracing is carried out with the origin defined by the center of the light source 7. A Z-axis positive direction is defined by the direction of propagation of the axial chief ray 10, and a Y-Z plane is defined by the decentered surface of the projection optical system 9. In Examples 6-13, normal ray tracing is carried out with the origin defined by the center of the exit pupil 16 of the projection optical system 2(9). An X-Y plane is defined by the pupil plane, and a Z-axis positive direction is defined by the direction of propagation of the axial chief ray 10 vertical to the pupil.

For the decentered surface, there are given the amount of decentration of its apex from the origin of the optical system and the angles of inclination of its center axis around the X-, Y- and Z-axes (α, β, γ(°)).

Here the amounts of decentration in the X-, Y- and Z-axis directions are referred to as X, Y and Z. The center axis is defined by the Z-axis of the aforesaid formula (a) for the free-form surface, the Z-axis of the following formula (b) for the aspheric surface, and the Z-axis of the following formula (c) for the anamorphic surface.

In that case, the positive for α and β means counterclockwise rotation with respect to the positive direction of the respective axes, and the positive for γ means clockwise rotation with respect to the positive direction of the Z-axis. For α, β and γ rotation of the center axis of the surface, the center axis of the surface and its XYZ orthogonal coordinate system are first counterclockwise rotated around the X-axis by α. Then, the center axis of the rotated surface is counterclockwise rotated around the Y-axis of a new coordinate system by β while the once rotated coordinate system is counterclockwise rotated around the Y-axis by β. Then, the center axis of the twice rotated surface is clockwise rotated around the Z-axis of a new coordinate system by γ.

The surface shape of the free-form surface used herein, for instance, is defined by formula (a) in Patent Publication 3 (Patent Publication 4), and the Z-axis of the defining formula (a) gives the axis of the free-form surface.

The aspheric surface is a rotationally symmetric aspheric surface given by the following defining formula:

$$Z=(Y^2/R)/[1+\{1-(1+K)Y^2/R^2\}^{1/2}]+AY^4+BY^6+CY^8+DY^{10}+ \quad (b)$$

where Z is an optical axis (axial chief ray) provided that the direction of propagation of light is positive, and Y is in the direction vertical to the optical axis. Here R is a paraxial radius of curvature, K is a conical constant, and A, B, C, D, are the 4th, 6th, 8th and 10th aspheric coefficients.

The shape of the anamorphic surface is given by the following formula while the axis of the anamorphic surface is defined by a straight line that passes through the origin of the surface shape and is vertical to the optical surface.

$$Z = (Cx \cdot X^2 + Cy \cdot Y^2)/\left[1+\{1-(1+Kx)Cx^2 \cdot X^2 - (1+Ky)Cy^2 \cdot Y^2\}^{1/2}\right] +$$

$$\Sigma Rn\{(1-Pn)X^2 + (1+Pn)Y^2\}^{(n+1)}$$

Here, consider n=4 (fourth-order term) as an example. Upon extended, Z is given by the following formula (c).

$$Z = (Cx \cdot X^2 + Cy \cdot Y^2)/ \quad (c)$$
$$\left[1+\{1-(1+Kx)Cx^2 \cdot X^2 - (1+Ky)Cy^2 \cdot Y^2\}^{1/2}\right] + R1$$
$$\{(1-P1)X^2 + (1+P1)Y^2\}^2 + R2\{(1-P2)X^2 + (1+P2)Y^2\}^3 +$$
$$R3\{(1-P3)X^2 + (1+P3)Y^2\}^4 + R4\{(1-P4)X^2 + (1+P4)Y^2\}^5$$

Here Z is the amount of displacement of the surface shape from a tangent plane to the origin, Cx is a curvature in the X-axis direction, Cy is a curvature in the Y-axis direction, Kx is a conical coefficient in the X-axis direction, Ky is a conical coefficient in the Y-axis direction, Rn is a rotationally symmetric component of the aspheric term, and Pn is a rotationally asymmetric component of the aspheric term. It is noted that among the radius of curvature Rx in the X-axis direction, the radius of curvature Ry in the Y-axis direction and the curvatures Cx and Cy there is the following relation:

$$Rx=1/Cx, \quad Ry=1/Cy$$

It is noted that the term regarding free-form surfaces on which no data are given is zero. Refractive indexes are given on a d-line basis (587.56 nm). Length is given in mm.

Construction parameters for Examples 1-10 are set out below. In what follows, "FFS", "ASS", "ANM", "FL", "RE", "HOE" and "PIM" represent a free-form surface, an aspheric surface, an anamorphic surface, a Fresnel surface, a reflecting surface, a transmission type hologram and an image projection surface, respectively.

EXAMPLE 1

| Surface No. | Radius of curvature | Surface separation | Displacement and tilt | Refractive index | Abbe's No. |
|---|---|---|---|---|---|
| Object plane | ∞ | | (1) | | |
| 1 | ANM① (Stop, RE) | | | | |
| Image plane | ∞ | | (2) | | |

| ANM① | | | |
|---|---|---|---|
| Rx | | −502.13 | |
| Kx | | $1.0632 \times 10^{+1}$ | |
| R1 | | $5.3570 \times 10^{-1}$ | |
| R2 | | $6.9470 \times 10^{-1}$ | |
| Ry | | −399.96 | |
| Ky | | $1.0632 \times 10^{+1}$ | |
| P1 | | $1.0015 \times 10^{-8}$ | |
| P2 | | $1.9188 \times 10^{-13}$ | |

| Displacement and tilt(1) | | | | | | |
|---|---|---|---|---|---|---|
| X | −500.00 | Y | 150.38 | Z | −852.87 |
| α | −10.00 | β | −30.00 | γ | 0.00 |

| Displacement and tilt(2) | | | | | | |
|---|---|---|---|---|---|---|
| X | 150.00 | Y | −45.12 | Z | −255.86 |
| α | 10.00 | β | 30.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | | (1) | | |
| 1 | FFS① (Stop, RE) | | | | |
| Image plane | ∞ | | (2) | | |

| FFS① | | | |
|---|---|---|---|
| $C_4$ | $-9.4100 \times 10^{-4}$ | $C_6$ | $-1.2455 \times 10^{-3}$ |

| Displacement and tilt(1) | | | | | | |
|---|---|---|---|---|---|---|
| X | −500.00 | Y | 150.38 | Z | −852.87 |
| α | −10.00 | β | −30.00 | γ | 0.00 |

| Displacement and tilt(2) | | | | | | |
|---|---|---|---|---|---|---|
| X | 150.00 | Y | −45.12 | Z | −255.86 |
| α | 10.00 | β | 30.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | | (1) | | |
| 1 | ∞ (Stop) | | | 1.5163 | 64.1 |
| 2 | ASS① (RE, FL) | | (2) | 1.5163 | 64.1 |
| 3 | ∞ | | | | |
| Image plane | ∞ | | (3) | | |

| ASS① | |
|---|---|
| R | −1039.03 |
| K | $9.3942 \times 10^{+1}$ |
| A | $-4.0647 \times 10^{-8}$ |
| B | $5.7192 \times 10^{-12}$ |

-continued

Displacement and tilt(1)

| X | −500.00 | Y | 150.38 | Z | −852.87 |
|---|---|---|---|---|---|
| α | −10.00 | β | −30.00 | γ | 0.00 |

Displacement and tilt(2)

| X | 0.00 | Y | −0.07 | Z | 2.00 |
|---|---|---|---|---|---|
| α | −0.49 | β | 0.00 | γ | 0.00 |

Displacement and tilt(3)

| X | 150.00 | Y | −45.12 | Z | −255.86 |
|---|---|---|---|---|---|
| α | 10.00 | β | 30.00 | γ | 0.00 |

EXAMPLE 4

| Surface No. | Radius of curvature | Surface separation | Displacement and tilt | Refractive index | Abbe's No. |
|---|---|---|---|---|---|
| Object plane | ∞ | | | | |
| 1 | ∞ (Stop) | | (1) | 1.5163 | 64.1 |
| 2 | −31.96 | | (2) | | |
| 3 | FFS① | | (3) | 1.5163 | 64.1 |
| 4 | FFS② (RE) | | (4) | 1.5163 | 64.1 |
| 5 | FFS③ | | (5) | | |
| Image plane | ∞ | | (6) | | |

FFS①

| $C_4$ | $-6.4108 \times 10^{-3}$ | $C_5$ | $-2.2047 \times 10^{-3}$ | $C_6$ | $-2.9435 \times 10^{-3}$ |
|---|---|---|---|---|---|
| $C_7$ | $9.2182 \times 10^{-5}$ | $C_8$ | $1.0060 \times 10^{-4}$ | $C_9$ | $4.0049 \times 10^{-5}$ |
| $C_{10}$ | $1.4752 \times 10^{-4}$ | $C_{11}$ | $-7.3826 \times 10^{-7}$ | $C_{12}$ | $6.2547 \times 10^{-6}$ |
| $C_{13}$ | $1.2865 \times 10^{-5}$ | $C_{14}$ | $1.2474 \times 10^{-5}$ | $C_{15}$ | $2.9731 \times 10^{-6}$ |

FFS②

| $C_4$ | $7.1821 \times 10^{-3}$ | $C_5$ | $-2.8610 \times 10^{-3}$ | $C_6$ | $9.5508 \times 10^{-3}$ |
|---|---|---|---|---|---|
| $C_7$ | $1.7341 \times 10^{-4}$ | $C_8$ | $7.8182 \times 10^{-5}$ | $C_9$ | $1.2745 \times 10^{-4}$ |
| $C_{10}$ | $7.1777 \times 10^{-5}$ | $C_{11}$ | $-8.1357 \times 10^{-7}$ | $C_{12}$ | $3.6024 \times 10^{-6}$ |
| $C_{13}$ | $5.0757 \times 10^{-6}$ | $C_{14}$ | $6.3865 \times 10^{-6}$ | $C_{15}$ | $1.9517 \times 10^{-6}$ |

FFS③

| $C_4$ | $4.6394 \times 10^{-2}$ | $C_5$ | $-1.3097 \times 10^{-2}$ | $C_6$ | $7.4505 \times 10^{-2}$ |
|---|---|---|---|---|---|

Displacement and tilt(1)

| X | −150.00 | Y | −45.12 | Z | 255.86 |
|---|---|---|---|---|---|
| α | −10.00 | β | 30.00 | γ | 0.00 |

Displacement and tilt(2)

| X | −150.00 | Y | −45.12 | Z | 255.86 |
|---|---|---|---|---|---|
| α | −10.00 | β | 30.00 | γ | −3.54 |

Displacement and tilt(3)

| X | −159.00 | Y | −47.82 | Z | 271.21 |
|---|---|---|---|---|---|
| α | −35.85 | β | 28.84 | γ | 9.32 |

Displacement and tilt(4)

| X | −153.47 | Y | −36.54 | Z | 264.72 |
|---|---|---|---|---|---|
| α | −81.82 | β | 13.93 | γ | 27.06 |

Displacement and tilt(5)

| X | −154.43 | Y | −54.14 | Z | 261.05 |
|---|---|---|---|---|---|
| α | −101.77 | β | 3.06 | γ | 30.05 |

Displacement and tilt(6)

| X | −154.64 | Y | −58.08 | Z | 260.23 |
|---|---|---|---|---|---|
| α | −90.06 | β | −6.80 | γ | 36.96 |

EXAMPLE 5

| Surface No. | Radius of curvature | Surface separation | Displacement and tilt | Refractive index | Abbe's No. |
|---|---|---|---|---|---|
| Object plane | ∞ | | | | |
| 1 | ∞ (Stop) | | (1) | | |
| 2 | FFS① | | (2) | 1.5163 | 64.1 |
| 3 | FFS② (RE) | | (3) | 1.5163 | 64.1 |
| 4 | FFS③ (RE) | | (4) | 1.5163 | 64.1 |
| 5 | FFS④ | | (5) | | |
| Image plane | ∞ | | (6) | | |

FFS①

| $C_4$ | $-1.9257 \times 10^{-23}$ | $C_6$ | $1.3899 \times 10^{-2}$ | | |
|---|---|---|---|---|---|

FFS②

| $C_4$ | $-3.2785 \times 10^{-3}$ | $C_6$ | $-2.3074 \times 10^{-3}$ | $C_8$ | $2.8438 \times 10^{-4}$ |
|---|---|---|---|---|---|
| $C_{10}$ | $1.7697 \times 10^{-4}$ | $C_{11}$ | $1.2304 \times 10^{-5}$ | $C_{13}$ | $7.7102 \times 10^{-6}$ |
| $C_{15}$ | $9.3436 \times 10^{-6}$ | | | | |

FFS③

| $C_4$ | $1.0517 \times 10^{-2}$ | $C_6$ | $9.7656 \times 10^{-3}$ | $C_8$ | $2.2185 \times 10^{-4}$ |
|---|---|---|---|---|---|
| $C_{10}$ | $1.1100 \times 10^{-4}$ | $C_{11}$ | $6.1160 \times 10^{-6}$ | $C_{13}$ | $9.5203 \times 10^{-6}$ |
| $C_{15}$ | $7.6442 \times 10^{-6}$ | | | | |

FFS④

| $C_4$ | $-3.7059 \times 10^{-2}$ | $C_6$ | $1.2262 \times 10^{-2}$ | $C_8$ | $8.6479 \times 10^{-4}$ |
|---|---|---|---|---|---|
| $C_{10}$ | $-2.3570 \times 10^{-3}$ | $C_{11}$ | $4.5886 \times 10^{-4}$ | $C_{13}$ | $6.4202 \times 10^{-4}$ |
| $C_{15}$ | $3.8780 \times 10^{-4}$ | | | | |

Displacement and tilt(1)

| X | −100.00 | Y | −30.08 | Z | 170.57 |
|---|---|---|---|---|---|
| α | −10.00 | β | 30.00 | γ | 0.00 |

Displacement and tilt(2)

| X | −100.00 | Y | −30.08 | Z | 170.57 |
|---|---|---|---|---|---|
| α | −10.00 | β | 30.00 | γ | −83.91 |

Displacement and tilt(3)

| X | −109.00 | Y | −32.78 | Z | 185.93 |
|---|---|---|---|---|---|
| α | −13.81 | β | 52.32 | γ | −81.36 |

Displacement and tilt(4)

| X | −95.39 | Y | −31.10 | Z | 182.48 |
|---|---|---|---|---|---|
| α | −152.55 | β | 80.73 | γ | 55.25 |

Displacement and tilt(5)

| X | −110.03 | Y | −31.41 | Z | 173.84 |
|---|---|---|---|---|---|
| α | −177.96 | β | 59.45 | γ | 79.59 |

Displacement and tilt(6)

| X | −111.77 | Y | −31.44 | Z | 172.81 |
|---|---|---|---|---|---|
| α | −168.21 | β | 68.37 | γ | 156.78 |

EXAMPLE 6

| Surface No. | Radius of curvature | Surface separation | Displacement and tilt | Refractive index | Abbe's No. |
|---|---|---|---|---|---|
| Object plane | ∞ | | | | |
| 1 | ∞ (Stop) | | (1) | | |
| 2 | FFS① | | (2) | 1.5163 | 64.1 |
| 3 | FFS② (RE) | | (3) | 1.5163 | 64.1 |
| 4 | FFS③ (RE) | | (4) | 1.5163 | 64.1 |
| 5 | FFS② | | (3) | | |
| Image plane | ∞ | | (5) | | |

-continued

FFS①

| | | | | | | |
|---|---|---|---|---|---|---|
| $C_4$ | $-6.7134 \times 10^{-23}$ | $C_6$ | $-5.9354 \times 10^{-2}$ä | | | |

FFS②

| | | | | | | |
|---|---|---|---|---|---|---|
| $C_4$ | $9.7906 \times 10^{-3}$ | $C_6$ | $2.3959 \times 10^{-3}$ | $C_8$ | $-1.1266 \times 10^{-4}$ |
| $C_{10}$ | $-1.8072 \times 10^{-5}$ | $C_{11}$ | $8.5713 \times 10^{-6}$ | $C_{13}$ | $-1.4818 \times 10^{-5}$ |
| $C_{15}$ | $1.1678 \times 10^{-6}$ | | | | |

FFS③

| | | | | | | |
|---|---|---|---|---|---|---|
| $C_4$ | $1.0697 \times 10^{-2}$ | $C_6$ | $8.2264 \times 10^{-3}$ | $C_8$ | $-5.5642 \times 10^{-6}$ |
| $C_{10}$ | $2.2819 \times 10^{-5}$ | $C_{11}$ | $1.9081 \times 10^{-6}$ | $C_{13}$ | $4.8203 \times 10^{-7}$ |
| $C_{15}$ | $1.0884 \times 10^{-6}$ | | | | |

Displacement and tilt(1)

| X | −150.00 | Y | −45.12 | Z | 255.86 |
|---|---|---|---|---|---|
| α | −10.00 | β | 30.00 | γ | 0.00 |

Displacement and tilt(2)

| X | −150.00 | Y | −45.12 | Z | 255.86 |
|---|---|---|---|---|---|
| α | −10.00 | β | 30.00 | γ | −75.69 |

Displacement and tilt(3)

| X | −151.61 | Y | −45.60 | Z | 258.60 |
|---|---|---|---|---|---|
| α | −56.08 | β | 74.73 | γ | −35.68 |

Displacement and tilt(4)

| X | −132.26 | Y | −42.19 | Z | 276.08 |
|---|---|---|---|---|---|
| α | −149.88 | β | 68.01 | γ | 55.15 |

Displacement and tilt(5)

| X | −166.01 | Y | −49.71 | Z | 278.60 |
|---|---|---|---|---|---|
| α | −70.20 | β | 76.66 | γ | 55.97 |

EXAMPLE 7

| Surface No. | Radius of curvature | Surface separation | Displacement and tilt | Refractive index | Abbe's No. |
|---|---|---|---|---|---|
| Object plane | ∞ | | | | |
| 1 | HOE | | (1) | 1.49 | 57.4 |
| 2 | ∞ (PIM) | | (2) | 1.49 | 57.4 |
| 3 | ASS① (RE, FL) | | (3) | 1.49 | 57.4 |
| 4 | ∞ | | (1) | | |
| Image plane | ∞ | | (4) | | |

ASS①

| R | −816.43 |
|---|---|
| K | $-2.0000 \times 10^{-6}$ |
| A | $1.4845 \times 10^{-11}$ |
| B | $-5.8165 \times 10^{-15}$ |
| C | $2.3649 \times 10^{-19}$ |
| D | $-1.5631 \times 10^{-24}$ |

Displacement and tilt(1)

| X | 0.00 | Y | 0.00 | Z | 650.00 |
|---|---|---|---|---|---|
| α | 27.2 | β | 0.00 | γ | 0.00 |

Displacement and tilt(2)

| X | 0.00 | Y | 0.46 | Z | 650.89 |
|---|---|---|---|---|---|
| α | 27.2 | β | 0.00 | γ | 0.00 |

Displacement and tilt(3)

| X | 0.00 | Y | MY | Z | 604.70 |
|---|---|---|---|---|---|
| α | 27.2 | β | 0.00 | γ | 0.00 |

Displacement and tilt(4)

| X | 0.00 | Y | −205.69 | Z | 249.76 |
|---|---|---|---|---|---|
| α | 27.2 | β | 0.00 | γ | 0.00 |

EXAMPLE 8

| Surface No. | Radius of curvature | Surface separation | Displacement and tilt | Refractive index | Abbe's No. |
|---|---|---|---|---|---|
| Object plane | ∞ | | | | |
| 1 | HOE | | (1) | 1.49 | 57.4 |
| 2 | ∞ (PIM) | | (2) | 1.49 | 57.4 |
| 3 | ASS① (RE, FL) | | (3) | 1.49 | 57.4 |
| 4 | ∞ | | (1) | | |
| Image plane | ∞ | | (4) | | |

ASS①

| R | −816.43 |
|---|---|
| K | $-2.0000 \times 10^{-6}$ |
| A | $1.4845 \times 10^{-11}$ |
| B | $-5.8165 \times 10^{-15}$ |
| C | $2.3649 \times 10^{-19}$ |
| D | $-1.5631 \times 10^{-24}$ |

Displacement and tilt(1)

| X | 0.00 | Y | 0.00 | Z | 650.00 |
|---|---|---|---|---|---|
| α | 27.2 | β | 0.00 | γ | 0.00 |

Displacement and tilt(2)

| X | 0.00 | Y | 0.46 | Z | 650.89 |
|---|---|---|---|---|---|
| α | 27.2 | β | 0.00 | γ | 0.00 |

Displacement and tilt(3)

| X | 0.00 | Y | MY | Z | 584.08 |
|---|---|---|---|---|---|
| α | 27.2 | β | 0.00 | γ | 0.00 |

Displacement and tilt(4)

| X | 0.00 | Y | −205.69 | Z | 249.76 |
|---|---|---|---|---|---|
| α | 27.2 | β | 0.00 | γ | 0.00 |

EXAMPLE 9

| Surface No. | Radius of curvature | Surface separation | Displacement and tilt | Refractive index | Abbe's No. |
|---|---|---|---|---|---|
| Object plane | ∞ | | | | |
| 1 | HOE | | (1) | 1.62 | 23.9 |
| 2 | ∞ (PIM) | | (2) | 1.62 | 23.9 |
| 3 | ASS① (RE, FL) | | (3) | 1.62 | 23.9 |
| 4 | ∞ | | (1) | | |
| Image plane | ∞ | | (4) | | |

ASS①

| R | −835.62 |
|---|---|
| K | 0.0332 |
| A | $4.8760 \times 10^{-9}$ |
| B | $-2.5964 \times 10^{-13}$ |
| C | $6.8805 \times 10^{-18}$ |
| D | $-6.6177 \times 10^{-23}$ |

Displacement and tilt(1)

| X | 0.00 | Y | 0.00 | Z | 650.00 |
|---|---|---|---|---|---|
| α | 27.2 | β | 0.00 | γ | 0.00 |

Displacement and tilt(2)

| X | 0.00 | Y | 0.46 | Z | 650.89 |
|---|---|---|---|---|---|
| α | 27.2 | β | 0.00 | γ | 0.00 |

-continued

|  | Displacement and tilt(3) | | | | |
|---|---|---|---|---|---|
| X | 0.00 | Y | MY | Z | 604.54 |
| α | 27.2 | β | 0.00 | γ | 0.00 |
|  | Displacement and tilt(4) | | | | |
| X | 0.00 | Y | −205.69 | Z | 249.76 |
| α | 27.2 | β | 0.00 | γ | 0.00 |

EXAMPLE 10

| Surface No. | Radius of curvature | Surface separation | Displacement and tilt | Refractive index | Abbe's No. |
|---|---|---|---|---|---|
| Object plane | ∞ | | | | |
| 1 | ∞ | | (1) | 1.49 | 57.4 |
| 2 | ∞ (PIM) | | (2) | 1.49 | 57.4 |
| 3 | ASS① (RE, FL) | | (3) | 1.49 | 57.4 |
| 4 | HOE | | (1) | | |
| Image plane | ∞ | | (4) | | |

| ASS① | |
|---|---|
| R | −816.43 |
| K | −2.0000 × 10$^{-6}$ |
| A | 1.4845 × 10$^{-11}$ |
| B | −5.8165 × 10$^{-15}$ |
| C | 2.3649 × 10$^{-19}$ |
| D | −1.5631 × 10$^{-24}$ |

|  | Displacement and tilt(1) | | | | |
|---|---|---|---|---|---|
| X | 0.00 | Y | 0.00 | Z | 650.00 |
| α | 27.2 | β | 0.00 | γ | 0.00 |
|  | Displacement and tilt(2) | | | | |
| X | 0.00 | Y | 0.46 | Z | 650.89 |
| α | 27.2 | β | 0.00 | γ | 0.00 |
|  | Displacement and tilt(3) | | | | |
| X | 0.00 | Y | MY | Z | 604.70 |
| α | 27.2 | β | 0.00 | γ | 0.00 |
|  | Displacement and tilt(4) | | | | |
| X | 0.00 | Y | −205.69 | Z | 249.76 |
| α | 27.2 | β | 0.00 | γ | 0.00 |

Figure 22:
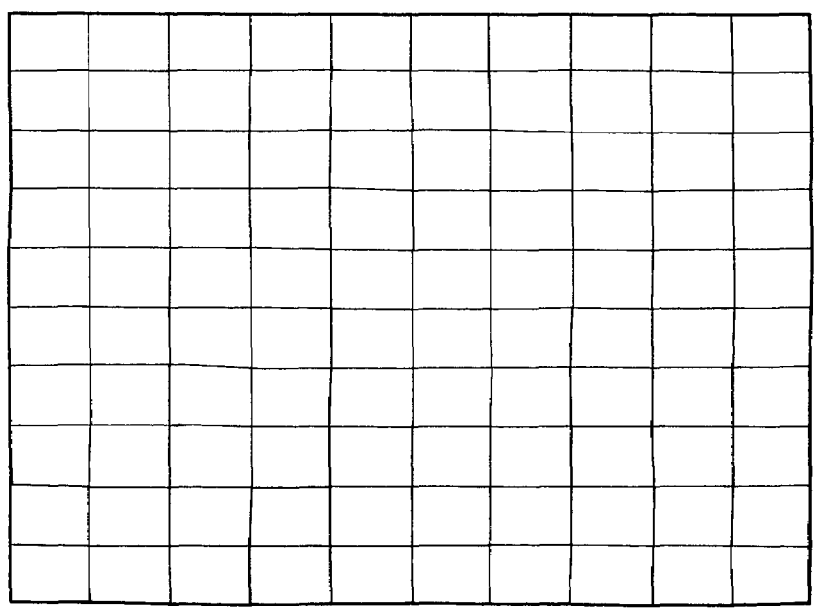
FIG. 22 is an aberration diagram showing image distortions in Example 4.
Figure 23:
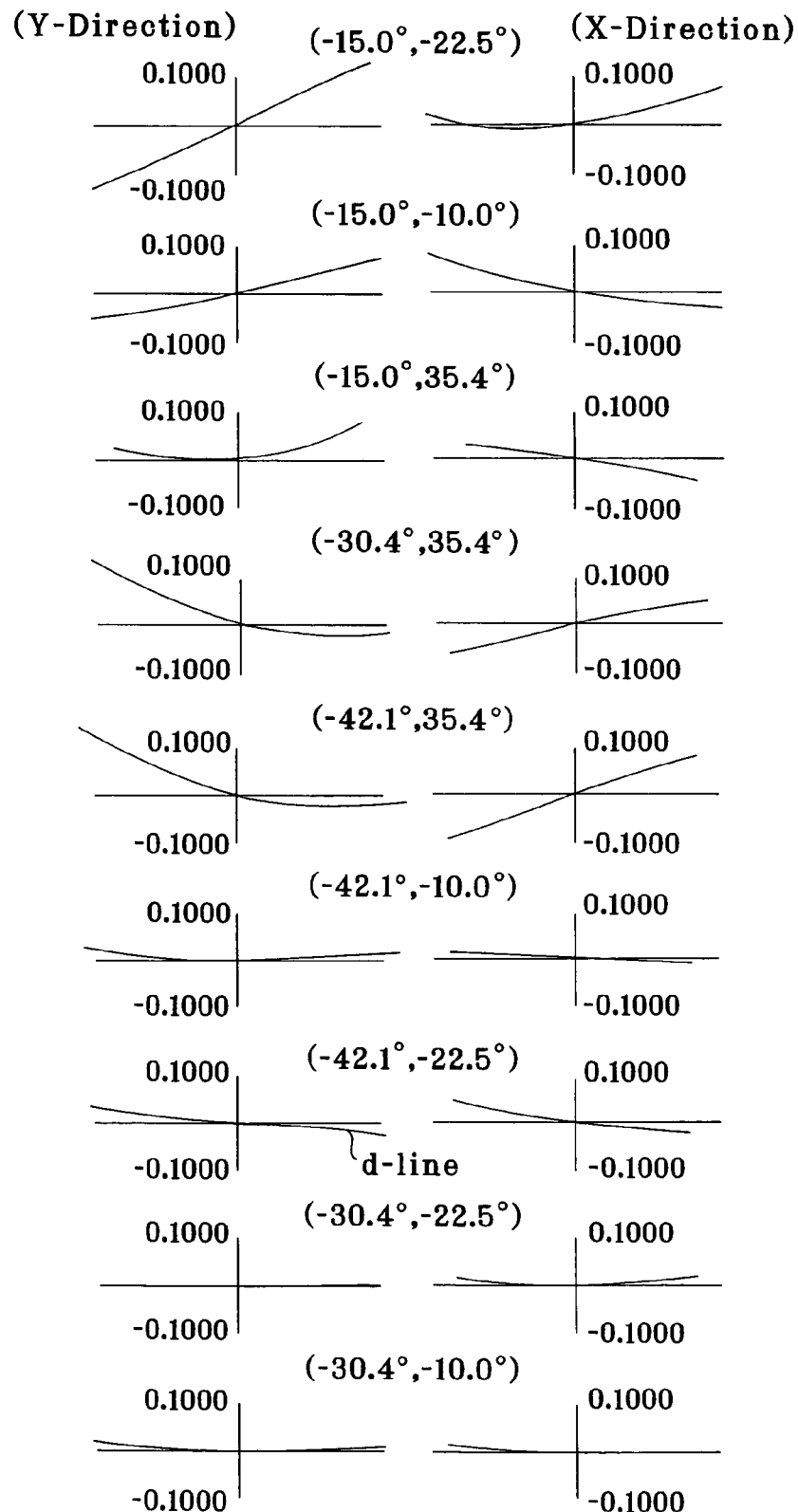
FIG. 23 is a diagram for transverse aberrations in Example 4.

FIG. 22 is an aberration diagram for image distortions in the above Example 4, and FIG. 23 is a transverse aberration diagram for Example 4, in which the bracketed two figures represent transverse aberrations at horizontal (X-direction) and vertical (Y-direction) angles of view.

Next, Example 11 is described with reference to one specific embodiment of the projection viewing system shown in a schematic perspective of FIG. 36; however, numerical data thereon are omitted.

The projection viewing system according to this example incorporates a projection optical system 2 comprising a decentered prism 23 and a decentered prism 21, each of a shape symmetrical with respect to plane, as viewed from the side of an eyepiece optical system 3. The decentered prism 23 comprises a first surface 41, a second surface 42 and a third surface 43. The first surface 41 is a transmitting surface through which light leaving the prism 21 enters the prism 23. The second surface 42 is a reflecting surface at which light entering through the first surface 41 in the prism 23 is reflected (subjected to total or mirror reflection). The third surface 43 is a transmitting surface through which light reflected at the second surface 42 leaves the prism 23. In the decentered prism 21, the respective surfaces are located as in Example 5. Two such decentered prisms are positioned in such a way that an exit surface 44 of the prism 21 is opposed to the first surface 41 of the prism 23, and a display device 1 is opposed to an entrance surface 41 of the prism 21.

In the instant example, a plane (plane of symmetry) within the decentered prism 21, in which an axial chief ray is included and a plane within the decentered prism 23, in which an axial chief ray is included are located in such a way as to make an angle of 45°. In other words, the decentered prisms 21 and 23 are located in such a way that the prism 23 is rotated 45° around the axial chief ray leaving the prism 21. The display device 1 is then located at an angle of 45 around the axial chief ray entering the prism 21, thereby compensating for a 45° inclination of a projected image on the eyepiece optical system 3 around the axial chief ray emerging from the projection optical system 2.

Figure 37:
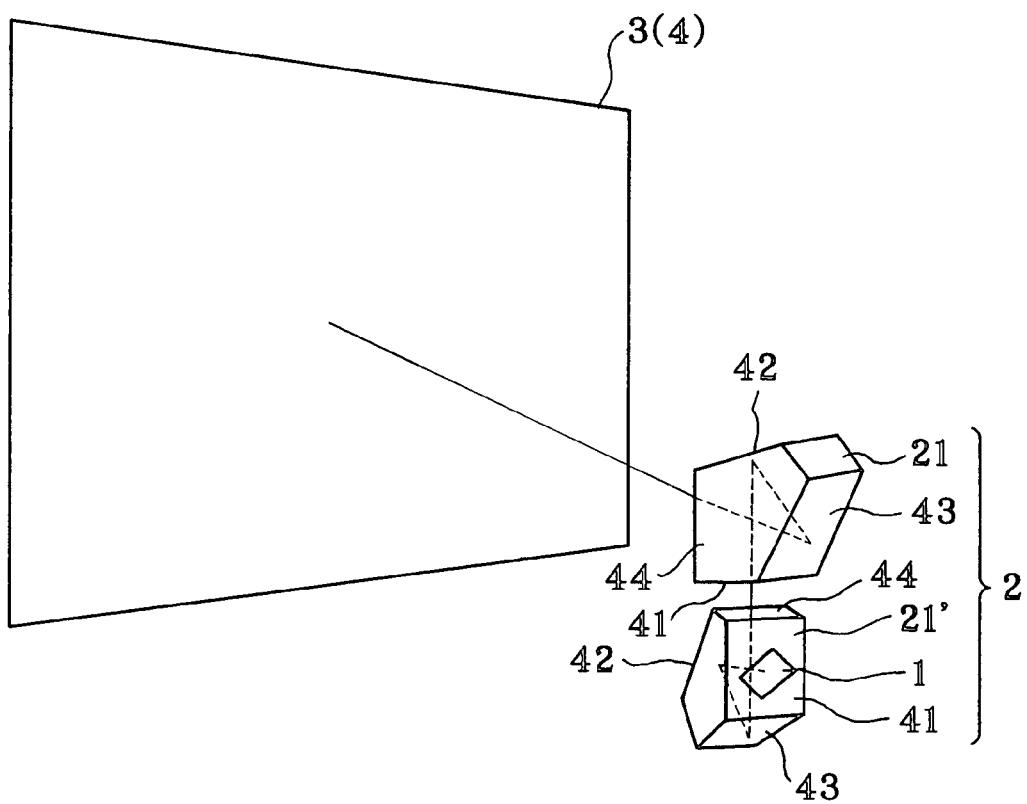
FIG. 37 is illustrative in schematic of the projection viewing system according to Example 12 of the invention.

Another specific embodiment of the projection viewing system is shown in a schematic perspective of FIG. 37 with no numerical data.

The projection viewing system according to this example is built up of a projection optical system 2 comprising a decentered prism 21 and a decentered prism 21', each of a shape symmetrical with respect to plane, as viewed from the side of an eyepiece optical system 3. In the decentered prisms 21 and 21', the respective surfaces are located as in Example 5. Then, a display device 1 is opposed to an entrance surface 41 of the decentered prism 21'.

In this example, too, a plane (plane of symmetry) within the decentered prism 21, in which an axial chief ray is included and a plane within the decentered prism 21', in which an axial chief ray is included are located in such a way as to make an angle of 45°. In other words, the decentered prisms 21 and 21' are located in such a way that the prism 21 is rotated 45° around the axial chief ray leaving the prism 21'. The display device 1 is then located at an angle of 45 around the axial chief ray entering the prism 21', thereby compensating for a 45° inclination of a projected image on the eyepiece optical system 3 around the axial chief ray emerging from the projection optical system 2.

As in Examples 11 and 12, two or more decentered prisms may be combined together to set up a projection optical system. The decentered prisms, each of a shape symmetrical with respect to plane, are combined in such a way that the planes of symmetry thereof make a given angle with axial chief rays in arbitrary directions, so that the inclination of a projected image on a projection plane in association with rotation can be compensated for by rotation of the display device 1 around the axial chief rays.

Figure 38:
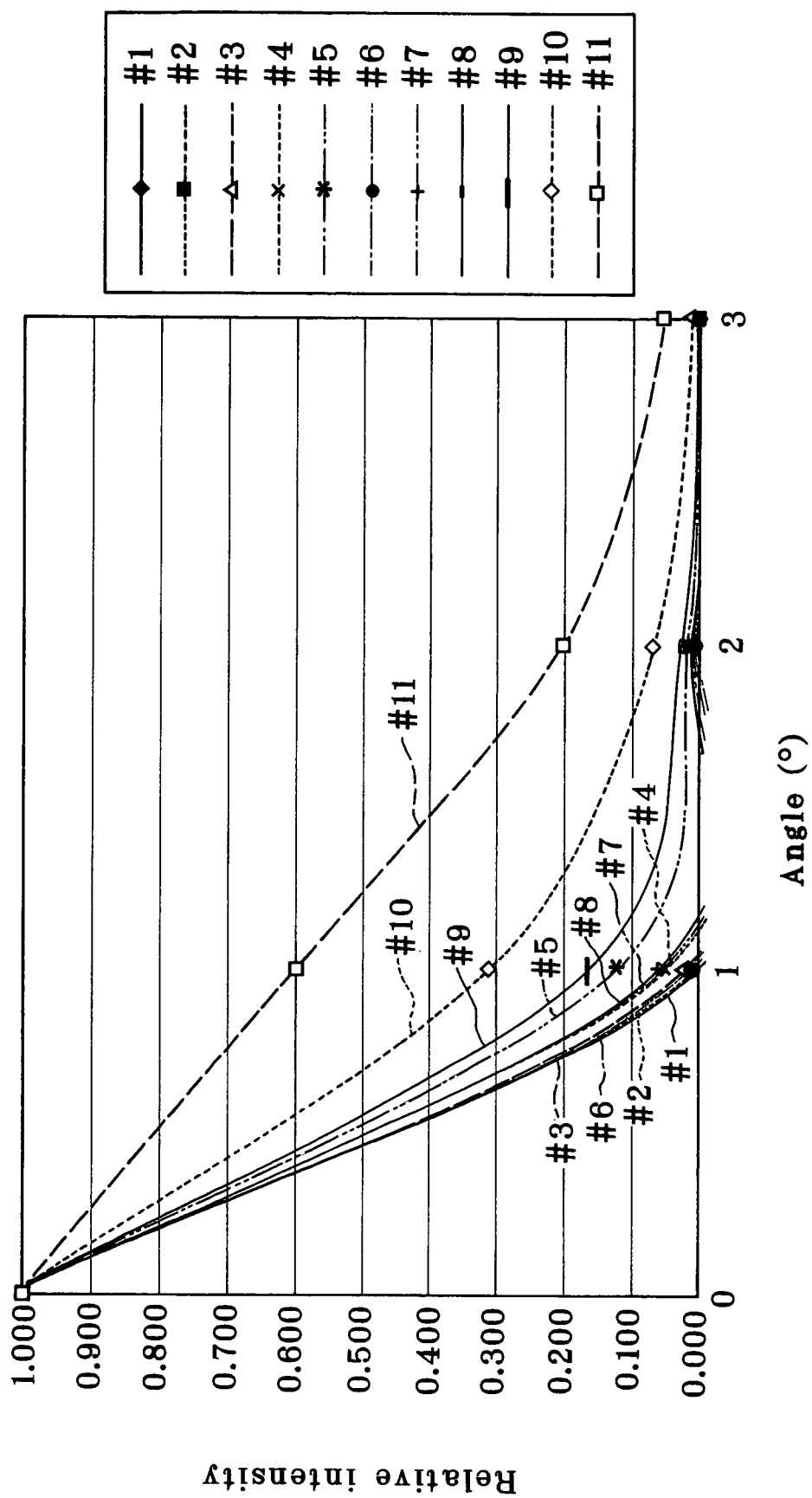
FIG. 38 is a diagram for angle distributions of diffused light in some single-transmission type diffusing plates usable herein.

The diffusing plate 4 used in the invention was prepared as follows, using the fabrication method set forth in Japanese Patent Application No. 2001-370950. First, spherical beads having limited particles were blown to a mold-formation metal plate by means of sandblasting. Then, a random array of concave facets formed on the metal plate was copied to a transparent resin plate by means of transfer. In this way, a single-transmission type diffusing plate was prepared with a random pit-and-projection pattern formed on one surface of the transparent resin plate. Numbered #1 to #11, 11 samples were prepared. Angle distributions of diffused light for diffusing plates #1 to #11 are shown in FIG. 38. The values of Sm/Ra of diffusing plates #1 to #11 and their angles of diffusion at full width half maximum and ⅒ full width are tabulated below. From this table, it is found that diffusing plate #11 is preferable for the diffusing plate in the above examples and embodiments.

| Sample | Sm/Ra | Angle of diffusion full width half maximum | Angle of diffusion 1/10 full width |
|---|---|---|---|
| #1 | 316.67 | 0.096 | 0.858 |
| #2 | 206.25 | 0.104 | 0.980 |
| #3 | 205.88 | 0.114 | 1.164 |
| #4 | 163.64 | 0.144 | 1.510 |
| #5 | 177.78 | 0.230 | 2.236 |
| #6 | 223.53 | 0.108 | 1.062 |
| #7 | 172.00 | 0.148 | 1.572 |
| #8 | 174.07 | 0.156 | 1.632 |
| #9 | 165.52 | 0.286 | 2.572 |
| #10 | 160.61 | 1.368 | 3.470 |
| #11 | 138.46 | 2.470 | 5.040 |

Figure 39:
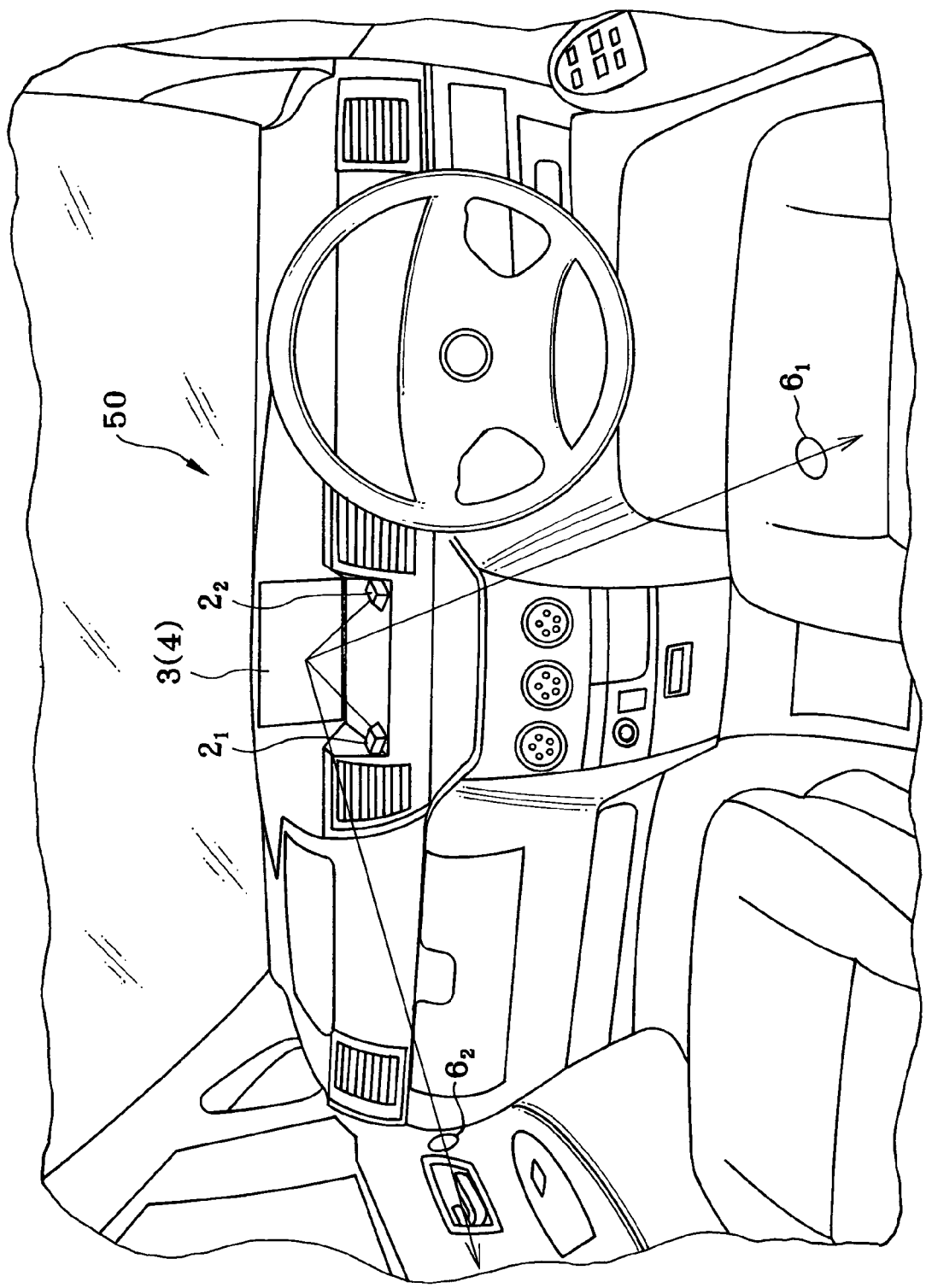
FIG. 39 is illustrative of the projection viewing system of the invention as mounted on a car dashboard.

FIG. 39 is illustrative of one specific embodiment of the invention, wherein the projection viewing system is mounted on a part of a car dashboard 50 so that a driver and a passenger on a passenger side can view different images; for instance, the driver can view navigation images and the passenger can watch TV images. In this case, an eyepiece optical system 3 is of the reflection type, and projection optical systems $2_1$ and $2_2$ are dedicated to the driver and the passenger, respectively. Exit pupil images $6_1$ and $6_2$ of the projection optical systems $2_1$ and $2_2$ projected through the eyepiece optical system 3 are positioned in the vicinity of the driver and the passenger, respectively, where they are magnified to exit pupils of easy-to-view size depending on the diffusibility of a diffusing plate 4.

The projection viewing system of the invention, for instance, may be embodied as follows.

(1) A projection viewing system, characterized by comprising at least two display devices, at least two projection optical systems for magnification and projection of images appearing on said at least two display devices from different directions, a common diffusing plate located near to images projected through said at least two projection optical systems, and a common eyepiece optical system for projection of an exit pupil of each of said projection optical systems on a viewer side.

(2) The projection viewing system according to (1) above, characterized in that said diffusing plate has an angle of diffusion of up to 200 at full width half maximum.

(3) The projection viewing system according to (1) or (2) above, characterized in that said diffusing plate has an angle of diffusion of up to 40° at a 1/10 full width.

(4) The projection viewing system according to any one of (1) to (3) above, characterized in that said diffusing plate has a surface roughness that satisfies the following condition:

$$5 < (Sm/Ra) < 1,000 \quad (1)$$

where Sm is a mean pit-to-projection space of a diffusing surface according to JIS B0601 (μm), and Ra is a center-line mean roughness of the diffusing surface (μm).

(5) The projection viewing system according to (4) above, characterized by satisfying the following conditions:

for a single transmission type diffusing plate, $$5 < (Sm/Ra) \times (Ep/400) < 70 \quad (2)$$

for a double-transmission type diffusing plate, $$10 < (Sm/Ra) \times (Ep/400) < 80 \quad (3)$$

for a front-surface reflection type diffusing plate, $$50 < (Sm/Ra) \times (Ep/400) < 200 \quad (4)$$

for a back-surface reflection type diffusing plate, $$80 < (Sm/Ra) \times (Ep/400) < 250 \quad (5)$$

where Sm is a mean pit-to-projection space of the diffusing surface according to JIS B0601 (μm), Ra is a center-line mean roughness of the diffusing surface (μm), and Ep is a distance from the diffusing surface of the diffusing plate to the position of a viewer's eye (mm).

(6) The projection viewing system according to (4) or (5) above, characterized by satisfying the following condition:

$$Sm < 200 \text{ μm} \quad (9)$$

(7) The projection viewing system according to any one of (1) to (6) above, characterized in that said eyepiece optical system comprises a Fresnel lens.

(8) The projection viewing system according to any one of (1) to (6) above, characterized in that said eyepiece optical system comprises a reflecting surface.

(9) The projection viewing system according to (8) above, characterized in that said eyepiece optical system comprises a Fresnel reflecting mirror.

(10) The projection viewing system according to (8) above, characterized in that said eyepiece optical system comprises a Fresnel back-surface reflecting mirror.

(11) The projection viewing system according to any one of (7) to (10) above, characterized in that said diffusing surface is provided on at least one surface of said eyepiece optical system.

(12) A projection viewing system, characterized by comprising at least two display devices, at least two projection optical systems for magnification and projection of images appearing on said at least two display devices from different directions, a common transmission type hologram diffusing plate located near to images projected through said at least two projection optical systems, and a common eyepiece optical system comprising a concave mirror for projection of an exit pupil of each of said projection optical systems on a viewer side.

(13) The projection viewing system according to (12) above, characterized in that said concave mirror comprises a Fresnel concave reflecting mirror.

(14) The projection viewing system according to (12) or (13) above, characterized in that light rays from said projecting optical systems to an exit pupil of said projection viewing system transmits said transmission type hologram diffusing plate twice, wherein an angle at which said light rays transmit said transmission type hologram diffusing plate at a first time is different from an angle at which said light rays transmit said transmission type hologram diffusing plate at a second time.

(15) The projection viewing system according to any one of (12) to (14) above, characterized in that said transmission type hologram diffusing plate has an angle of diffusion of up to 200 at full width half maximum.

(16) The projection viewing system according to any one of (12) to (15) above, characterized in that said transmission type hologram diffusing plate has an angle of diffusion of up to 400 at full width at which light intensity goes down to 1/10.

(17) The projection viewing system according to any one of (12) to (16) above, characterized by being designed such that axial chief rays from said projection optical systems are obliquely incident on said concave mirror.

(18) The projection viewing system according to any one of (12) to (17) above, characterized by being designed such that zero-order light not subjected to diffraction upon first and second transmission of said light rays through said transmission hologram diffusing plate is kept from being incident on the exit pupil of said projection viewing system.

(19) The projection viewing system according to any one of (12) to (18) above, characterized by being designed such that, at a position of the exit pupil of said projection viewing system, zero-order light not subjected to diffraction upon first and second transmission of said light rays through said transmission hologram diffusing plate is incident on a portion of said exit pupil spaced away from the center of said exit pupil at a distance of at least ½ of the diameter of said exit pupil.

(20) The projection viewing system according to any one of (12) to (19) above, characterized in that said transmission type hologram diffusing plate has a flexion action by diffraction.

(21) The projection viewing system according to (20) above, characterized by satisfying condition (7):

$$\gamma > 1° \quad (7)$$

where $\gamma$ is the d-line angle of flexion of an optical axis by said transmission type hologram diffusing plate.

(22) The projection viewing system according to (20) or (21) above, characterized by satisfying condition (8):

$$\gamma < 45° \quad (8)$$

where $\gamma$ is the d-line angle of flexion of an optical axis by said transmission type hologram diffusing plate.

(23) The projection viewing system according to any one of (12) to (22) above, characterized in that the difference in the angle of diffraction of an optical axis by said transmission type hologram diffusing plate between 700-nm wavelength light and 400-nm wavelength light is up to 18°.

(24) The projection viewing system according to (12) to (23) above, characterized in that, at a position of the exit pupil of said projection viewing system, the difference in the position of incidence between a 700-nm wavelength optical axis and a 400-nm wavelength optical axis is up to ½ of the diameter of said exit pupil.

(25) The projection viewing system according to any one of (12) to (24) above, characterized by satisfying relation (9):

$$0° < \beta < 45° \quad (9)$$

where $\beta$ is the angle of incidence of a d-line optical axis on said concave mirror.

(26) The projection viewing system according to any one of (12) to (25) above, characterized by satisfying relation (10):

$$0.01 < \gamma/\beta < 1,000 \quad (10)$$

where $\gamma$ is the angle of flexion of a d-line optical axis by said transmission type hologram diffusing plate, and $\beta$ is the angle of incidence of the d-line optical axis on said concave mirror.

(27) The projection viewing system according to any one of (1) to (26) above, characterized in that either one of the optical axes of said projection optical systems crosses said eyepiece optical system, and an angle that a perpendicular to said eyepiece optical system at a point of intersection subtends said optical axis is 10° or greater.

(28) The projection viewing system according to any one of (1) to (27) above, characterized in that at least one of said projection optical systems is made up of a decentered prism comprising at least one decentered prism formed of a medium having a refractive index (n) of greater than 1 (n>1), wherein said decentered prism comprises an entrance surface through which a light beam leaving said display device enters said prism, at least one reflecting surface for reflection of said light beam within said prism and an exit surface through which a light beam leaves said prism, wherein said at least one reflecting surface has a curved surface shape that is rotationally asymmetric enough to make correction for aberrations occurring due to decentration.

(29) The projection viewing system according to (28) above, characterized in that at least one of said decentered prisms comprises an entrance surface through which a light beam leaving said display device enters said prism, a first reflecting surface for reflection within said prism of a light beam entered from said entrance surface in said prism, a second reflecting surface for reflection within said prism of a light beam reflected at said first reflecting surface and an exit surface through which a light beam reflected at said second reflecting surface leaves said prism, and a light beam from said entrance surface toward said first reflecting surface and a light beam from said second reflecting surface toward said exit surface cross each other within said prism.

(30) The projection viewing system according to (28) above, characterized in that at least one of said decentered prisms comprises an entrance surface through which a light beam leaving said display device enters said prism, a first reflecting surface for reflection within said prism of a light beam entered from said entrance surface in said prism, a second reflecting surface for reflection within said prism of a light beam reflected at said first reflecting surface and an exit surface through which a light beam reflected at said second reflecting surface leaves said prism, and said entrance surface and said second reflecting surface are defined by a single surface.

(31) The projection viewing system according to any one of (1) to (30) above, characterized in that images appearing on said display devices are distorted upon display in such a way as to compensate for an image distortion due to said projection optical systems.

(32) The projection viewing system according to any one of (28) to (30) above, characterized in that said decentered prism optical system is configured in a shape symmetrical with respect to plane, and an angle that a perpendicular to said eyepiece optical system at a point of intersection of the optical axis of said projection optical system with said eyepiece optical system subtends said optical axis is 100 or greater.

(33) The projection viewing system according to any one of (28) to (32) above, characterized in that the plane of symmetry of said decentered prism optical system is positioned in such a way as to substantially include said point of intersection, and said display device is located on the object plane of said decentered prism optical system in such a way that the longitudinal or lateral direction of the display screen of said display device corresponding to said decentered prism optical system is substantially in line with the longitudinal or lateral direction of said eyepiece optical system upon projection near to said eyepiece optical system.

(34) The projection viewing system according to any one of (1) to (33) above, characterized in that said projection optical system has a function of making correction for a distortion of a tilted image.

(35) The projection viewing system according to any one of (1) to (34) above, characterized in that an LED or LD is used as a light source.

As can be understood from the foregoing, the present invention can provide a projection viewing system having high illumination efficiency albeit being simplified in construction, which enables at least two images varying with viewing directions to be simultaneously viewed on one single display screen.

I claim:

1. A projection viewing system, comprising:
   at least a first display device displaying a first image to be viewed by a first viewer and a second display device displaying a second image to be viewed by a second viewer,
   at least a first protection optical system and a second protection optical system,
   a diffusing plate, said diffusing plate comprising a transmission type hologram, and
   an eyepiece optical system, said eyepiece optical system comprising a concave mirror, wherein:
   said first projection optical system projects an image appearing on said first display device in a first direction toward said first viewer and said second projection optical system projects an image appearing on said second display device in a direction different from said first direction toward said second viewer,
   said diffusing plate is located near to images projected through said first and second protection optical systems,
   said eyepiece optical system projects exit pupils of said first and second projection optical systems onto a viewer side, and
   zero-order light leaving said diffusing plate is kept from being incident on an exit pupil of said projection viewing system.

2. A projection viewing system, comprising:
   at least a first display device displaying a first image to be viewed by a first viewer and a second display device displaying a second image to be viewed by a second viewer,
   at least a first projection optical system and a second projection optical system,
   a diffusing plate, said diffusing plate comprising a transmission type hologram, and
   an eyepiece optical system, said eyepiece optical system comprising a concave mirror, wherein:
   said first protection optical system projects an image appearing on said first display device in a first direction toward said first viewer and said second projection optical system projects an image appearing on said second display device in a direction different from said first direction toward said second viewer,
   said diffusing plate is located near to images projected through said first and second protection optical systems,
   said eyepiece optical system projects exit pupils of said first and second protection optical systems onto a viewer side, and
   zero-order light leaving said diffusing plate propagates toward an exit pupil position of said projection viewing system, and is incident on a portion of said exit pupil spaced away from a center of said exit pupil at a distance of at least ½ of the diameter of said exit pupil.

3. A projection viewing system, comprising:
   at least a first display device displaying a first image to be viewed by a first viewer and a second display device displaying a second image to be viewed by a second viewer,
   at least a first projection optical system and a second projection optical system,
   a diffusing plate, said diffusing plate comprising a transmission type hologram, and
   an eyepiece optical system, said eyepiece optical system comprising a concave mirror, wherein:
   said first projection optical system projects an image appearing on said first display device in a first direction toward said first viewer and said second protection optical system projects an image appearing on said second display device in a direction different from said first direction toward said second viewer,
   aid diffusing plate is located near to images projected through said first and second protection optical systems,
   said eyepiece optical system projects exit pupils of said first and second protection optical systems onto a viewer side,
   said diffusing plate has a flexion action by diffraction, and the following condition is satisfied:

$$\gamma > 1° \qquad (7)$$

where $\gamma$ is a d-line angle of flexion of an optical axis by said diffusing plate.

4. The projection viewing system according to claim 3, which further satisfies the following condition:

$$\gamma < 45° \qquad (8)$$

where $\gamma$ is the d-line angle of flexion of an optical axis by said diffusing plate.

5. A projection viewing system, comprising:
   at least a first display device displaying a first image to be viewed by a first viewer and a second display device displaying a second image to be viewed by a second viewer,
   at least a first projection optical system and a second projection optical system,
   a diffusing plate, said diffusing plate comprising a transmission type hologram, and
   an eyepiece optical system, said eyepiece optical system comprising a concave mirror, wherein:
   said first protection optical system projects an image appearing on said first display device in a first direction toward said first viewer and said second projection optical system projects an image appearing on said second display device in a direction different from said first direction toward said second viewer,
   said diffusing plate is located near to images projected through said first and second protection optical systems,
   said eyepiece optical system projects exit pupils of said first and second projection optical systems onto a viewer side, and
   a difference in an angle of diffraction of an optical axis by said diffusing plate between 700 nm wavelength light and 400 nm wavelength light is up to 18°.

6. A projection viewing system, comprising:
   at least a first display device displaying a first image to be viewed by a first viewer and a second display device displaying a second image to be viewed by a second viewer,
   at least a first projection optical system and a second protection optical system,
   a diffusing plate, said diffusing plate comprising a transmission type hologram, and an eyepiece optical system, said eyepiece optical system comprising a concave mirror, wherein:
   said first protection optical system projects an image appearing on said first display device in a first direction toward said first viewer and said second protection optical system projects an image appearing on said second display device in a direction different from said first direction toward said second viewer, said diffusing plate is located near to images projected through said first and second protection optical systems, said eyepiece optical system projects exit pupils of said first and second protection optical systems onto a viewer side, and at a position of the exit pupil of said projection viewing system, a difference in a position of incidence between a 700 nm wavelength optical axis and a 400 nm wavelength optical axis is up to ½ of a diameter of said exit pupil.

7. A projection viewing system, comprising:

at least a first display device displaying a first image to be viewed by a first viewer and a second display device displaying a second image to be viewed by a second viewer, at least a first projection optical system and a second protection optical system, a diffusing plate, said diffusing plate comprising a transmission type hologram, and an eyepiece optical system, said eyepiece optical system comprising a concave mirror, wherein:

said first protection optical system projects an image appearing on said first display device in a first direction toward said first viewer and said second projection optical system projects an image appearing on said second display device in a direction different from said first direction toward said second viewer, said diffusing plate is located near to images projected through said first and second projection optical systems, said eyepiece optical system projects exit pupils of said first and second projection optical systems onto a viewer side, and the following condition is satisfied:

$$0°<\beta<45° \qquad (9)$$

where $\beta$ is an angle of incidence of a d-line optical axis on said concave mirror.

8. A projection viewing system, comprising:

at least a first display device displaying a first image to be viewed by a first viewer and a second display device displaying a second image to be viewed by a second viewer, at least a first protection optical system and a second protection optical system, a diffusing plate, said diffusing plate comprising a transmission type hologram, and an eyepiece optical system, said eyepiece optical system comprising a concave mirror, wherein:

said first projection optical system projects an image appearing on said first display device in a first direction toward said first viewer and said second protection optical system projects an image appearing on said second display device in a direction different from said first direction toward said second viewer, said diffusing plate is located near to images projected through said first and second projection optical systems, said eyepiece optical system projects exit pupils of said first and second projection optical systems onto a viewer side, and the following condition is satisfied:

$$0.01<\gamma/\beta<1,000 \qquad (10)$$

where $\gamma$ is an angle of flexion of a d-line optical axis by said diffusing plate, and $\beta$ is an angle of incidence of a d-line optical axis on said concave mirror.

* * * * *

UNITED STATES PATENT AND TRADEMARK OFFICE
CERTIFICATE OF CORRECTION

PATENT NO.        : 7,317,565 B2
APPLICATION NO. : 10/612092
DATED             : January 8, 2008
INVENTOR(S)       : Takayoshi Togino It is certified that error appears in the above-identified patent and that said Letters Patent is hereby corrected as shown below:

Column 37, line 10, change "protection" to --projection--;

Column 37, line 11, change "protection" to --projection--;

Column 37, line 23, change "protection" to --projection--;

Column 37, line 42, change "protection" to --projection--;

Column 37, line 49, change "protection" to --projection--;

Column 37, line 52, change "protection" to --projection--;

Column 38, line 5, change "protection" to --projection--;

Column 38, line 9, change "aid" to --said--;

Column 38, line 10, change "protection" to --projection--;

Column 38, line 13, change "protection" to --projection--;

Column 38, line 38, change "protection" to --projection--;

Column 38, line 45, change "protection" to --projection--;

Column 38, line 59, change "protection" to --projection--;

Column 38, line 64, change "protection" to --projection--;

Column 38, line 66, change "protection" to --projection--;

Column 39, line 4, change "protection" to --projection--;

Column 39, line 7, change "protection" to --projection--;

Column 39, line 20, change "protection" to --projection--;

Column 39, line 25, change "protection" to --projection--;

UNITED STATES PATENT AND TRADEMARK OFFICE
CERTIFICATE OF CORRECTION

PATENT NO. : 7,317,565 B2
APPLICATION NO. : 10/612092
DATED : January 8, 2008
INVENTOR(S) : Takayoshi Togino It is certified that error appears in the above-identified patent and that said Letters Patent is hereby corrected as shown below:

Column 40, line 11, change "protection" to --projection--;

Column 40, line 12, change "protection" to --projection--; and

Column 40, line 19, change "protection" to --projection--.

Signed and Sealed this

Eighth Day of July, 2008

JON W. DUDAS
*Director of the United States Patent and Trademark Office*